United States Patent
Hara et al.

[19]

[11] Patent Number: 5,764,557
[45] Date of Patent: Jun. 9, 1998

[54] PRODUCT-SUM CALCULATION APPARATUS, PRODUCT-SUM CALCULATING UNIT INTEGRATED CIRCUIT APPARATUS, AND CUMULATIVE ADDER SUITABLE FOR PROCESSING IMAGE DATA

[75] Inventors: Kunihiko Hara; Yutaka Arima, both of Tokyo, Japan

[73] Assignee: Mitsubishi Denki Kabushiki Kaisha, Tokyo, Japan

[21] Appl. No.: 580,193
[22] Filed: Dec. 28, 1995

[30] Foreign Application Priority Data

Aug. 29, 1995  [JP]  Japan ................... 7-220513

[51] Int. Cl.$^6$ ............................................. G06F 7/48
[52] U.S. Cl. ........................... 364/750.5; 364/736.02; 364/786.03
[58] Field of Search ................. 364/750.5, 736.02, 364/757, 786.03

[56] References Cited

U.S. PATENT DOCUMENTS

| | | | |
|---|---|---|---|
| 4,110,832 | 8/1978 | Leininger et al. | 364/786.03 |
| 4,852,037 | 7/1989 | Aoki | 364/736.02 |
| 5,181,183 | 1/1993 | Miyazaki | 364/757 |
| 5,287,299 | 2/1994 | Lin | 364/750.5 |
| 5,436,860 | 7/1995 | Shankar et al. | 364/757 |
| 5,650,952 | 7/1997 | Baier et al. | 364/750.5 |

OTHER PUBLICATIONS

Ruetz, Peter, IEEE Journal of Solid–State Circuits, vol. 24, No. 2, pp. 338–348, Apr. 1989.

*Primary Examiner*—David H. Malzahn

[57] ABSTRACT

A product-sum calculation apparatus is provided for cumulatively adding up respective products of first input data and second input data. There is further provided a product-sum calculation unit integrated circuit apparatus including the product-sum calculation apparatus, and a cumulative adder. In the product-sum calculation apparatus, a barrel shifter shifts the first input data by a predetermined number of bits based on the second input data, and an adder adds the shifted data outputted from the barrel shifter and inputted through a first input terminal thereof, and data inputted through a second input terminal thereof. A register temporarily stores data outputted from the adder, outputs a stored data to the adder through the second input terminal of the adder, and outputs the stored data through an output terminal. Further, there is provided a multiplexer for selecting either one of third input data inputted through a first input terminal thereof, and data inputted through a second input terminal thereof. Accordingly, the product-sum calculation apparatus calculates a product of the first input data and the second input data, calculates a sum of a calculated product and the third input data, and outputs a calculated sum from the output terminal.

24 Claims, 31 Drawing Sheets

Fig. 16A

Input Image (6x6)

Fig. 16B

Kernel (3x2)

| W1 | W2 | W3 |
|----|----|----|
| W4 | W5 | W6 |

Fig. 17

Laplacian Filter

3x2 Kernel

6x1 Kernel

Fig.23
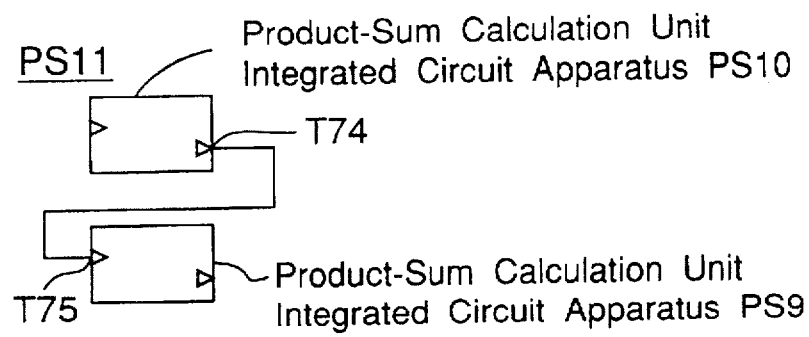
Fig.24
| W1 | | | | | W6 |
| W7 | | | | | W12 |
Fig.25
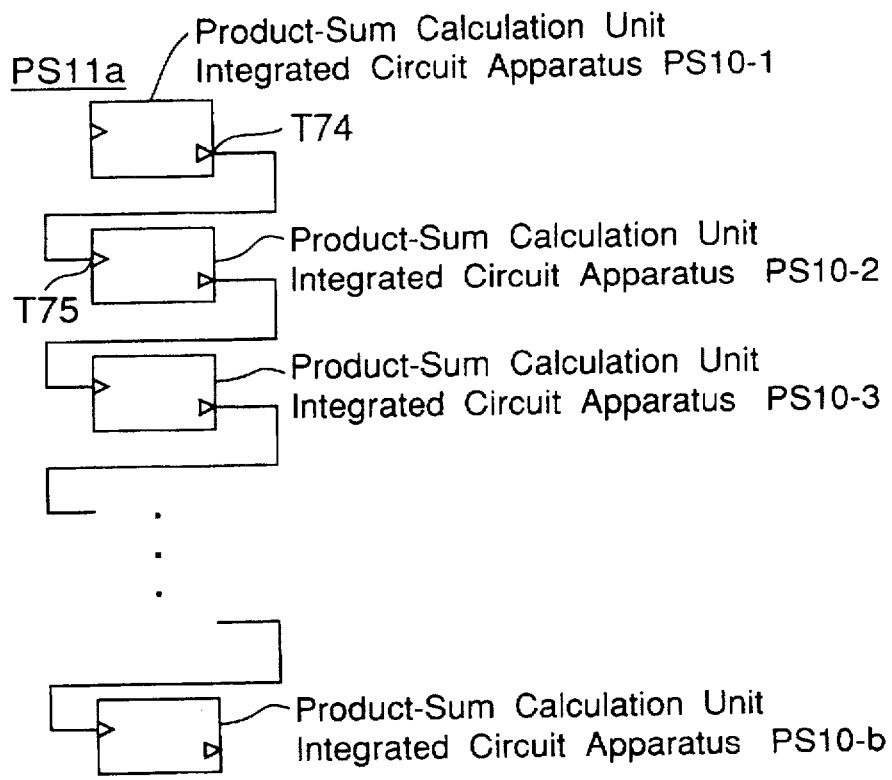

5,764,557

PRODUCT-SUM CALCULATION APPARATUS, PRODUCT-SUM CALCULATING UNIT INTEGRATED CIRCUIT APPARATUS, AND CUMULATIVE ADDER SUITABLE FOR PROCESSING IMAGE DATA

BACKGROUND OF THE INVENTION

1. Field of the Invention

The present invention relates to a product-sum calculation apparatus, a product-sum calculation unit integrated circuit apparatus, and a cumulative adder, and particularly, to a product-sum calculation apparatus, a product-sum calculation unit integrated circuit apparatus, and a cumulative adder which are suitable for processing image data.

2. Description of the Related Art

For image processing systems, it is generally indispensable to extract feature quantities such as profiles from input image data and to perform convolution integrals for removing noise. In order to execute this convolution integral of image data, a large number of product-sum calculations must be processed. On the other hand, extremely fast processing is required for the implementation of real-time processing of motion pictures.

Generally speaking, the recent motion picture yrate is approximately 30 frames per second in terms of CCD rate. Further, the standard pixel count is 512×512. Accordingly, the number of product-sum calculations required for executing a convolution integral using a kernel image data having a size of 16×16 is approximately 2 GOPS (giga operation per second), while use of a kernel image data having a size of 32×32 requires approximately 8 GOPS of product-sum calculations. Implementing this processing performance with an existing apparatus would require numerous arithmetic processing chips. On the other hand, for implementation of low-cost product-sum calculation apparatus, it is generally necessary to integrate numerous product-sum calculation circuits on a smaller size chip by using semiconductor IC technologies. However, current semiconductor IC technologies have great difficulty in implementing the above-mentioned performance in a relatively small chip. Therefore, it is difficult to implement a product-sum calculation apparatus capable of executing the above-mentioned times of product-sum calculations with a practical cost. Further, the pixel size and the frame rate will further increase in the future, so that increasingly faster processing will be demanded. If it comes feasible to pre-process this type of image data with a relatively low cost, more profitable image processing systems could be widely spread to the public.

Next, conventional product-sum calculation apparatuses are discussed from the point of view of the circuit technology. FIG. 35 is a block diagram showing a configuration of a first conventional product-sum calculation apparatus.

Referring to FIG. 35, the first conventional product-sum calculation apparatus includes a multiplier 101, an adder 102, a register 103, and a multiplexer 104. The product-sum calculation apparatus shown in FIG. 35 is able to accomplish a product-sum calculation process, by executing the following steps:

(a) executing a multiplication of first input data 105 and second input data 106 by the multiplier 101;

(b) adding up either third input data 107 or accumulated addition resulting data 111 to multiplication resulting data 108 by the adder 102; and (c) storing the addition resulting data 110 into the register 103.

In this case, it is possible to execute a cumulative addition process of a plurality of product values by iterating the step of storing the addition resulting data 110 into the register 103 each time the first input data 105 and the second input data 106 are updated, in such a state that the accumulated addition resulting data 111 keeps selected by the multiplexer 104.

Next, a second conventional product-sum calculation apparatus, which is another configuration example of the product-sum calculation apparatus, is described with reference to FIG. 36.

In this example, referring to FIG. 36, a one-bit shifter 121, an AND gate array 124, and a selector 123 are used instead of the multiplier 101 of FIG. 35. A register 122 is provided to temporarily hold or store the output data of the 1-bit shifter 121, and used for temporarily holding or storing a state in which the first input data 105 is shifted bit by bit. In this configuration, the multiplication of the first input data 105 and the second input data 106 is executed by cumulatively adding up, by the adder 102, a partial multiplication result 116 determined by the AND gate array 124 from data 113, which is a result of shifting the first input data 105 bit by bit in synchronization with the digits of the bits of the second input data 106, and the second input data 106 selected by the selector 123. That is, in the first process of the multiplication processing, the first input data 105 is selected by a multiplexer 120, where the 1-bit shifter makes the data stored, as it is, in the register 122 without any bit shift. When this occurs, with the least significant bit of the second input data 106 selected by the selector 123, an AND calculation result of the value of the bit signal of the least significant bit and the data 114 stored in the register 122 are added up by the adder 102, and the addition result thereof is stored in a register 103. Subsequently, with the stored data 114 of the register 122 selected by the multiplexer 120, the data 113 shifted by the 1-bit shifter 121 is stored in the register 122, and an AND calculation result of the stored data 113 and the succeeding-digit bit signal of the second input data 106 selected by the selector 123 are added up, and the addition resulting data is stored in the register 103. Thereafter, the above-mentioned calculation process is iterated until the selection of all the bits of the second input data 106 is completed. Through this sequence of calculations, the multiplication of the first input data 105 and the second input data 106 can be accomplished. Addition or cumulative addition with the third input data 107 is executed in a manner similar to that as in the first conventional example.

FIG. 37 is a block diagram showing a configuration of a third conventional product-sum calculation apparatus as described in Peter A. Ruetz, "The Architectures and Design of a 20-MHz Real-Time DSP Chip pp 338–348, 1989."

Referring to FIG. 37, the third conventional product-sum calculation apparatus, having a first input terminal 125, a second input terminal 126, and a calculated result output terminal 131, comprises registers 127-1 to 127-6, multipliers 129-1 to 129-6, and adders 130-1 to 130-5.

Next explained is the calculation of executing a convolution integral using a 3×2 kernel image data {W1, W2, W3; W4, W5, W6} for 6×6 image data {$X_i$} in the third conventional example. The image data {$X_i$} (i=1, 2, 3, . . . ) is inputted to the first input terminal 125, and then, the input image data {$X_i$} is sequentially transferred to the registers 127-1, 127-2 and 127-3. The image data {$X_{i+6}$} (i=1, 2, 3, . . . ) is inputted to the second input terminal 126, and then, the image data {$X_{i+6}$} is sequentially transferred to the registers 127-4, 127-5 and 127-6. In this case, when the image data {$X_i$} is inputted to the multiplier 129-3, that is, when W1 is multiplied by $X_i$, W2 is multiplied by $X_{i+1}$ by the multiplier 129-2, and W3 is multiplied by $X_{i+2}$ by the multiplier 129-1. Further, in this process, W4 is multiplied by $X_{i+6}$ by the multiplier 129-6, W5 is multiplied by $X_{i+7}$ by the multiplier 129-5, and W6 is multiplied by $X_{i+8}$ by the multiplier 129-4. The six multiplication results are added up by the five adders 130-1 to 130-5, and a resulting data of ($W1X_i+W2X_{i+1}+W3X_{i+2}+W4X_{i+6}+W5X_{i+7}+W6X_{i+8}$) is outputted from the calculated result output terminal 131. Thus, a convolution integral using a 3×2 kernel image data {W1, W2, W3; W4, W5, W6} for 6×6 image data {$X_i$} can be executed.

Ruetz, this circuit is utilized to integrate circuits for executing the convolution integral using the kernel image data having a size of 8×8 into an Large Scaled Integrated Circuit (LSI). However, its chip area has been reported in Ruetz to be 225 mm$^2$, a relatively large value. Consequently, it is difficult to apply such large chips in fields to which low cost is required.

The multipliers 101 and 129-1 to 129-6 used in the first and third conventional examples of product-sum calculation apparatus increases in circuit scale in proportion to the square of bit width of input data. In contrast to this, the circuit scale of the adders 102 and 130-1 to 130-5 is proportional to the bit width of input data. Accordingly, the product-sum calculation circuits of the first and third conventional examples constructed by using the multipliers 101 and 129-1 to 129-6 have had such a problem that increased bit width would cause their scale to become very large as compared with product-sum calculation apparatuses which do not use multipliers. For this reason, there is such a problem that the first and third conventional product-sum calculation apparatuses have had difficulty in implementing faster processing by operating arithmetic units in parallel on one chip.

Further, the second conventional product-sum calculation apparatus, which includes no multiplier 101 that occupies a relatively large area, is indeed effective for higher degree of circuit integration as compared with the first and third conventional examples, however, the second conventional apparatus must iterate large numbers of processes for multiplication as described before. As a result, it has had a problem of longer processing time, as compared with the time required for multiplication in the first conventional product-sum calculation apparatus. Generally speaking, the calculation time in the second conventional example of product-sum calculation apparatus is time resulting from multiplying the processing time of the first conventional product-sum calculation apparatus by the bit width of the second input data 106. Accordingly, due to largely increased processing time, the second conventional product-sum calculation apparatus has had difficulty in implementing faster processing.

SUMMARY OF THE INVENTION

An essential object of the present invention is therefore to provide a product-sum calculation apparatus, which is reduced in size as compared with the first and third conventional examples, reduced in processing time as compared with the second conventional example, and yet manufactured with relatively low cost.

Another object of the present invention is therefore to provide a product-sum calculation unit integrated circuit apparatus, which is reduced in size as compared with the first and third conventional examples, reduced in processing time as compared with the second conventional example, and yet manufactured with relatively low cost.

A further object of the present invention is therefore to provide a cumulative adder, which is reduced in size as compared with the first and third conventional examples, reduced in processing time as compared with the second conventional example, and yet manufactured with relatively low cost.

In order to achieve the above-mentioned objective, according to one aspect of the present invention, there is provided a product-sum calculation apparatus for cumulatively adding up respective products of first input data and second input data, and outputting a sum of said respective products through an output terminal, comprising:

- a barrel shifter for shifting the first input data by a predetermined number of bits based on the second input data, and outputting a shifted data;
- an adder having first and second input terminals, for adding up the shifted data outputted from said barrel shifter and inputted through said first input terminal of said adder, and data inputted through said second input terminal of said adder, and outputting data of an addition result; and
- a register for temporarily storing data outputted from said adder, outputting a stored data to said adder through said second input terminal of said adder, and outputting the stored data through said output terminal.

The above-mentioned product-sum calculation apparatus preferably further comprises:

- a multiplexer having first and second input terminals, for selecting either one of third input data inputted through said first input terminal of said multiplexer, and data inputted through said second input terminal of said multiplexer, and outputting a selected data to said adder through said second input terminal of said adder,
- whereby said product-sum calculation apparatus calculates a product of the first input data and the second input data, calculates a sum of a calculated product and the third input data, and outputs a calculated sum from said output terminal.

The above-mentioned product-sum calculation apparatus preferably further comprises:

- a bit-position encoder for detecting bit positions of bit signals whose bit status is "1" out of the second input data, and outputting bit-position data representing the bit position to said barrel shifter,
- wherein said barrel shifter shifts the first input data based on the bit-position data outputted from said bit-position encoder, and outputs a shifted data.

In the above-mentioned product-sum calculation apparatus, the second input data includes a plurality of bit signals, wherein said bit-position encoder comprises:

a shift register; and an encoder, wherein said shift register comprises:

- a first delay type flip-flop for temporarily storing respective bit signals of the second input data;
- a second delay type flip-flop for temporarily storing an input signal;
- a plurality of third delay type flip-flops provided between said first and said second delay type flip-flops so that said first, second and third delay type flip-flops are connected in series, and provided in correspondence to respective bit signals of the second input data, each of said plurality of third delay type flip-flops temporarily storing an input signal; and a plurality of pairs of selectors provided in correspondence to respective bit signals of the second input data, each of said plurality of pairs of selectors transmitting a signal outputted from said first delay type flip-flop through a third delay type flip-flop corresponding to a bit signal corresponding to said selector when a bit status of the bit signal corresponding to said selector is "1", and transmitting the signal outputted from said first delay type flip-flop without any intervention of any third delay type flip-flop corresponding to the bit signal when the bit status of the bit signal is "zero";

wherein said shift register transfers a signal outputted from said first delay type flip-flop sequentially to said third delay type flip-flops corresponding to the bit signals whose bit status is "1" out of the second input data, in response to a predetermined clock signal, and outputs a signal representing positions of said third delay type flip-flops to which the signal outputted from the first delay type flip-flop has been transferred; and wherein said encoder detects positions of bit signals whose bit status is "1" out of the second input data, based on the signal outputted from said shift register, and outputs positional data representing detected positions.

In the above-mentioned product-sum calculation apparatus, when the number of bit signals whose bit status is "1" out of the second input data is not smaller than a predetermined number, said bit-position encoder detects positions of only the predetermined number of most significant bit signals whose bit status is "1" out of the second input data, and outputs the positional data representing detected positions.

In the above-mentioned product-sum calculation apparatus, said bit-position encoder comprises:

a counter for counting a number of shifts of a signal outputted from said first delay type flip-flop by counting pulses of the clock signal, and outputting a counted number of shifts; and a comparator for comparing the number of shifts outputted from said counter, with an input specified value of the number of shifts, and outputting a signal representing completion of the position detection when the number of shifts outputted from said counter is larger than the input specified value of the number of shifts, wherein the position detection is completed when the number of bit shifts outputted from said counter is larger than the input specified value of the number of shifts.

The above-mentioned product-sum calculation apparatus preferably further comprises:

data compression means for converting the second input data into such compressed data having bit signals that the number of the bit signals whose bit status is "1" is not larger than a predetermined restrictive number smaller than a bit width of the second input data, wherein said bit-position encoder outputs bit-position data representing bit positions of bit signals whose bit status is "1" out of the compressed data converted by said data compression means, to said barrel shifter.

The above-mentioned product-sum calculation apparatus, said data compression means converts the second input data into such compressed data having bit signals that the number of the bit signals is the same as that of the second input data, that the number of bit signals whose bit status is "1" is not larger than the restrictive number, and that a difference between the compressed data and the second input data is a minimum, and outputs the compressed data.

In the above-mentioned product-sum calculation apparatus, said data compression means converts the second input data into such compressed data having bit signals that the number of the bit signals is one larger than that of the second input data, that the number of bit signals whose bit status is "1" is not larger than the restrictive number, and that a difference between the compressed data and the second input data is a minimum, and outputs the compressed data.

In the above-mentioned product-sum calculation apparatus, said data compression means further generates and outputs numerical data representing a number F of bit signals whose bit status is "1" out of the compressed data, to said bit-position encoder, and wherein said bit-position encoder generates and outputs bit-position data representing bit positions of the F bit signals whose bit status is "1", and thereafter, starts processing the next compressed data.

According to another aspect of the present invention, there is provided a product-sum calculation apparatus for cumulatively adding up respective products of first input data and second input data, and outputting a sum of said respective products through an output terminal, comprising:

a barrel shifter for shifting the first input data by a predetermined number of bits based on the second input data, and outputting a shifted data;

an adder having first and second input terminals, for adding up the shifted data outputted from said barrel shifter and inputted through said first input terminal of said adder, and data inputted through said second input terminal of said adder, and outputting data of an addition result;

a register for temporarily storing data outputted from said adder, outputting a stored data to said adder through said second input terminal of said adder, and outputting the stored data through said output terminal;

a multiplexer having first and second input terminals, for selecting either one of third input data inputted through said first input terminal of said multiplexer, and data inputted through said second input terminal of said multiplexer, and outputting a selected data to said adder through said second input terminal of said adder, whereby said product-sum calculation apparatus calculates a product of the first input data and the second input data, calculates a sum of a calculated product and the third input data, and outputs a calculated sum from said output terminal; and data conversion means for converting the second input data into data obtained by adding up positive and negative numerical values whose magnitude is a power of 2, where the number of the numerical values is not larger than the number of bit signals of the second input data.

According to a further aspect of the present invention, there is provided a product-sum calculation unit integrated circuit apparatus comprising:

a plurality of product-sum calculation apparatuses, each of said plurality of product-sum calculation apparatuses cumulatively adding up respective products of first input data and second input data, and outputting a sum of said respective products through an output terminal, each of said plurality of product-sum calculation apparatuses comprising:

a barrel shifter for shifting the first input data by a predetermined number of bits based on the second input data, and outputting a shifted data;

an adder having first and second input terminals, for adding up the shifted data outputted from said barrel shifter and inputted through said first input terminal of said adder, and data inputted through said second input terminal of said adder, and outputting data of an addition result; and a register for temporarily storing data outputted from said adder, outputting a stored data to said adder through said second input terminal of said adder, and outputting the stored data through said output terminal, and a bit-position encoder for outputting bit-position data representing bit positions of bit signals whose bit status is "1" out of the second input data, to said barrel shifter of each of said plurality of product-sum calculation apparatuses, wherein said barrel shifter of each of said plurality of product-sum calculation apparatuses shifts the first input data based on the bit-position data, and outputs a shifted data.

In the above-mentioned product-sum calculation unit integrated circuit apparatus, each of said plurality of product-sum calculation apparatuses further comprises:

a multiplexer having first and second input terminals, for selecting either one of third input data inputted through said first input terminal of said multiplexer, and data inputted through said second input terminal of said multiplexer, and outputting a selected data to said adder through said second input terminal of said adder, whereby each of said plurality of product-sum calculation apparatuses calculates a product of the first input data and the second input data, calculates a sum of a calculated product and the third input data, and outputs a calculated sum from said output terminal.

According to a still further aspect of the present invention, there is provided a product-sum calculation unit integrated circuit apparatus comprising:

a plurality of N product-sum calculation apparatuses (k) (k=1, 2, 3, . . . , N), each of plurality of N product-sum calculation apparatuses (k) comprising:

a barrel shifter for shifting the first input data by a predetermined number of bits based on the second input data, and outputting a shifted data;

an adder having first and second input terminals, for adding up the shifted data outputted from said barrel shifter and inputted through said first input terminal of said adder, and data inputted through said second input terminal of said adder, and outputting data of an addition result;

a register for temporarily storing data outputted from said adder, outputting a stored data to said adder through said second input terminal of said adder, and outputting the stored data through said output terminal; and a multiplexer having first and second input terminals, for selecting either one of third input data inputted through said first input terminal of said multiplexer, and data inputted through said second input terminal of said multiplexer, and outputting a selected data to said adder through said second input terminal of said adder, whereby each of said product-sum calculation apparatuses (k) calculates a product of the first input data and the second input data, calculates a sum of a calculated product and the third input data, and outputs a calculated sum from said output terminal; and data conversion means provided in parallel to said plurality of N product-sum calculation apparatuses (k), said data conversion means comprising:

data compression means for converting the second input data into such compressed data having bit signals that the number of the bit signals whose bit status is "1" is not larger than a predetermined restrictive number smaller than a bit width of the second input data; and a bit-position encoder for generating and outputting bit-position data representing bit positions of bit signals whose bit status is "1" out of the compressed data, to said barrel shifter of each said product-sum calculation apparatus (k), wherein said product-sum calculation apparatus of a first stage (k) (k=1) calculates a product of data inputted through a first input terminal and the second input data, calculates a sum of a calculated product and third input data, and outputs data of a calculated sum, wherein each of said product-sum calculation apparatuses (k) (k=2, 3, . . . , N−1), based on the bit-position data inputted through an input terminal, calculates a product of data inputted through a k-th input terminal other than said input terminal through which the bit-position data is inputted, and the second input data, calculates a sum of a calculated product and the data of the sum outputted from said product-sum calculation apparatus of preceding stage (k−1), and outputs data of a calculated sum to said product-sum calculation apparatus of succeeding stage (k+1), and wherein said product-sum calculation apparatus of final stage (k) (k=N), based on the bit-position data, calculates a product of data inputted through an N-th input terminal, and the second input data, and calculates a sum of a calculated product and the data of the calculated sum outputted from said product-sum calculation apparatus of preceding stage (k) (k=N−1), and outputs data of a calculated sum.

The above-mentioned product-sum calculation unit integrated circuit apparatus preferably further comprises:

at least one storage means provided at least at one point between said product-sum calculation apparatus k and said product-sum calculation apparatus (k+1) (k=1, 2, . . . , N−1), said storage means temporarily storing the data of the calculated sum outputted from said product-sum calculation apparatus (k) (k=1, 2, . . . , N−1), and outputs a stored data to said product-sum calculation apparatus (k+1) (k=1, 2, . . . , N−1).

In the above-mentioned product-sum calculation unit integrated circuit apparatus, said storage means stores a plurality of M data, and outputs the stored data sequentially from a first data inputted thereto when the number of the stored data exceeds a predetermined number M.

In the above-mentioned product-sum calculation unit integrated circuit apparatus, the predetermined number M is specified by external means.

The above-mentioned product-sum calculation unit integrated circuit apparatus further comprises:

output-use storage means for temporarily storing the data of the calculated sum outputted from said product-sum calculation apparatus of the final stage (k) (k=N), and outputting a stored data.

According to yet another aspect of the present invention, there is provided a product-sum calculation unit integrated circuit apparatus arrangement comprising:

a plurality of b product-sum calculation unit integrated circuit apparatuses (m) (m=1, 2, 3, ..., b), each of said plurality of b product-sum calculation unit integrated circuit apparatuses (m) comprising:

a plurality of N product-sum calculation apparatuses (k) (k=1, 2, 3, ..., N), each of plurality of N product-sum calculation apparatuses (k) comprising:

a barrel shifter for shifting the first input data by a predetermined number of bits based on the second input data, and outputting a shifted data;

an adder having first and second input terminals, for adding up the shifted data outputted from said barrel shifter and inputted through said first input terminal of said adder, and data inputted through said second input terminal of said adder, and outputting data of an addition result;

a register for temporarily storing data outputted from said adder, outputting a stored data to said adder through said second input terminal of said adder, and outputting the stored data through said output terminal; and a multiplexer having first and second input terminals, for selecting either one of third input data inputted through said first input terminal of said multiplexer, and data inputted through said second input terminal of said multiplexer, and outputting a selected data to said adder through said second input terminal of said adder, whereby each of said product-sum calculation apparatuses (k) calculates a product of the first input data and the second input data, calculates a sum of a calculated product and the third input data, and outputs a calculated sum from said output terminal; and data conversion means provided in parallel to said plurality of N product-sum calculation apparatuses (k), said data conversion means comprising:

data compression means for converting the second input data into such compressed data having bit signals that the number of the bit signals whose bit status is "1" is not larger than a predetermined restrictive number smaller than a bit width of the second input data; and a bit-position encoder for generating and outputting bit-position data representing bit positions of bit signals whose bit status is "1" out of the compressed data, to said barrel shifter of each said product-sum calculation apparatus (k), wherein said product-sum calculation apparatus of a first stage (k) (k=1) calculates a product of data inputted through a first input terminal and the second input data, calculates a sum of a calculated product and third input data, and outputs data of a calculated sum, wherein each of said product-sum calculation apparatuses (k) (k=2, 3, ..., N−1), based on the bit-position data inputted through an input terminal, calculates a product of data inputted through a k-th input terminal other than said input terminal through which the bit-position data is inputted, and the second input data, calculates a sum of a calculated product and the data of the sum outputted from said product-sum calculation apparatus of preceding stage (k−1), and outputs data of a calculated sum to said product-sum calculation apparatus of succeeding stage (k+1), and wherein said product-sum calculation apparatus of final stage (k) (k=N), based on the bit-position data, calculates a product of data inputted through an N-th input terminal, and the second input data, and calculates a sum of a calculated product and the data of the calculated sum outputted from said product-sum calculation apparatus of preceding stage (k) (k=N−1), and outputs data of a calculated sum, wherein each of said plurality of b product-sum calculation unit integrated circuit apparatuses (m) (m=1, 2, ..., b) further comprises output-use storage means for temporarily storing the data of the calculated sum outputted from said product-sum calculation apparatus of the final stage (k) (k=N), and outputting a stored data, wherein said plurality of b product-sum calculation unit integrated circuit apparatuses (m) (m=1, 2, 3, ..., b) are connected so that data outputted from said output-use storage means of each of said product-sum calculation unit integrated circuit apparatuses (m) (m=2, 3, ..., b) is outputted to said product-sum calculation unit integrated circuit apparatuses of succeeding stage (m+1) (m=2, 3, ..., b).

According to yet another aspect of the present invention, there is provided a product-sum calculation unit integrated circuit apparatus arrangement comprising:

first and second product-sum calculation unit integrated circuit apparatuses, each of said first and second product-sum calculation unit integrated circuit apparatuses comprising:

a plurality of N product-sum calculation apparatuses (k) (k=1, 2, 3, ..., N), each of plurality of N product-sum calculation apparatuses (k) comprising:

a barrel shifter for shifting the first input data by a predetermined number of bits based on the second input data, and outputting a shifted data;

an adder having first and second input terminals, for adding up the shifted data outputted from said barrel shifter and inputted through said first input terminal of said adder, and data inputted through said second input terminal of said adder, and outputting data of an addition result;

a register for temporarily storing data outputted from said adder, outputting a stored data to said adder through said second input terminal of said adder, and outputting the stored data through said output terminal; and a multiplexer having first and second input terminals, for selecting either one of third input data inputted through said first input terminal of said multiplexer, and data inputted through said second input terminal of said multiplexer, and outputting a selected data to said adder through said second input terminal of said adder, whereby each of said product-sum calculation apparatuses (k) calculates a product of the first input data and the second input data, calculates a sum of a calculated product and the third input data, and outputs a calculated sum from said output terminal; and data conversion means provided in parallel to said plurality of N product-sum calculation apparatuses (k), said data conversion means comprising:

data compression means for converting the second input data into such compressed data having bits signals that the number of the bit signals whose bit status is "1" is not larger than a predetermined restrictive number smaller than a bit width of the second input data; and a bit-position encoder for generating and outputting bit-position data representing bit positions of bit signals whose bit status is "1" out of the compressed data, to said barrel shifter of each said product-sum calculation apparatus (k), wherein said product-sum calculation apparatus of a first stage (k) (k=1) calculates a product of data inputted through a first input terminal and the second input data, calculates a sum of a calculated product and third input data, and outputs data of a calculated sum, wherein each of said product-sum calculation apparatuses (k) (k=2, 3, ..., N−1), based on the bit-position data inputted through an input terminal, calculates a product of data inputted through a k-th input terminal other than said input terminal through which the bit-position data is inputted, and the second input data, calculates a sum of a calculated product and the data of the sum outputted from said product-sum calculation apparatus of preceding stage (k−1), and outputs data of a calculated sum to said product-sum calculation apparatus of succeeding stage (k+1), and wherein said product-sum calculation apparatus of final stage (k) (k=N), based on the bit-position data, calculates a product of data inputted through an N-th input terminal, and the second input data, and calculates a sum of a calculated product and the data of the calculated sum outputted from said product-sum calculation apparatus of preceding stage (k) (k=N−1), and outputs data of a calculated sum, wherein each of said first and second product-sum calculation unit integrated circuit apparatuses further comprises output-use storage means for temporarily storing the data of the calculated sum outputted from said product-sum calculation apparatus of the final stage (k) (k=N), and outputting a stored data, wherein said product-sum calculation unit integrated circuit apparatus arrangement further comprises an adder for adding up data outputted from said first product-sum calculation unit integrated circuit apparatus and data outputted from said second product-sum calculation unit integrated circuit apparatus, and outputting data of an addition result.

According to a further aspect of the present invention, there is provided a product-sum calculation unit integrated circuit apparatus arrangement comprising:

a plurality of c product-sum calculation unit integrated circuit apparatuses (m) (m=1, 2, 3, ..., c), each of said plurality of c product-sum calculation unit integrated circuit apparatuses (m) comprising:

a plurality of N product-sum calculation apparatuses (k) (k=1, 2, 3, ... N), each of plurality of N product-sum calculation apparatuses (k) comprising:

a barrel shifter for shifting the first input data by a predetermined number of bits based on the second input data, and outputting a shifted data;

an adder having first and second input terminals, for adding up the shifted data outputted from said barrel shifter and inputted through said first input terminal of said adder, and data inputted through said second input terminal of said adder, and outputting data of an addition result;

a register for temporarily storing data outputted from said adder, outputting a stored data to said adder through said second input terminal of said adder, and outputting the stored data through said output terminal; and a multiplexer having first and second input terminals, for selecting either one of third input data inputted through said first input terminal of said multiplexer, and data inputted through said second input terminal of said multiplexer, and outputting a selected data to said adder through said second input terminal of said adder, whereby each of said product-sum calculation apparatuses (k) calculates a product of the first input data and the second input data, calculates a sum of a calculated product and the third input data, and outputs a calculated sum from said output terminal; and data conversion means provided in parallel to said plurality of N product-sum calculation apparatuses (k), said data conversion means comprising:

data compression means for converting the second input data into such compressed data having bit signals that the number of the bit signals whose bit status is "1" is not larger than a predetermined restrictive number smaller than a bit width of the second input data; and a bit-position encoder for generating and outputting bit-position data representing bit positions of bit signals whose bit status is "1" out of the compressed data, to said barrel shifter of each said product-sum calculation apparatus (k), wherein said product-sum calculation apparatus of a first stage (k) (k=1) calculates a product of data inputted through a first input terminal and the second input data, calculates a sum of a calculated product and third input data, and outputs data of a calculated sum, wherein each of said product-sum calculation apparatuses (k) (k=2, 3, ..., N−1), based on the bit-position data inputted through an input terminal, calculates a product of data inputted through a k-th input terminal other than said input terminal through which the bit-position data is inputted, and the second input data, calculates a sum of a calculated product and the data of the sum outputted from said product-sum calculation apparatus of preceding stage (k−1), and outputs data of a calculated sum to said product-sum calculation apparatus of succeeding stage (k+1), and wherein said product-sum calculation apparatus of final stage (k) (k=N), based on the bit-position data, calculates a product of data inputted through an N-th input terminal, and the second input data, and calculates a sum of a calculated product and the data of the calculated sum outputted from said product-sum calculation apparatus of preceding stage (k) (k=N−1), and outputs data of a calculated sum, wherein each of said plurality of c product-sum calculation unit integrated circuit apparatuses (m) (m=1, 2, ..., c) further comprises output-use storage means for temporarily storing the data of the calculated sum outputted from said product-sum calculation apparatus of the final stage (k) (k=N), and outputting a stored data, wherein said product-sum calculation unit integrated circuit apparatus arrangement further comprises:

(c−1) of adders (p) (p=1, 2, ..., c−1); and (c−2) of conjunction storage means (q) (q=1, 2, ..., c−2), wherein said adder (p) (p=1) adds up the data outputted from said product-sum calculation unit integrated circuit apparatus of a first stage (m) (m=1) and the data outputted from said product-sum calculation unit integrated circuit apparatus of a second stage (m) (m=2), and outputs data of an addition result, wherein each of said adders (p) (p=2, 3, ..., c−2) adds up the data outputted from said product-sum calculation unit integrated circuit apparatus of the m-th stage (m) (m=3, 4, . . . , c−1) and the stored data outputted from said conjunction storage means (q−1) (q=2, 3, . . . , c−2), and outputs data of an addition data, wherein said conjunction storage means (q) (q=1, 2, . . . , c−2) temporarily holds data of the addition data outputted from said adder (p) (p=1, 2, . . . , c−2) for a period of a predetermined cycle, and outputs a held data to said adder (p+1) (p=1, 2, . . . , c−2), and wherein said adder (p) (p=c−1) adds up the data outputted from said product-sum calculation unit integrated circuit apparatus of the c-th stage (m) (m=c) and the data outputted from said conjunction storage means (q) (q=c−2), and outputs data of an addition result.

According to a still further aspect of the present invention, there is provided a product-sum calculation unit integrated circuit apparatus arrangement comprising:

a plurality of (c×b) product-sum calculation unit integrated circuit apparatuses (m, n) (m=1, 2, . . . , c; n=1, 2, . . . , b), each of said plurality of (c×b) product-sum calculation unit integrated circuit apparatuses (m, n) comprising:

a plurality of N product-sum calculation apparatuses (k) (k=1, 2, 3, . . . , N), each of plurality of N product-sum calculation apparatuses (k) comprising:

a barrel shifter for shifting the first input data by a predetermined number of bits based on the second input data, and outputting a shifted data;

an adder having first and second input terminals, for adding up the shifted data outputted from said barrel shifter and inputted through said first input terminal of said adder, and data inputted through said second input terminal of said adder, and outputting data of an addition result;

a register for temporarily storing data outputted from said adder, outputting a stored data to said adder through said second input terminal of said adder, and outputting the stored data through said output terminal; and a multiplexer having first and second input terminals, for selecting either one of third input data inputted through said first input terminal of said multiplexer, and data inputted through said second input terminal of said multiplexer, and outputting a selected data to said adder through said second input terminal of said adder, whereby each of said product-sum calculation apparatuses (k) calculates a product of the first input data and the second input data, calculates a sum of a calculated product and the third input data, and outputs a calculated sum from said output terminal; and data conversion means provided in parallel to said plurality of N product-sum calculation apparatuses (k), said data conversion means comprising:

data compression means for converting the second input data into such compressed data having bit signals that the number of the bit signals whose bit status is "1" is not larger than a predetermined restrictive number smaller than a bit width of the second input data; and a bit-position encoder for generating and outputting bit-position data representing bit positions of bit signals whose bit status is "1" out of the compressed data, to said barrel shifter of each said product-sum calculation apparatus (k), wherein said product-sum calculation apparatus of a first stage (k) (k=1) calculates a product of data inputted through a first input terminal and the second input data, calculates a sum of a calculated product and third input data, and outputs data of a calculated sum, wherein each of said product-sum calculation apparatuses (k) (k=2, 3, . . . , N−1), based on the bit-position data inputted through an input terminal, calculates a product of data inputted through a k-th input terminal other than said input terminal through which the bit-position data is inputted, and the second input data, calculates a sum of a calculated product and the data of the sum outputted from said product-sum calculation apparatus of preceding stage (k−1), and outputs data of a calculated sum to said product-sum calculation apparatus of succeeding stage (k+1), and wherein said product-sum calculation apparatus of final stage (k) (k=N), based on the bit-position data, calculates a product of data inputted through an N-th input terminal, and the second input data, and calculates a sum of a calculated product and the data of the calculated sum outputted from said product-sum calculation apparatus of preceding stage (k) (k=N−1), and outputs data of a calculated sum, wherein each of said plurality of (c×b) product-sum calculation unit integrated circuit apparatuses (m, n) (m=1, 2, . . . , c; n=1, 2, . . . , b) further comprises output-use storage means for temporarily storing the data of the calculated sum outputted from said product-sum calculation apparatus of the final stage (k) (k=N), and outputting a stored data, wherein each of a plurality of c groups of product-sum calculation unit integrated circuit apparatuses (m) (m=1, 2, . . . , c) comprises a plurality of b product-sum calculation unit integrated circuit apparatuses (n) (n=1, 2, . . . , b) wherein said plurality of b product-sum calculation unit integrated circuit apparatuses (n) (n=1, 2, . . . , b) of each of said plurality of c groups of product-sum calculation unit integrated circuit apparatuses (m) (m=1, 2, . . . , c) are connected in series so that data outputted from said output-use storage means of each of said product-sum calculation unit integrated circuit apparatuses (n) (n=1, 2, . . . , b−1) is outputted to each of said product-sum calculation unit integrated circuit apparatuses of the succeeding stage (n) (n=2, . . . , b), wherein said product-sum calculation unit integrated circuit apparatus arrangement further comprises:

(c−1) of adders (p) (p=1,2, . . . , c−1); and (c−2) of conjunction storage means (q) (q=1, 2, . . . , c−2), wherein said adder (p) (p=1) adds up the data outputted from said product-sum calculation unit integrated circuit apparatus of the last stage (n) (n=b) of a first group (m) (m=1) and the data outputted from said product-sum calculation unit integrated circuit apparatus of the last stage (n) (n=b) of a second group (m) (m=2), and outputs data of an addition result, wherein each of said adders (p) (p=2, 3, . . . , c−2) adds up the data outputted from said product-sum calculation unit integrated circuit apparatus of the last stage (n) (n=b) of the m-th group (m) (m=3, 4, . . . , c−1) and the stored data outputted from said conjunction storage means (q−1) (q=2, 3, . . . , c−2), and outputs data of an addition data, wherein said conjunction storage means (q) (q=1, 2, . . . , c−2) temporarily holds data of the addition data outputted from said adder (p) (p=1, 2, . . . , c−2) for a period of a predetermined cycle, and outputs a held data to said adder (p+1) (p=1, 2, . . . , c−2), and wherein said adder (p) (p=c−1) adds up the data outputted from said product-sum calculation unit integrated circuit of the last stage (n) (n=b) of the c-th group (m) (m=c) and the data outputted from said conjunction storage means (q) (q=c−2), and outputs data of an addition result.

According to yet another aspect of the present invention, there is provided a cumulative adder comprising:

a plurality of adders, each of said adders having a first input terminal, a second input terminal, an output terminal, a carry input terminal, and a carry output terminal, each of said adders adding up two data respectively inputted through said first and second input terminals, generating a carry signal representing an overflow upon said addition, outputting data an addition result through said output terminal, and outputting the carry signal through said carry output terminal; and a register for temporarily storing the data outputted from said output terminals of said adders and the carry signals outputted from said carry output terminals of said adders, and outputting the stored data and the carry signals, wherein either one of bit data of a partial bit range of said cumulative adder stored in said register and a predetermined initial value data is inputted to the first input terminal of each of said adders, wherein bit data of each bit range corresponding to the first input terminal of each of said adders are inputted to the second input terminal of each of said adders, and wherein a carry signal outputted from said carry output terminal of said adder which processes the lower-order bit range out of the bit ranges processed by said adders is inputted through said register to said carry input terminal of said adder which processes the higher-order bit range.

According to yet another aspect of the present invention, there is provided a product-sum calculation apparatus comprising:

a cumulative adder, said cumulative adder comprising:

a plurality of adders, each of said adders having a first input terminal, a second input terminal, an output terminal, a carry input terminal, and a carry output terminal, each of said adders adding up two data respectively inputted through said first and second input terminals, generating a carry signal representing an overflow upon said addition, outputting data an addition result through said output terminal, and outputting the carry signal through said carry output terminal; and a register for temporarily storing the data outputted from said output terminals of said adders and the carry signals outputted from said carry output terminals of said adders, and outputting the stored data and the carry signals, wherein either one of bit data within a partial bit range of said cumulative adder and a predetermined initial value data is inputted to the first input terminal of each of said adders through said register, wherein bit data of each bit range corresponding to each of said adders are inputted to the second input terminal of each of said adders, and wherein a carry signal outputted from said carry output terminal of said adder which processes the lower-order bit range out of the bit ranges processed by said adders is inputted through said register to said carry input terminal of said adder which processes the higher-order bit range, wherein said product-sum calculation apparatus further comprises:

data compression means for converting first input data into such compressed data having bit signals that the number of the bit signals whose bit status is "1" is not larger than a predetermined restrictive number smaller than bit width of the first input data;

a bit-position encoder for generating bit-position data representing bit positions of the bit signals whose bit status is "1" out of the compressed data, and outputting the bit-position data; and a barrel shifter for shifting second input data based on the bit-position data outputted from said bit-position encoder, and outputting data of respective bit ranges corresponding to respective ones of said adders out of the shifted data, to the second input terminal of each of said adders.

According to the above-mentioned invention, the following advantageous effects are provided.

The product-sum calculation apparatus according to the first aspect of the present invention includes the barrel shifter, the adder, and the register. Therefore, the product-sum calculation apparatus can be reduced in circuit area, as compared with the prior art product-sum calculation apparatus using a multiplier.

Also, the product-sum calculation apparatus according to the second aspect of the present invention further includes a multiplexer in the product-sum calculation apparatus of the first aspect thereof. Therefore, the product-sum calculation apparatus can produce output data by adding the product of first input data and second input data, to third input data.

Further, the product-sum calculation apparatus according to the third aspect of the present invention further includes the bit-position encoder in the product-sum calculation apparatus of the first or second aspect of the present invention, and then, the calculation corresponding to a bit signal whose bit status is "zero" out of the second input data can be thinned out or decimated. Therefore, the product-sum calculation apparatus can be reduced in calculation processing time, as compared with any product-sum calculation apparatus not using the bit-position encoder.

Still further, in the product-sum calculation apparatus according to the fourth aspect of the present invention, the bit-position encoder includes the first, second, and third delay flip-flops, and a pair of selectors, so that the product-sum calculation apparatus can detect the positions of bit signals whose bit status is "1" out of the second input data, and then output positional data representing the positions.

Also, in the product-sum calculation apparatus according to the fifth aspect of the present invention, the bit-position encoder detects the position of a bit signal whose predetermined number of bit statuses is "1" from the higher-order digits of the second input data, and then, outputs positional data. Therefore, the product-sum calculation apparatus is allowed to thin out or decimate calculation processes for bit signals that are located at lower orders out of the bit signals of the second input data and that would relatively less affect calculated results, so that the calculation processing time can be reduced.

Further, in the product-sum calculation apparatus according to the sixth aspect of the present invention, the bit-position encoder includes the counter and the comparator, wherein the product-sum calculation apparatus ends or finishes the position detection when the number of shifts is larger than a predetermined number of shifts. As a result, the product-sum calculation apparatus of the sixth aspect of the present invention is allowed to thin out or decimate calculation processes for bit signals that are located at lower orders out of the bit signals of the second input data and that would relatively less affect calculated results.

Yet further, the product-sum calculation apparatus according to the seventh aspect of the present invention includes the data compression means, and then, the second input data is converted into such compressed data that the number of bit signals whose bit status is "1" is not larger than a predetermined restrictive number smaller than the bit width of the second input data. Thus, the product-sum calculation apparatus can be enhanced in processing speed.

Also, in the product-sum calculation apparatus according to the eighth aspect of the present invention, the data compression means converts the second input data into such compressed data that the number of digits is the same as that of the input data, that the number of bit signals whose bit status is "1" is not larger than the restrictive number, and that the difference from the second input data is the minimum, as its output. As a result, the product-sum calculation apparatus of the eighth aspect of the present invention can be reduced in calculation error and enhanced in processing speed.

Further, in the product-sum calculation apparatus according to the ninth aspect of the present invention, the data compression means converts the second input data into such compressed data that the number of digits is one digit larger than that of the second input data, that the number of bit signals whose bit status is "1" is not larger than the restrictive number, and that the difference from the second input data is the minimum, as its output. Thus, the product-sum calculation apparatus of the ninth aspect of the present invention can be enhanced in processing speed like the product-sum calculation apparatus of the eighth aspect of the present invention, and reduced in calculation error as compared with the product-sum calculation apparatus of the eighth aspect of the present invention.

Still further, in the product-sum calculation apparatus according to the tenth aspect of the present invention, the data compression means outputs a number F of bit signals whose bit status is "1" out of the compressed data, and the bit-position encoder outputs bit-position data representing the bit positions of bit signals whose bit status is "1" out of the number F, and thereafter starts the processing of the next compressed data. As a result, the bit-position encoder can execute processing without any waiting time, so that the product-sum calculation apparatus of the tenth aspect of the present invention can be enhanced in processing speed.

Also, in the product-sum calculation apparatus according to the eleventh aspect of the present invention, the data conversion means processes calculations by conversion to data which is obtained by adding positive and negative numerical values whose absolute values are powers of 2. Thus, the product-sum calculation apparatus of the eleventh aspect of the present invention can be reduced in conversion error.

Further, the product-sum calculation apparatus according to the twelfth aspect of the present invention includes one bit-position encoder and a plurality of product-sum calculation apparatuses, wherein the bit-position encoder outputs bit-position data to the individual product-sum calculation apparatuses. Thus, the circuit area can be reduced.

Also, the product-sum calculation unit integrated circuit apparatus according to the thirteenth aspect of the present invention includes a data conversion means and a plurality of product-sum calculation apparatuses. The data conversion means outputs bit-position data to each product-sum calculation apparatus, and each product-sum calculation apparatus adds up a multiplication result of the product-sum calculation apparatus and a calculated result outputted from the preceding-stage product-sum calculation apparatus, and outputs the resulting data. Thus, according to the product-sum calculation unit integrated circuit apparatus of the thirteenth aspect of the present invention, there can be provided a product-sum calculation unit integrated circuit apparatus which can be reduced in processing time to a large extent.

Further, the product-sum calculation unit integrated circuit apparatus according to the fourteenth aspect of the present invention includes the storage means, and then, the processible kernel image data can be increased in size without increasing the circuit scale or cost.

Also, in the product-sum calculation unit integrated circuit apparatus according to the fifteenth aspect of the present invention, the storage means can store a plurality of M data. Thus, there can be provided a product-sum calculation unit integrated circuit apparatus which does not need to provide any external buffer memory.

Still further, in the product-sum calculation unit integrated circuit apparatus according to the sixteenth aspect of the present invention, the number M of data that can be stored in the storage means can be predetermined from an external unit. Thus, the size of data that can be arithmetically processed or calculated can be changed.

Further, the product-sum calculation unit integrated circuit apparatus according to the seventeenth aspect of the present invention includes an output-use storage means in the product-sum calculation unit integrated circuit apparatus of the thirteenth, fourteenth, fifteenth, or sixteenth aspect of the present invention, and then, the timing for output can be adjusted. Thus, connection with other devices or elements becomes easier to accomplish.

Still further, the product-sum calculation unit integrated circuit apparatus according to the eighteenth aspect of the present invention includes a plurality of "b" product-sum calculation unit integrated circuit apparatuses of the seventeenth aspect of the present invention. Thus, the size of the first input data that can be arithmetically processed or calculated can be enlarged in one direction up to "b" times that of the product-sum calculation unit integrated circuit apparatus of the seventeenth aspect of the present invention.

Also, the product-sum calculation unit integrated circuit apparatus according to the nineteenth aspect of the present invention includes two product-sum calculation unit integrated circuit apparatuses of the seventeenth aspect of the present invention and adders for adding up calculated results outputted from the product-sum calculation unit integrated circuit apparatuses. Thus, the size of the first input data that can be arithmetically processed or calculated can be enlarged in a direction different from that in the eighteenth aspect of the present invention, to "b" times that of the product-sum calculation unit integrated circuit apparatus of the seventeenth aspect.

Further, the product-sum calculation unit integrated circuit apparatus according to the twentieth aspect of the present invention includes a plurality of "c" product-sum calculation unit integrated circuit apparatuses (k) (k=1, 2, 3, . . . , c) of the seventeenth or eighteenth aspect of the present invention. Thus, the size of the first input data that can be arithmetically processed or calculated can be enlarged up to "c" times that of the product-sum calculation unit integrated circuit apparatuses (k) (k=1, 2, 3, . . . , c).

Further, the cumulative adder according to the twenty-first aspect of the present invention includes a plurality of adders and a register, wherein a carry signal outputted from a carry output terminal of the adder that processes a lower-order bit range out of the bit range processed by the adders is inputted to the carry input terminal of each adder through the register. Thus, one-time addition time can be reduced so that the cumulative addition time can be reduced.

Yet further, the product-sum calculation apparatus according to the twenty-second aspect of the present invention includes the cumulative adder, and can be reduced in addition time. As a result, the product-sum calculation time can be reduced.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numeral and in which:

FIG. 14B is a block diagram showing a configuration of a line buffer 82a;

FIGS. 15A, 15B, 15C, 15D, 15E, 15F and 15G are block diagrams showing calculation flows of data in the product-sum calculation unit integrated circuit apparatus PS8 of FIG. 13, wherein FIG. 15A is a block diagram showing a calculated result of a fundamental processing unit PU1 for a cycle T=1, FIG. 15B is a block diagram showing a calculated result of a fundamental calculation unit PU2 for a cycle T=2, FIG. 15C is a block diagram showing a calculated result of a fundamental calculation unit PU3 for a cycle T=3, FIG. 15D is a block diagram showing stored data of a register BR1 for a cycle T=4, FIG. 15E is a block diagram showing stored data of a register BR2 for a cycle T=5, FIG. 15F is a block diagram showing stored data of a register BR3 for a cycle T=6, and FIG. 15G is a block diagram showing a calculated result of a fundamental calculation unit PU4 for a cycle T=7;

FIG. 16A is a diagram showing input image data inputted to the product-sum calculation unit integrated circuit apparatus PS8 of FIG. 13;

FIG. 16B is a diagram showing a 3×2 kernel image data of the input image data shown in FIG. 16A;

FIG. 17 is a block diagram showing a 16×16 Laplacian filter which is used as a kernel image data to evaluate effects of conversion errors on the image convolution integral in the product-sum calculation unit integrated circuit apparatus PS8 of FIG. 13;

FIG. 23 is a block diagram showing a configuration of a product-sum calculation unit integrated circuit apparatus PS11 of the eleventh preferred embodiment according to the present invention;

FIG. 24 is a block diagram showing a 6×2 kernel image data used for explaining a calculation process of the product-sum calculation unit integrated circuit apparatus PS11 of FIG. 23;

FIG. 25 is a block diagram showing a product-sum calculation apparatus PM11a constructed by connecting b product-sum calculation unit integrated circuit apparatuses PS10 (PS10-1 to PS10-b) of FIG. 22 in series with each other;

DETAILED DESCRIPTION OF THE PREFERRED EMBODIMENTS

Preferred embodiments according to the present invention will be described below with reference to the attached drawings.

First Preferred Embodiment

A product-sum calculation apparatus PM1 of the first preferred embodiment according to the present invention is described with reference to FIG. 1. The product-sum calculation apparatus PM1 of the first preferred embodiment is a product-sum calculation circuit for calculating a sum of a product of first input data 105 multiplied by second input data 106, and third input data 107.

Figure 1:
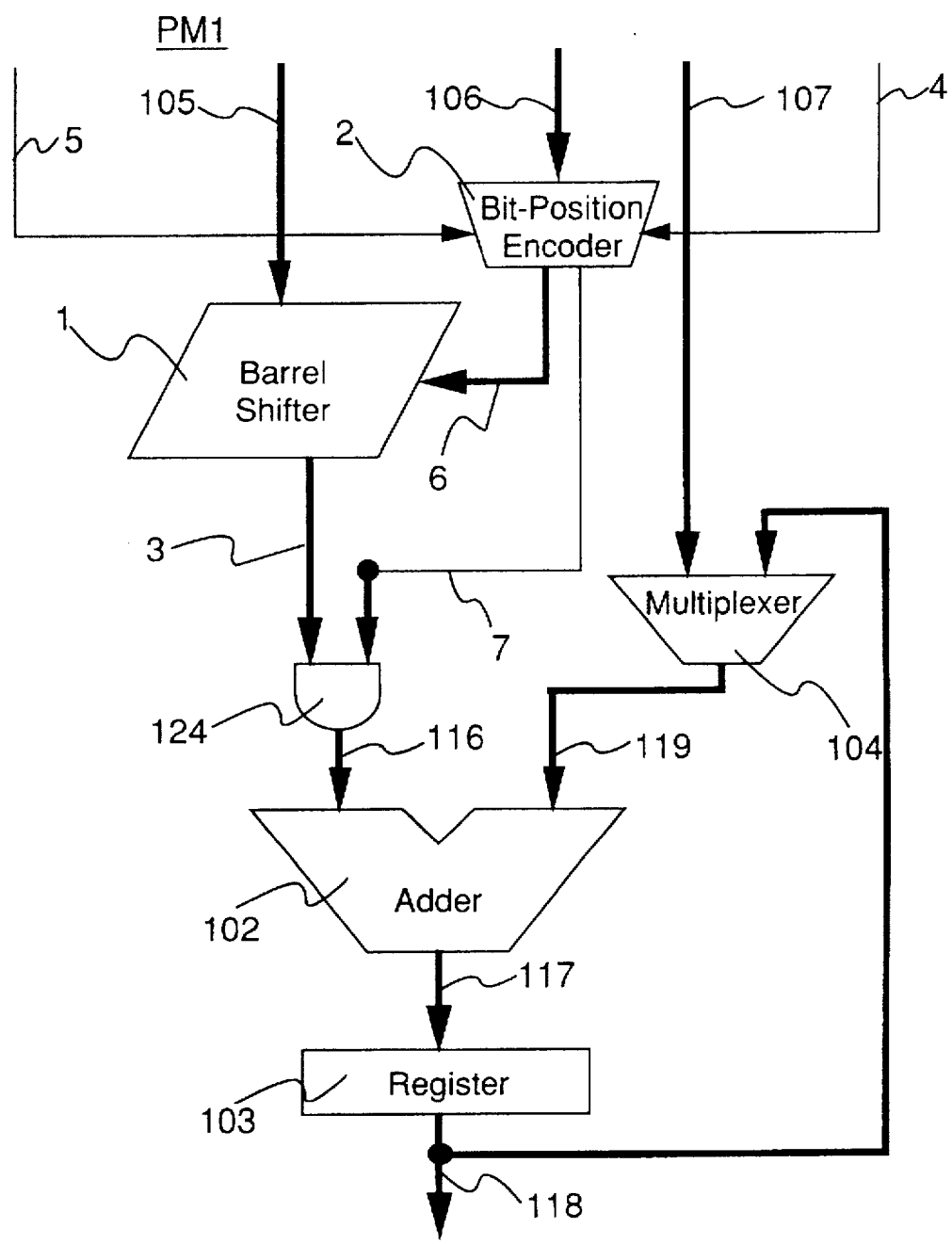
FIG. 1 is a block diagram showing a configuration of a product-sum calculation apparatus PM1 of the first preferred embodiment according to the present invention.

Referring to FIG. 1, the product-sum calculation apparatus PM1 of the first preferred embodiment includes a barrel shifter 1, a bit-position encoder 2, an adder 102, a register 103, a multiplexer 104, and an AND gate array 124, and has the following features:

(1) The bit-position encoder 2, on receiving each bit-position encoder shift signal 5 (clock signal), encodes or detects a bit position or digit position where the bit status of the second input data 106 is "1", sequentially from the low or high order as detailed later. Then the bit-position encoder 2 outputs bit-position encode data 6 (shift bit width control signal) representing bit positions where the bit status of the second input data 106 is "1", to the barrel shifter 1, while the bit-position encoder 2 also outputs a bit-position encode non-end signal 7 to the AND gate array 124.

(2) The barrel shifter 1 shifts the first input data 105 by the number of bits shown by the bit-position encode data 6 (shift bit width control signal), and outputs barrel shift data 3, which is the data resulting from shifting the first input data 105, to the AND gate array 124.

It is noted that a bit width of data is defined as the number of bits of a set or piece of data.

Figure 2:
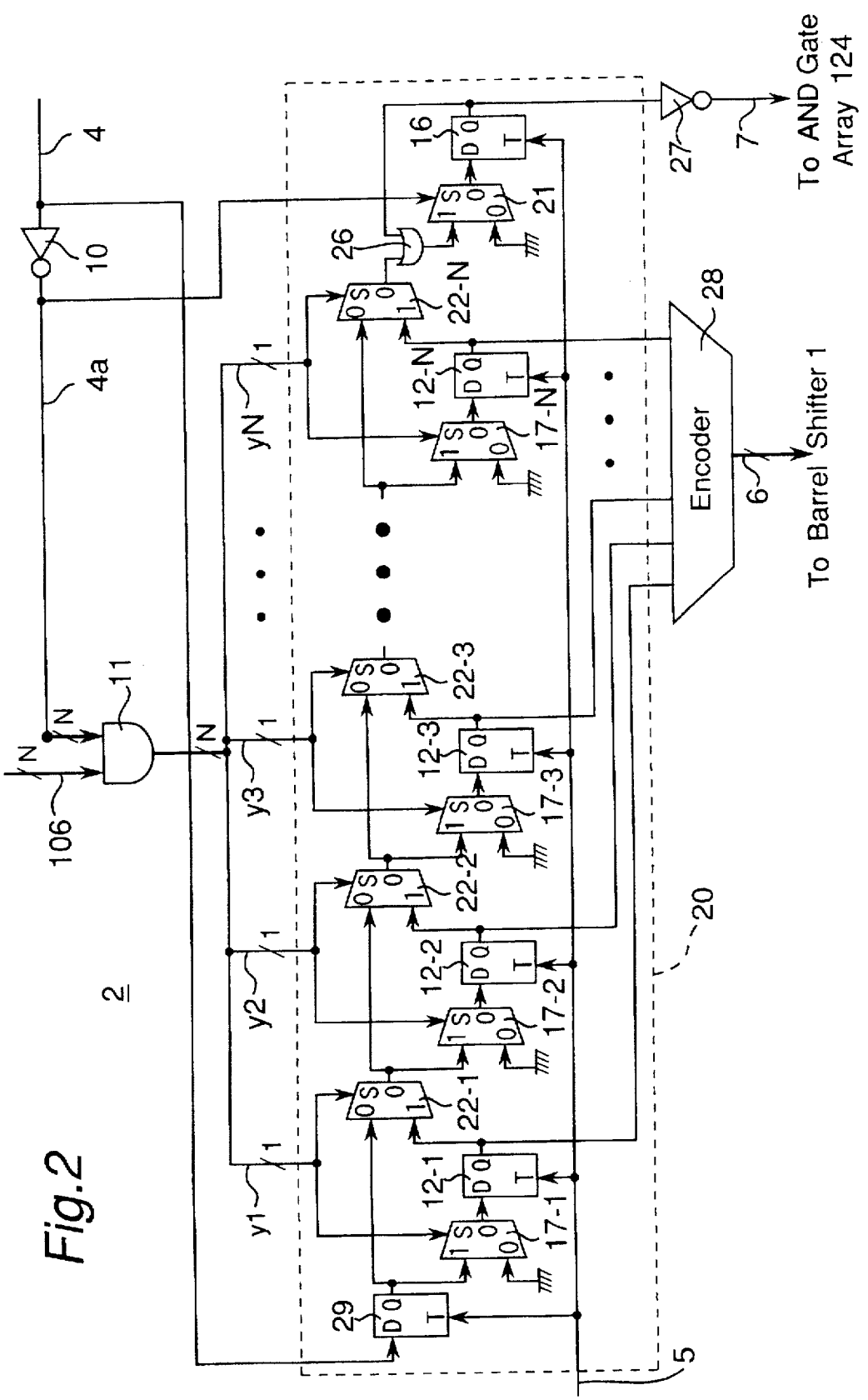
FIG. 2 is a block diagram showing a configuration of the bit-position-encoder 2 of FIG. 1.

The configuration of the product-sum calculation apparatus PM1 of the first preferred embodiment is described in detail below. With reference to FIG. 2, the configuration of the bit-position encoder 2 is explained.

Referring to FIG. 2, the bit-position encoder 2 includes the followings:

(a) a shift register 20 composed of delay type flip-flops (hereinafter, referred to as D type flip-flops) 12-1 to 12-N, 16 and 29, selectors 17-1 to 17-N, 21 and 22-1 to 22-N, and an OR gate 26;

(b) an AND gate array 11;

(c) inverters 10 and 27; and (d) an encoder 28.

The inverter 10 inverts the logic of an input bit-position encoder reset signal 4, and then, outputs a bit-position encoder reset signal 4a of the inverted logic to the AND gate array 11 and the selector 21. The AND gate array 11 outputs the second input data 106 when the bit status of the bit-position encoder reset signal 4a is "1", and then, outputs a signal with all the bit signals set to "zero" when the bit status of the bit-position encoder reset signal 4a is "zero". At this time, the AND gate array 11 outputs a bit signal y1 of the most significant bit out of the output data, to the selector 17-1 and the selector 22-1, outputs a bit signal y2 of the next place or bit to the selector 17-2 and the selector 22-2, and likewise outputs a bit signal yk of the k-th highest place or significant bit (k=3, 4, . . . , N) to the selector 17-k and the selector 22-k.

In the shift register 20, the D type flip-flop 29 outputs the stored bit signal of "1" or "zero" to the selector 17-1 and the selector 22-1 in response to the bit-position encoder shift signal 5 and a clock signal, while the D type flip-flop 29 also newly stores a bit signal of the input bit-position encoder reset signal 4.

The selector 17-1, in response to the bit status of the bit signal y1 inputted from the AND gate array 11, outputs to the D type flip-flop 12-1 a bit signal inputted from the D type flip-flop 29 when the bit status of the bit signal y1 is "1", and then, outputs a bit signal whose bit status is "zero" to the D type flip-flop 12-1 when the bit status of the bit signal y1 is "zero". The D type flip-flop 12-1 outputs the stored bit signal to the selector 22-1 and the encoder 28 in response to the bit-position encoder shift signal 5, while the D type flip-flop 12-1 also newly stores a bit signal inputted from the selector 17-1. In response to the bit status of the highest-order bit signal y1 inputted from the AND gate array 11, the selector 22-1 outputs a bit signal inputted from the D type flip-flop 12-1 to the selector 17-2 and the selector 22-2 when the bit status of the bit signal y1 is "1", and then, outputs a signal inputted from the D type flip-flop 29 to the selector 17-2 and the selector 22-2 when the bit status of the highest-order bit signal is "zero". That is, a pair of selectors 17-1 and selector 22-1 transmit a bit signal outputted from the D type flip-flop 29 through the D type flip-flop 12-1 when the bit status of the bit signal y1 is "1", and transmit a bit signal outputted from the D type flip-flop 29 without any intervention of the D type flip-flop 12-1 when the bit status of the bit signal y1 is "zero".

Likewise, the selector 17-k (k=2, . . . , N), in response to the bit status of a bit signal yk of the k-th highest place or significant bit inputted from the AND gate array 11, outputs to the D type flip-flop 12-k a bit signal inputted from the selector 22-(k−1) when the bit status of the bit signal yk is "1", and outputs to the D type flip-flop 12-k a bit signal whose bit status is "zero" when the bit status of the bit signal yk is "zero". The D type flip-flop 12-k (k=2, . . . , N), in response to the bit-position encoder shift signal 5, outputs the stored bit status to the selector 22-k and the encoder 28 while the D type flip-flop 12-k also newly stores the bit status of a bit signal inputted from the selector 17-k.

The selector 22-k (k=2, . . . , N−1), in response to the bit status of a bit signal yk inputted from the AND gate array 11, outputs to the selector 17-(k+1) and the selector 22-(k+1) a bit signal inputted from the D type flip-flop 12-k when the bit status of the bit signal yk is "1", and outputs to the selector 17-(k+1) and the selector 22-(k+1) a signal inputted from the selector 22-(k−1) when the bit status of the bit signal yk is "zero". That is, a pair of selector 17-k and selector 22-k transmit a bit signal outputted from the D type flip-flop 29 through the D type flip-flop 12-k when the bit status of the bit signal yk is "1", and transmit a bit signal outputted from the D type flip-flop 29 without any intervention of the D type flip-flop 12-k when the bit status of the bit signal yk is "zero".

The selector 22-N, in response to the bit status of a bit signal yN inputted from the AND gate array 11, outputs to the OR gate 26 a bit signal inputted from the D type flip-flop 12-N when the bit status of the bit signal yN is "1", and outputs to the OR gate 26 a bit signal inputted from the selector 22-(N−1) when the bit status of the bit signal yN is "zero".

The OR gate 26 outputs a bit signal whose bit status is "1" when the bit status of either one of a bit signal outputted from the selector 22-N or a bit signal outputted from the D type flip-flop 16 is "1", and outputs a bit signal whose bit status is "zero" when the bit status of both of them is "zero". The selector 21, in response to the bit status of the bit-position encoder reset signal 4a inputted from the inverter 10, outputs to the D type flip-flop 16 a bit signal outputted from the OR gate 26 when the bit status of the bit-position encoder reset signal 4a is "1", and outputs to the D type flip-flop 16 a bit signal whose bit status is "zero", when the bit status of the bit-position encoder reset signal 4a is "zero". The D type flip-flop 16 stores the signal outputted from the selector 21 and then, in response to the bit-position encoder shift signal 5, outputs the stored signal to the OR gate 26 and the inverter 27.

The shift register 20 having the above-described configuration transfers a signal outputted from the D type flip-flop 29, sequentially to the D type flip-flop 12-k corresponding to the bit signal yk whose bit status is "1", in response to the bit-position encoder shift signal 5, and further outputs to the encoder 28 a signal representing the position of the D type flip- flop 12-k to which the signal outputted from the D type flip-flop 29 has been transferred. Then, the shift register 20 outputs to the inverter 27 a signal whose bit status is "zero" in response to the bit-position encoder shift signal 5, while a signal whose bit status is "1" and which has been outputted from the D type flip-flop 29 is being transferred to any of the D type flip-flops 12-1 to 12-N.

The inverter 27 inverts the logic of a bit signal outputted from the D type flip-flop 16, and outputs a bit-position encode non-end signal 7, which is the resulting logically inverted signal, to the AND gate array 124. Thus, the final-stage circuit of the shift register 20, which comprises the OR gate 26, the selector 21, the D type flip-flop 16, and the inverter 27, outputs to the AND gate array 124 a bit-position encode non-end signal 7 whose bit status is "1" in response to each pulse of the bit-position encoder shift signal 5 until a signal whose bit status is "1" is transferred to the D type flip-flop 16, and then outputs a bit-position encode non-end signal 7 whose bit status is "zero" in response to a pulse after a signal whose bit status is "1" is transferred to the D type flip-flop 16.

The encoder 28 detects the positions of bit signals whose bit status is "1" out of the second input data, based on signals outputted from the D type flip-flops 12-1 to 12-N, and outputs bit-position encode data 6, which is a signal representing the position of the relevant bit signals, to the barrel shifter 1. The bit-position encoder 2 is constructed as described above.

The barrel shifter 1 shifts the first input data 105 inputted thereto to the higher-order side by the number of bits shown by the bit-position encode data 6 outputted from the bit-position encoder 2, and outputs barrel shift data 3, which is the signal resulting from the bit shift, to the AND gate array 124.

The AND gate array 124 outputs to the adder 102 addition input data 116 equal to the barrel shift data 3 when the bit status of the bit-position encode non-end signal 7 is "1". The multiplexer 104 outputs either one of third input data 107 inputted thereto or cumulative addition resulting data 118 inputted from the register 103, to the adder 102. The adder 102 adds up the addition input data 116 inputted from the AND gate array 124 and the data inputted from the multiplexer 104, and outputs added-up addition resulting data 117 to the register 103. The register 103, upon receiving the input data of the addition resulting data 117, outputs cumulative addition resulting data 118 that has been stored therein, to external circuits and the multiplexer 104, and further stores the input addition resulting data 117. The product-sum calculation apparatus PM1 of the first preferred embodiment is constructed in the way as described above.

Next explained hereinafter is the calculation process of the product-sum calculation apparatus PM1 of the first preferred embodiment constructed as described above. As shown in FIG. 1, in the product-sum calculation apparatus PM1, the first input data 105 is inputted to the barrel shifter 1, whereas the second input data 106, the bit-position encoder reset signal 4, and the bit-position encoder shift signal 5 are inputted to the bit-position encoder 2. It is assumed in the following explanation that neither the first input data 105 nor the second input data 106 changes until the bit status of the bit-position encode non-end signal 7 goes "zero".

First, when a bit-position encoder reset signal 4 whose bit status is "1" and a bit-position encoder shift signal 5 (clock signal) are provided, the D type flip-flop 29 receives inputs of the bit-position encoder reset signal 4 whose bit status is "1" and the bit-position encoder shift signal 5 (clock signal), so that a bit status "1" is stored in the D type flip-flop 29. Further, the AND gate array 11 receives input data of a bit-position encoder reset signal 4a whose bit status is "zero" with the logic inverted by the inverter 10 from that of the bit-position encoder reset signal 4, so that a signal whose bit status is "zero" is inputted to the selectors 17-1 to 17-N. Thus, a signal whose bit status is "zero" is inputted to the D type flip-flops 12-1 to 12-N, and a bit status "zero" is stored therein. In this way, the shift register 20 is set to the initial state.

Next, when input data of a bit-position encoder reset signal 4 whose bit status is "zero" is inputted and second input data 106 is inputted to the AND gate array 11, a bit-position encoder reset signal 4a whose bit status is "1" is inputted to the AND gate array 11 so that the second input data 106 is outputted from the AND gate array 11. Then, a bit signal y1 of the most significant digit or significant bit out of the second input data 106 is inputted to the selector 17-1 and the selector 22-1, a bit signal y2 of the succeeding place is inputted to the selector 17-2 and the selector 22-2, and a bit signal yk of the k-th highest digit (k=3, 4, . . . , N) is inputted to the selector 17-k and the selector 22-k. Thus, the selector 17-k and the selector 22-k each corresponding to a bit signal whose bit status is "1" transfer the signal through the D type flip-flop 12-k, while the selector 17-k and the selector 22-k each corresponding to a bit signal whose bit status is "zero" transfer the signal without any intervention of the D type flip-flop 12-k.

In this state, when input data of the second pulse of the bit-position encoder shift signal 5, a clock signal is inputted, the bit signal whose bit status is "1" stored in the D type flip-flop 29 at the initial state is transferred to a D type flip--flop 12-$k_1$ corresponding to the first highest-order bit signal whose bit status is "1". In this process, the signal whose bit status is "1" is stored only in the D type flip-flop 12-$k_1$, and bit signals whose bit status is "zero" are stored in the other D type flip-flops.

Next, when the third pulse of the bit-position encoder shift signal 5 is inputted with the bit-position encoder reset signal 4 maintained at the bit status "1", the bit signals stored in the D type flip-flops 12-k (k=1, 2, . . . , N) are outputted to the encoder 28, respectively. Thereafter, the position of the D type flip-flop 12-$k_1$ that has outputted a bit signal whose bit status is "1" is encoded by the encoder 28, and then, bit-position encode data 6 representing the position of the first highest-order bit signal whose bit status is "1" is outputted. On the other hand, a bit signal whose bit status is "1" and which has been outputted to the selector 22-$k_1$ is transferred to the D type flip-flop 12-$k_2$ corresponding to the second highest-order bit signal whose bit status is "1". Further, in response to the second pulse, a bit signal whose bit status is "zero" is outputted to the inverter 27 by the D type flip-flop 16. The bit status of bit signal is inverted by the inverter 27, and a bit-position encode non-end signal 7 whose bit status is "1" is outputted from the inverter 27.

Next, when the fourth pulse is inputted, the position of the D type flip-flop 12-$k_2$ that has outputted a bit signal whose bit status is "1" is encoded by the encoder 28 and bit-position encode data 6 representing the position of the second highest-order bit signal whose bit status is "1" is outputted from the encoder 28. On the other hand, a bit signal whose bit status is "1" and which has been outputted to the selector 22-$k_2$ is transferred to the D type flip-flop 12-$k_3$ corresponding to the third highest-order bit signal whose bit status is "1". Then, a bit-position encode non-end signal 7 whose bit status is "1" is outputted from the inverter 27.

Likewise, each time a pulse of the bit-position encoder shift signal 5 is inputted, the bit-position encode data 6 representing the position of the bit signal whose bit status is "1" is outputted from the encoder 28, sequentially in descending-digit order. On the other hand, the bit-position encode non-end signal 7 whose bit status is "1" is outputted from the inverter 27, and a bit signal whose bit status is "1" is transferred to the D type flip-flop 12-$k_L$ corresponding to the lowest-order bit signal whose bit status is "1" out of the second input data 106. Then, the bit-position encode data 6 representing the position of the lowest-order bit signal whose bit status is "1" is outputted from the encoder 28 in response to the subsequent pulse, while the bit-position encode non-end signal 7 whose bit status is "1" is outputted from the inverter 27. When this occurs, the signal outputted from the D type flip-flop $^{12-k}_L$ is inputted to the OR gate 26 through the selectors $^{22-k}_L$ to 22-N, and a bit signal whose bit status is "1" is inputted from the OR gate 26 to the D type flip-flop 16 through the selector 21.

Then, in response to the subsequent pulse of the bit-position encoder shift signal 5, the signal whose bit status is "1" and which has been stored in the D type flip-flop 16 is inputted to the inverter 27, and a bit-position encode non-end signal 7 whose bit status is "zero" and the bit status of which has been inverted by the inverter 27 is outputted. Further, the D type flip-flop 16 temporarily holds or store the bit status "1" until the next bit-position encoder reset signal 4 whose bit status is "1" is inputted, and then, a bit-position encode non-end signal 7 whose bit status is "zero" is outputted.

In other words, when the position of every bit whose bit status is "1" out of the second input data 106 has been detected, the bit status "1" is transferred to the final-stage D type flip-flop 16 of the shift register 20. When the next bit-position encoder shift signal 5 is inputted, the bit-position encode non-end signal 7 goes "zero", this makes it known that the detection of all the bit positions whose bit status is "1" out of the bit string has been completed. Thereafter, the D type flip-flop 16 temporarily holds or store the bit status "1" until a bit-position encoder reset signal 4 whose bit status is "1" is given.

In the mean time, first input data 105 inputted to the barrel shifter 1 is shifted by the barrel shifter 1 by the number of bit-position encode data 6 inputted for each pulse, and the bit-shifted barrel shift data 3 is inputted to the AND gate array 124. At this time, since the bit-position encode non-end signal 7 whose bit status is "1" is inputted to the AND gate array 124, addition input data 116 equal to the barrel shift data 3 is inputted to the adder 102. In this case, if the bit status of the bit-position encode non-end signal 7 is "zero", then the addition input data 116 with all the bit signals set to "zero" is outputted to the adder 102.

Further, either selected addition data 119 selected by the multiplexer 104 out of the third input data 107 inputted to the multiplexer 104 and the cumulative addition resulting data 118, is inputted to the adder 102. The addition input data 116 and the selected addition data 119 are added by the adder 102, and then, the resultant addition resulting data 117 is inputted and stored in the register 103. The accumulated addition resulting data 118 stored in the register 103 is inputted to external circuits and the multiplexer 104.

Now, if the multiplexer 104 is set and made operate in such a way as to normally select the accumulated addition resulting data 118 as input data, then such a calculation is iterated that the first input data 105 is bit-shifted and cumulatively added by positional data of the next bit signal whose bit status is "1" out of the second input data each time one clock of the bit-position encoder shift signal 5 is given. In this cumulative addition, when all the bits whose bit status is "1" out of the second input data 106 have been completely scanned, the bit-position encode non-end signal 7 goes "zero" so that the output data of the AND gate array 124 goes "zero", wherein the cumulative addition is substantially ended or completed. In other words, this sequence of processing steps allows the multiplication of the first input data 105 and the second input data 106 to be accomplished. Further, updating the first input data 105 and the second input data 106 for each end of the multiplication allows the cumulative addition of a plurality of multiplicative products to be accomplished.

As described in detail above, according to the product-sum calculation apparatus PM1 of the first preferred embodiment which includes the bit-position encoder 2 and the barrel shifter 1, the multiplication is executed by the cumulative addition processes only in the cases where the bit status is "1" out of the second input data 106. In other words, it is possible to eliminate or omit meaningless cumulative addition processes in the case where the bit status is "zero" out of the second input data 106. Therefore, as compared with the prior art, the product-sum calculation can be executed at higher speed.

Generally speaking, it is true that the circuit area of the barrel shifter 1 increases in proportion to the square of bit width of input data, however, the circuit scale can be reduced by an order or more, as compared with the multiplier for practical bit widths (=8 to 16) of the input data. Thus, the circuit area of the product-sum calculation apparatus PM1 can be reduced, as compared with the prior art.

In the above-described product-sum calculation apparatus PM1 of the first preferred embodiment, the bit-position encoder 2 has been arranged so that the encoder 2 detects the positions of highest-order bit signals whose bit status is "1" out of the second input data 106, and outputs data representing the detected positions. However, the present invention is not limited to this arrangement, however, it may also be arranged that the bit-position encoder 2 detects the positions of lowest-order bit signals whose bit status is "1" out of the second input data 106, and outputs data representing the detected positions. With such an arrangement, the apparatus has the same advantages as those of the product-sum calculation apparatus PM1 of the first preferred embodiment.

Second Preferred Embodiment

Next, a product-sum calculation apparatus PM2 of the second preferred embodiment according to the present invention is described hereinafter with reference to FIG. 3.

Figure 3:
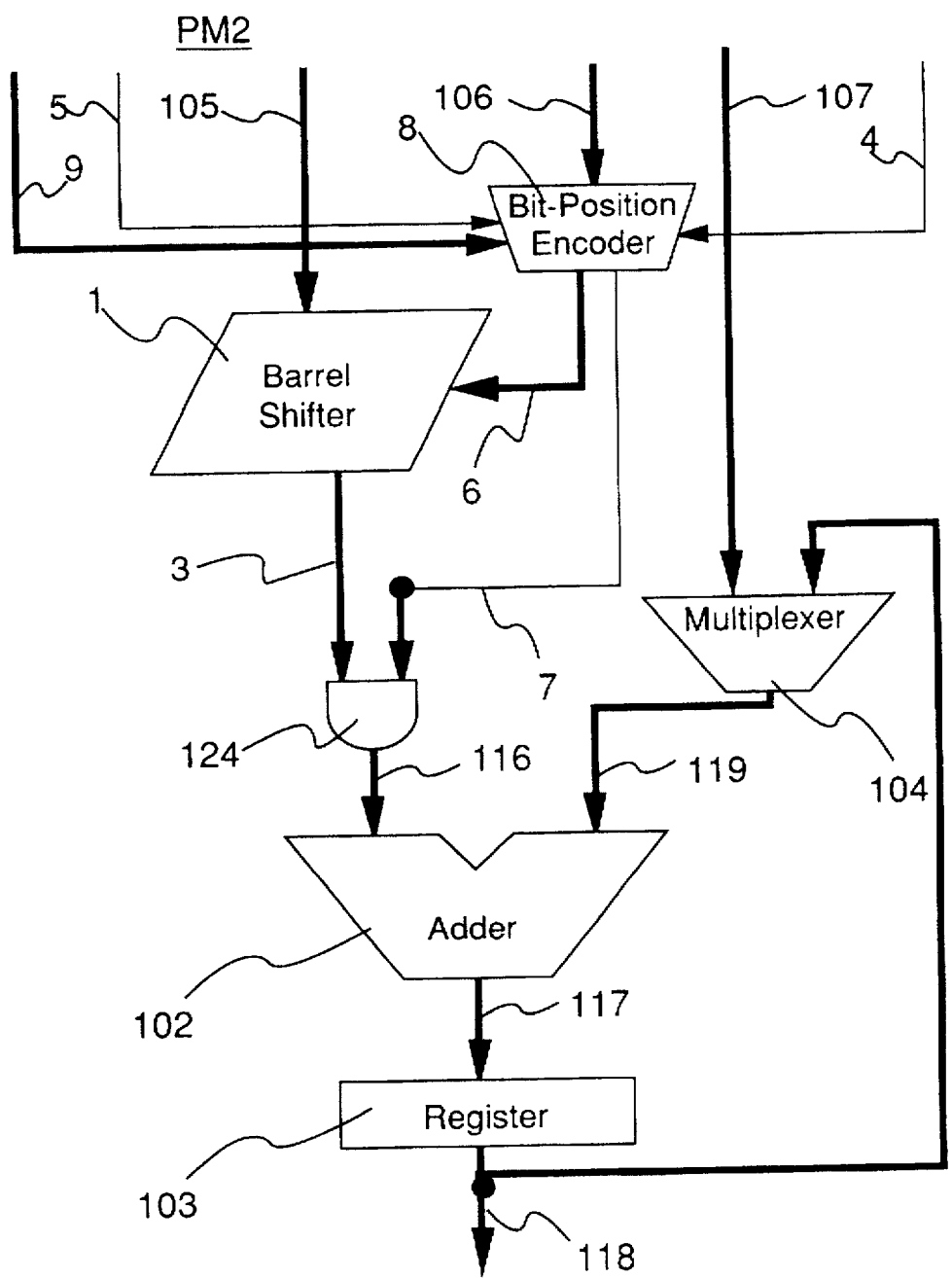
FIG. 3 is a block diagram showing a configuration of a product-sum calculation apparatus PM2 of the second preferred embodiment according to the present invention.

Referring to FIG. 3, the product-sum calculation apparatus PM2 of the second preferred embodiment is characterized in that, as compared with the product-sum calculation apparatus PM1 of the first preferred embodiment of FIG. 1, the bit-position encoder 2 is replaced with a bit-position encoder 8 having a function of restricting the maximum number of shifts to a predetermined value.

Figure 4:
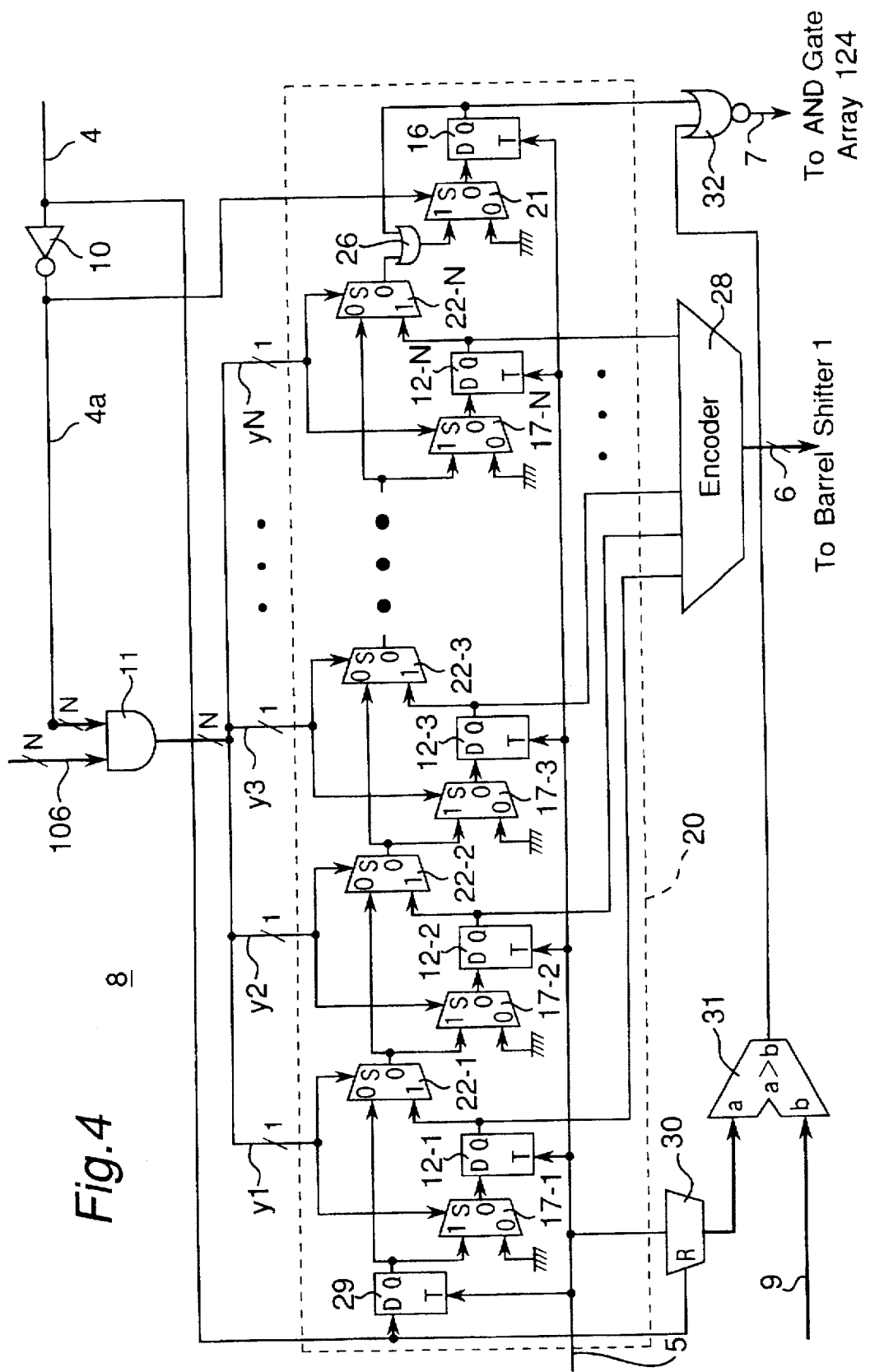
FIG. 4 is a block diagram showing a configuration of a bit-position encoder 8 having restricting functions shown in FIG. 2.

The bit-position encoder 8 of the product-sum calculation apparatus PM2 of the second preferred embodiment is similar to the bit-position encoder 2 of FIG. 2, however, further includes a counter 30, a comparator 31, and a NOR gate 32 as shown in FIG. 4. The counter 30, upon receiving inputs of a bit-position encoder reset signal 4 and a bit-position encoder shift signal 5, determines the number of bit shifts by counting pulses of the bit-position encoder shift signal 5 after a bit-position encoder reset signal 4 whose bit status is "1" is inputted thereto, and then, outputs the number of bit shifts to the comparator 31. The comparator 31 compares an input number of bit shifts with maximum number-of-shifts specifying data 9 for specifying the maximum number of shifts. In this state, if the number of bit shifts is not larger than the maximum number-of-shifts specifying data 9, the comparator 31 outputs to the NOR gate 32 a signal whose bit status is "zero", whereas, if the number of bit shifts is larger than the maximum number-of-shifts specifying data 9, the comparator 31 outputs to the NOR gate 32 a signal whose bit status is "1". The NOR gate 32 outputs a bit-position encode non-end signal 7 whose bit status is "1" when the bit status of either one of the signal outputted from the D type flip-flop 16 or the signal outputted from the comparator 31 is "1".

In the product-sum calculation apparatus PM2 of the second preferred embodiment having the above-described configuration, the number of bit shifts is counted by counting pulses of the bit-position encoder shift signal 5 by the counter 30, and the number of bit shifts is compared by the comparator 31 with the maximum number of shifts predetermined by the maximum number-of-shifts specifying data 9. Then, if the number of bit shifts exceeds the maximum number of shifts, a signal whose bit status is "1" is fed to the NOR gate 32 so that the bit-position encode non-end signal 7 is forced to go "zero".

Therefore, the product-sum calculation apparatus PM2 of the second preferred embodiment, which includes the bit-position encoder 8, is able to thin out or decimate a certain number of processes when the second input data 106 has a large proportion of bit status "1", and therefore, the product-sum calculation apparatus PM2 of the second preferred embodiment can thus execute the product-sum calculation processing at a higher speed.

Figure 5:
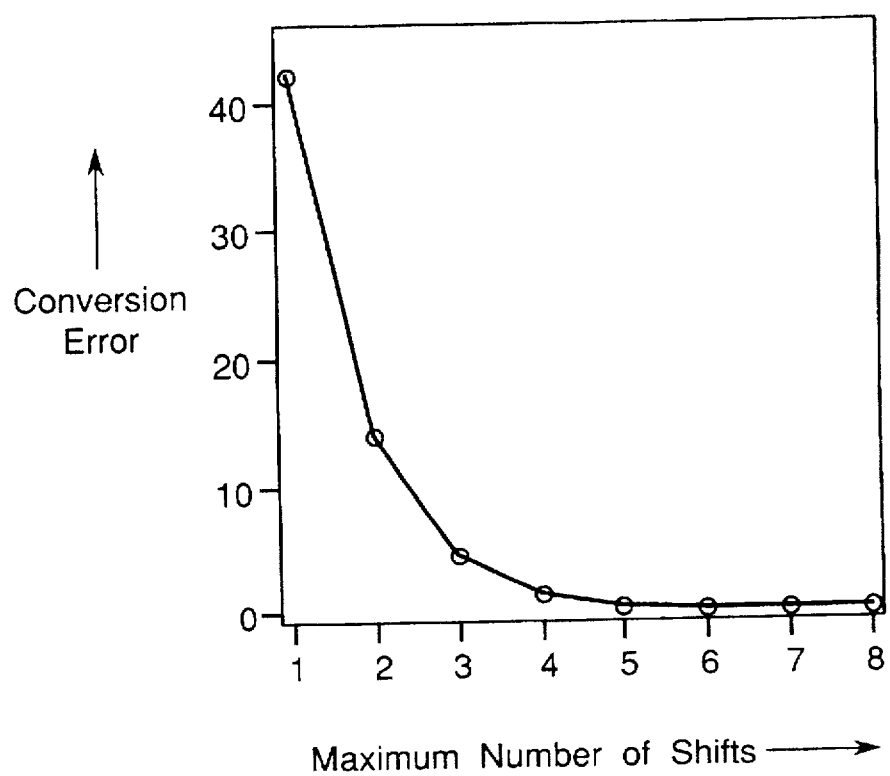
FIG. 5 is a graph showing a conversion error relative to the maximum number of shifts in the product-sum calculation apparatus of the second preferred embodiment of FIG. 3.

The present inventors evaluated errors of calculations resulting from thinning out or decimating the processes as described above. FIG. 5 is a graph showing a relationship between conversion errors relative to the maximum number of shifts when the bit width of the second input data 106 is set to 8. As is apparent from FIG. 5, it can be understood that the increase in the conversion errors is relatively small for the degree of decrease in the maximum number of shifts.

The reason why the conversion error does not increase so much even with a limited maximum number of shifts is explained below. When the number of bitshoe bit status is "1" is limited to the number of iterations NUM which is smaller than N, the number of cases B where the second input data 106 can be expressed can be expressed by the following Equation (1). In contrast, when the number of bits whose bit status is "1" is not limited, the number of cases $B_0$, where the second input data 106 can be expressed is $2^N$. For example, if a number of iterations NUM=5 is set with the number of bits N=8, the number of cases B decreases from 256 only to 219. Even if the number of iterations NUM is made more or less smaller than the number of bits N, the number of cases B does not decrease dramatically, so that the conversion error can be maintained relatively small.

$$B = {}_nC_{NUM} + {}_nC_{(NUM-1)} + {}_nC_{(NUM-2)} + \cdots + {}_nC_1 + {}_nC_0 \qquad (1)$$

As described in detail above, the product-sum calculation apparatus PM2 of the second preferred embodiment is able to execute the product-sum calculation processes at higher speeds without sacrificing the calculation precision at all, as compared with the product-sum calculation apparatus PM1 of the first preferred embodiment.

Third Preferred Embodiment

Figure 6:
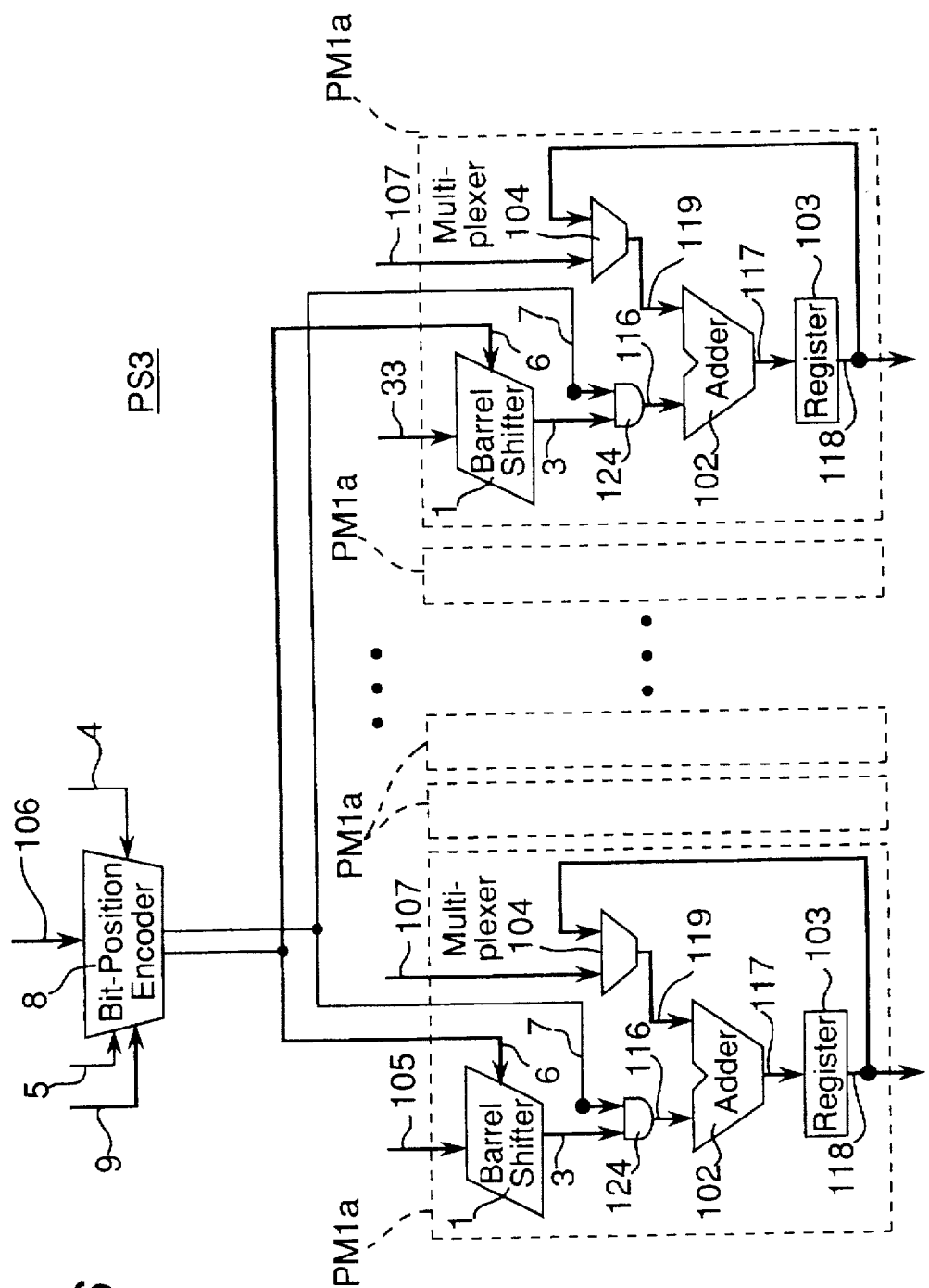
FIG. 6 is a block diagram showing a configuration of a product-sum calculation unit integrated circuit apparatus PS3 of the third preferred embodiment according to the present invention.

A product-sum calculation unit integrated circuit apparatus PS3 of the third preferred embodiment according to the present invention is characterized in, as shown in FIG. 6, including a plurality of M product-sum calculation apparatuses PM1a provided in parallel with one bit-position encoder 8, wherein the bit-position encoder 8 outputs bit-position encode data 6 to the barrel shifter 1 of each of product-sum calculation apparatuses PM1a, and further outputs a bit-position encode non-end signal 7 to the AND gate array 124 of each of the product-sum calculation apparatuses PM1a. In this arrangement, each of the product-sum calculation apparatuses PM1a is configured to eliminate the bit-position encoder 2 from the product-sum calculation apparatus PM1 of the first preferred embodiment. Each of the product-sum calculation apparatuses PM1a receives inputs of bit-position encode data 6 and a bit-position encode non-end signal 7 from one bit-position encoder 8.

With the above arrangement, in the product-sum calculation unit integrated circuit apparatus PS3 of the third preferred embodiment, the product-sum calculation apparatuses PM1a can execute in parallel product-sum calculations of first input data 105 and second input data 106 inputted thereto. In this case, if different first input data 105 are inputted to the individual product-sum calculation apparatuses PM1a, it is possible to execute in parallel the product-sum calculations of the second input data 106 and the different first input data 105.

In the product-sum calculation unit integrated circuit apparatus PS3 having the above arrangement, one bit-position encoder 8 outputs the bit-position encode data 6 and the bit-position encode non-end signal 7 to the product-sum calculation apparatuses PM1a. Therefore, as compared with the case where the product-sum calculation apparatuses PM1a are each provided with a bit-position encoder 8 separately, the area of the product-sum calculation unit integrated circuit apparatus PS3 can be reduced. Whereas the bit-position encoder 8 has been used in the above-described the third preferred embodiment, the present invention is not limited to such arrangement but also allows a bit-position encoder 2 to be used.

Fourth Preferred Embodiment

Figure 7:
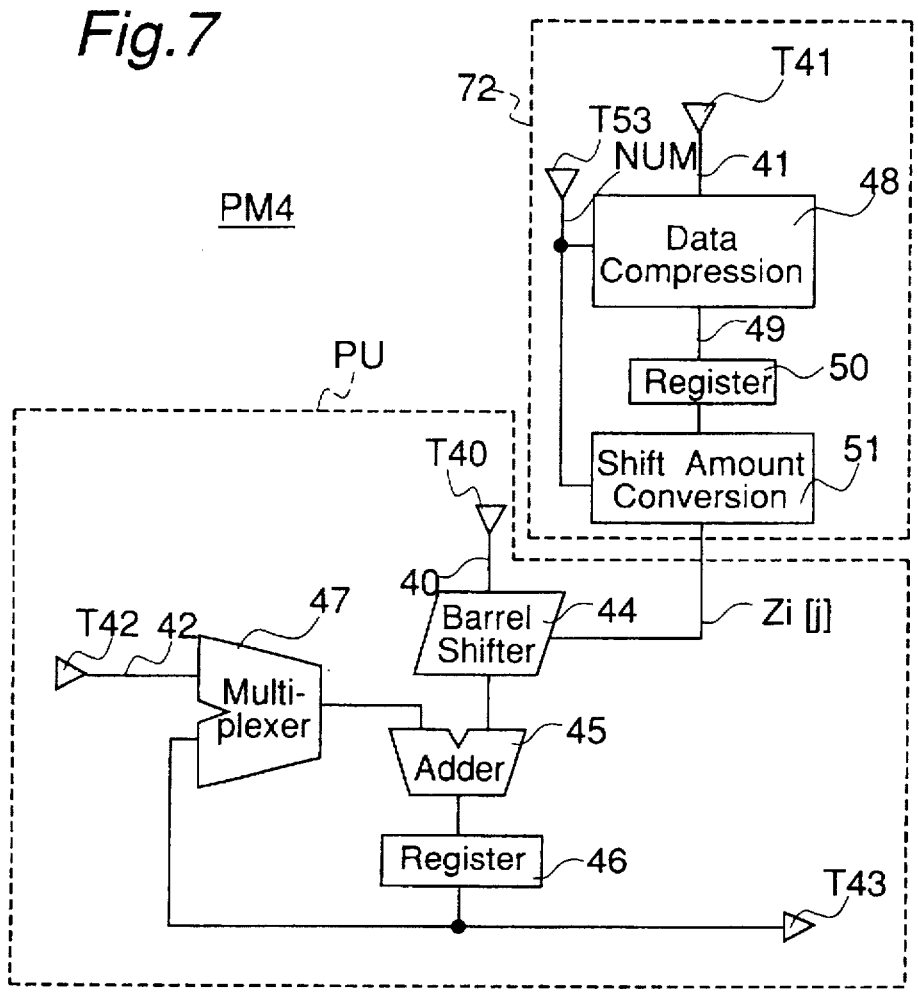
FIG. 7 is a block diagram showing a configuration of a product-sum calculation apparatus PM4 of the fourth preferred embodiment according to the present invention.

FIG. 7 is a block diagram showing a configuration of a product-sum calculation apparatus PM4 of the fourth preferred embodiment according to the present invention. The product-sum calculation apparatus PM4, as shown in FIG. 7, includes the followings:

(a) a fundamental calculation unit PU composed of a barrel shifter 44, an adder 45, a register 46, and a multiplexer 47; and (b) a data converter 72 composed of a data compression circuit 48, a register 50, and a shift amount conversion circuit 51. The product-sum calculation apparatus PM4 of the fourth preferred embodiment includes the data compression circuit 48 which produces an output by converting the second input data into such compressed data 49 that the number of bits is the same as that of second input data 41 and that the number of bit signals whose bit status is "1" is not larger than the number of iterations NUM.

Next, a configuration of the product-sum calculation apparatus PM4 of the fourth preferred embodiment is described in detail with reference to FIG. 7. In the product-sum calculation apparatus PM4 of the fourth preferred embodiment, the data compression circuit 48 executes the following processes of Step 1 and Step 2 upon the second input data 41 inputted through an input terminal T41, through which these steps converts the second input data 41 into such compressed data 49 that the bit width is the same as that of the second input data 41, and that the number of bit signals whose bit status is "1"0 is not larger than the number of iterations NUM. Then, the data compression circuit 48 outputs the compressed data 49 to a shift amount conversion circuit 51 through the register 50.

<Step 1>

The position f of the bit signal whose bit status is "1" and which falls upon the number of repetitions NUM-th highest digit or most significant bit is detected. Then, the bit signals of compressed data 49a within a range from the most significant digit or bit to the position "f" are set so as to be identical to or the same as the bit signals of the second input data 41, and the individual bits from the position "f" to the least significant digit of the compressed data 49a are set to zero, respectively, and then, the compressed data 49a is determined.

<Step 2>

If the following Equation (2) is satisfied, a "1" is added to the bit signal con(f) that is located at the position "f" of the compressed data 49a, and then, the addition resulting data is outputted as the compressed data 49. If the following Equation (2) is not satisfied, no addition is performed so that the compressed data 49a is outputted as the compressed data 49. However, even if Equation (2) is satisfied, an overflow of the compressed data 49 makes Step 2 invalid. This means that the compressed data 49a is outputted as the compressed data 49 without effecting the addition calculation. It is noted that the signal con(f) denotes a bit signal at the position "f" of the compressed data 49a.

$$\{in(f-1)\}\cdot\{in(f-2)+\ldots+in(0)\}=1 \quad (2)$$

In Equation (2), the symbol "·" in the terms of { }·{ } represents a logical AND operation, the symbol "+" in the second term { } represents a logical OR operation. Further, the term "in(k)" represents a bit signal at the position k of the second input data 41. Accordingly, the case where Equation (2) is satisfied means that the bit status of the position-f bit signal is "1" and the bit status of at least one bit signal out of the bit signals located at orders lower than the position "f" is "1".

The above-mentioned processes of Steps 1 and 2 are explained hereinafter using concrete examples. It is assumed, for example, that the second input data 41 is 8-bit data and the number of iterations NUM is 4.

First, if the second input data 41 is "10111001", then the compressed data 49a is "10111000" at Step 1, and no processing is done at Step 2 since the Equation (2) is not satisfied. Therefore, in this case, the compressed data 49a is outputted as compressed data 49 from the data compression circuit 48.

Further, if the second input data 41 is "110111101", then the compressed data 49a is "10111000" at Step 1, and "100001000" is added thereto at Step 2 since Equation (2) is satisfied. Thus, the calculated resulting data "111000000" is outputted as the compressed data 49 from the data compression circuit 48.

Furthermore, if the second input data 41 is "11111001", then the compressed data 49a is "11110000" at Step 1, and "00010000" is added thereto at Step 2 since Equation (2) is satisfied. However, the resulting data overflows. Therefore, in this case, the compressed data 49a="11110000" is outputted as the compressed data 49 from the data compression circuit 48.

Figure 8:
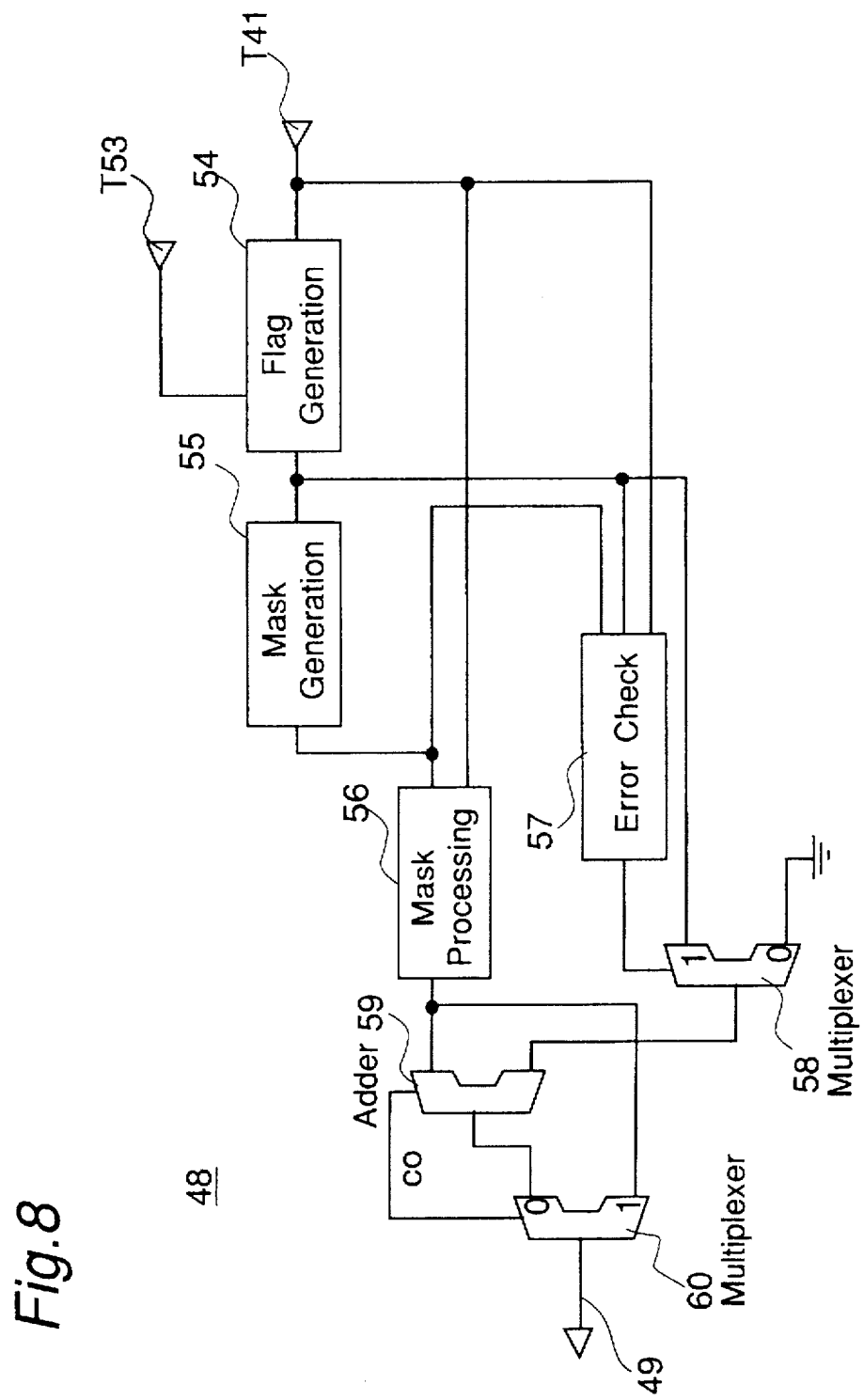
FIG. 8 is a block diagram showing a configuration of a data compression circuit 48 of FIG. 7.

Next, a configuration of the data compression circuit 48 is described hereinafter with reference to FIG. 8. Referring to FIG. 8, the data compression circuit 48 includes a flag generation module 54, a mask generation module 55, a mask processing module 56, an error check module 57, a multiplexer 58, an adder 59, and a multiplexer 60.

In the data compression circuit 48, the flag generation module 54 detects the position "f" of the bit signal whose bit status is "1" and which is located at the number of iterations NUM-th highest digit, out of the second input data 41. In this process, the number of iterations NUM is inputted through an input terminal T53. Then, a flag signal representing that the bit signal corresponding to the position "f" is "1" and the other signals are "zero" is outputted to the mask generation module 55, the error check module 57, and the multiplexer 58.

For example, if the second input data 41 is "101110011", then the flag signal is "100001000" when the number of iterations NUM is 4. The mask generation module 55 generates a mask signal according to the flag signal, and then, outputs the mask signal to the mask processing module 56 and the error check module 57. At this point, if the flag signal is "00001000", then the mask signal is "11111000". The mask processing module 56 executes bit-by-bit logical AND calculations of the mask signal and the second input data 41, and then, outputs compressed data 49a of the resulting data to the adder 59 and the multiplexer 60.

Further, for example, if the second input data 41 is "10111001" and if the mask signal is "11111000", then the mask processing module 56 outputs compressed data 49a of "10111000". In other words, the processing of Step 1 is executed by the flag generation module 54, the mask generation module 55, and the mask processing module 56.

The error check module 57 determining whether or not the second input data 41 satisfies Equation (2). If Equation (2) is satisfied, the error check module 57 inputs to the multiplexer 58 a control signal for selecting and outputting the flag signal, whereas, if Equation (2) is not satisfied, the error check module 57 outputs to the multiplexer 58 a control signal for outputting a signal whose bit signals are all "zero". The adder 59 adds up a data signal outputted from the mask processing module 56 and a data signal outputted from the multiplexer 58, and then, outputs the result to the multiplexer 60. In other words, the processing of Step 2 is executed by the error check module 57, the multiplexer 58, and the adder 59.

The multiplexer 60, when there is no overflow in the data signal outputted from the adder 59, selectively outputs the data signal outputted from the adder 59 as the compressed data 49. When an overflow occurs in the data signal outputted from adder 59, then the multiplexer 60 outputs the compressed data 49a inputted from the mask processing module 56 as the compressed data 49. The data compression circuit 48 constructed as described above produces converted compressed data 49 after converting the second input data 41 into such compressed data 49 that the bit width is the same as that of the second input data 41, that the number of bit signals whose bit status is "1" is not larger than the number of iterations NUM, and yet that the difference from the second input data 41 is the minimum.

Further, the shift amount conversion circuit 51 of FIG. 7 is constructed in a manner similar to that of the bit-position encoder 2 of the first preferred embodiment, and then, outputs converted data Zi(1), . . . , Zi(NUM) representing the bit positions whose bit status is "1" out of the compressed data 49. For example, if the compressed data 49 with the number of iterations NUM=4 is "10111000", then shift amounts of Zi(0)="011" (corresponding to bit 3), Zi(1)= "100" (corresponding to bit 4), Zi(2)="101" (corresponding to bit 5), Zi(3)="111" (corresponding to bit 7) are sent sequentially to the barrel shifter 44.

In the fundamental calculation unit PU of FIG. 7, based on the converted data Zi[j] (j=1, 2, . . . , NUM) outputted from the data converter 72, the barrel shifter 44 shifts and outputs first input data 40 inputted through the input terminal T40, as the barrel shift data 3 to an adder 45. When Zi[1] is inputted to the barrel shifter 44, the multiplexer 47 selects and outputs to the adder 45 third input data 42 inputted through an input terminal T42, whereas, when any data other than Zi[1] is inputted to the barrel shifter 44, the multiplexer 47 selects and outputs to the adder 45 data outputted from the register 46. The adder 45 adds up the data outputted from the barrel shift data 3 and the multiplexer 47, and then, outputs the addition data to the register 46. The register 46 temporarily holds or store the input addition data, and then, outputs the held data to the multiplexer 47 as well as through an output terminal T43.

In the product-sum calculation apparatus PM4 of the fourth preferred embodiment constructed as described above, the second input data 41 inputted to the data converter 72 is converted into compressed data 49 by the data compression circuit 48, and the compressed data 49 is converted into converted data Zi[j] (j=1, 2, . . . , NUM) by the shift amount conversion circuit 51, and then, the converted data Zi[j] is outputted to the barrel shifter 44 of the fundamental calculation unit PU. On the other hand, the first input data 40 inputted to the barrel shifter 44 of the fundamental calculation unit PU is shifted based on the converted data Zi[j] (j=1, 2, . . . , NUM) inputted from the data converter 72, and the barrel shift data 3 resulting from the bit shift of the first input data 40 is cumulatively added up by the adder 45 every time when the converted data Zi[j1] (j=1, 2, . . . , NUM) is inputted thereto. Thus, the multiplication of the first input data 40 and the second input data 41 is executed. In this case, when the bit shift is effected by using Zi[1] in the process of this multiplication, the third input data 42 has been fed to one input data of the adder 45. That is, the initial value of the cumulative addition for multiplication is the third input data 42. In the way as described above, it is possible to execute a calculation process of (first input data 40)×(second input data 41)+(third input data 42) by the product-sum calculation apparatus PM4 of the fourth preferred embodiment.

In the product-sum calculation apparatus PM4 of the fourth preferred embodiment constructed as described above, the second input data 41 is arithmetically processed or calculated by using the compressed data 49 set so as to result in a minimum difference from the second input data 41. This allows the calculation precision to be enhanced as compared with the product-sum calculation apparatus PM2 of the second preferred embodiment. For example, whereas the product-sum calculation apparatus PM2 of the second preferred embodiment shows a mean conversion error of 1.2 when the calculation is executed with the 8-bit second input data 41 used and with the number of bit shifts set to 4, the product-sum calculation apparatus PM4 of the fourth preferred embodiment can obtain a mean conversion error of 0.95 when the calculation is executed with the number of iterations NUM=4.

The product-sum calculation apparatus PM4 of the fourth preferred embodiment as described above is capable of improving the calculation precision as compared with the product-sum calculation apparatus PM2 of the second preferred embodiment, as well as capable of changing the calculation precision and the processing time by changing the number of iterations NUM as in the product-sum calculation apparatus PM2 of the second preferred embodiment.

Fifth Preferred Embodiment

Figure 9:
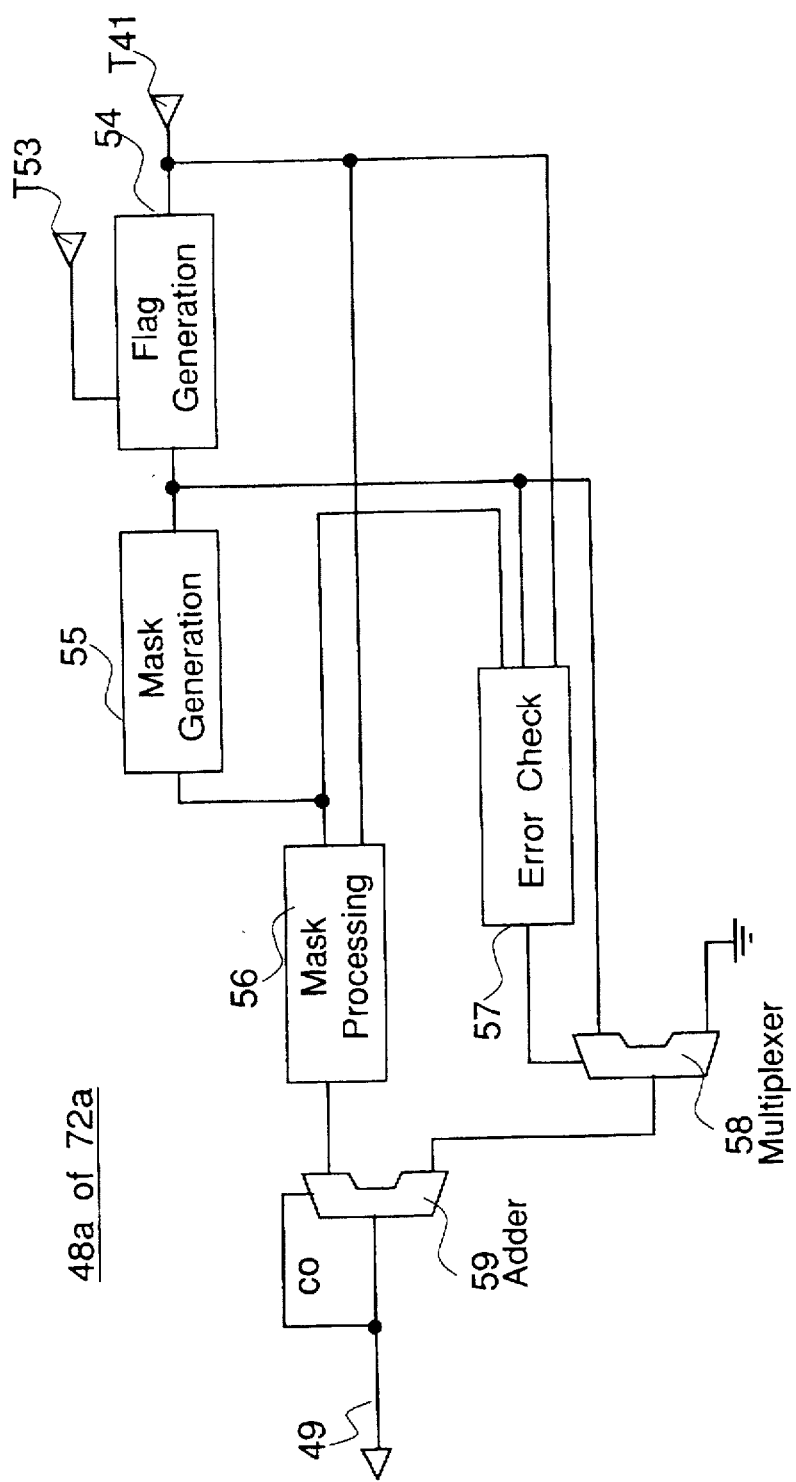
FIG. 9 is a block diagram showing a configuration of a data compression circuit 48a of the fifth preferred embodiment according to the present invention.

A product-sum calculation apparatus PM5 of the fifth preferred embodiment according to the present invention includes a data converter 72a and a fundamental calculation unit PU constructed in a manner similar to that of the fourth preferred embodiment. The data converter 72a is configured in a manner similar to that of the data converter 72 of the fourth preferred embodiment, however, uses a data compression circuit 48a as shown in FIG. 9 instead of the data compression circuit 48. The data compression circuit 48a is configured by eliminating the multiplexer 60 from the data compression circuit 48 of FIG. 8. Further, the data compression circuit 48a is arranged so that the overflow terminal of the adder 59 is located at the most significant digit of the compressed data so as to obtain compressed data 49 which is larger than the second input data 41 by one order.

The data compression circuit 48a constructed as described above executes the processes of Step 1 and Step 2 as described in the fourth preferred embodiment. In the fifth preferred embodiment, the bit width of the compressed data 49 is larger than that of the second input data 41 by one order, so that there no overflow occurs in Step 2. This is the point in which present the fifth preferred embodiment differs from the fourth preferred embodiment. Accordingly, the data compression circuit 48a produces compressed data 49 by converting the second input data 41 into such compressed data 49 that the bit width is larger than that of the second input data 41 by one order, that the number of bit signals whose bit status is "1" is not larger than the number of iterations NUM, and yet that the difference from the second input data 41 is the minimum.

Figure 10:
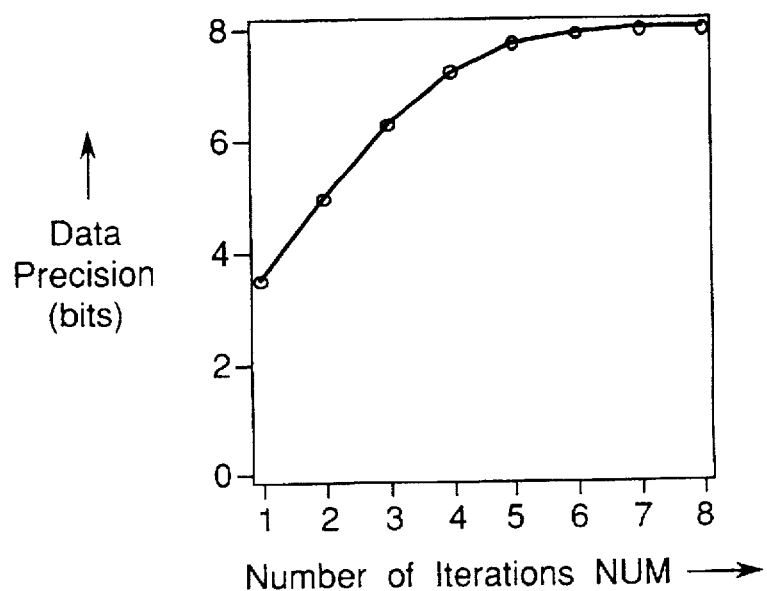
FIG. 10 is a graph showing a data precision relative to the number of iterations NUM of the fifth preferred embodiment.

FIG. 10 shows a relationship between the number of iterations NUM in the data converter 72a and the data precision in the calculation. With the bit width of the second input data 41 assumed as 8, the data precision was determined by using the following equation (3):

$$\{8 - \log 2 \ (1 + \text{mean conversion error})\}. \tag{3}$$

On the other hand, the number of times of the shift and addition processes in the calculation is proportional to the number of iterations NUM. That is, the processing time is proportional to the number of iterations NUM. For example, if the number of iterations NUM is set to 4, the processing time is halved, whereas the data precision decreases only to a slight extent (8 bit→7.2 bit). Conversely, decreasing the precision by one bit or so makes it possible to implement two times higher speed.

In the product-sum calculation apparatus PM5 of the fifth preferred embodiment constructed as described above, the second input data 41 is arithmetically processed or calculated by using the compressed data 49 set in such a way that the bit width becomes larger than that of the second input data 41 by one order, that the number of bit signals whose bit status is "1" is not larger than the number of iterations NUM, and yet that the difference from the second input data 41 becomes the minimum. This allows the calculation precision to be enhanced as compared with the product-sum calculation apparatus PM2 of the second preferred embodiment. For example, whereas the product-sum calculation apparatus PM2 of the second preferred embodiment shows a mean conversion error of 1.2 when the calculation is executed with the 8-bit second input data 41 used and with the number of bit shifts set to 4, the product-sum calculation apparatus PM5 of the fifth preferred embodiment can obtain a mean conversion error of 0.7 when the calculation is executed with the number of iterations NUM=4.

Sixth Preferred Embodiment

Figure 11:
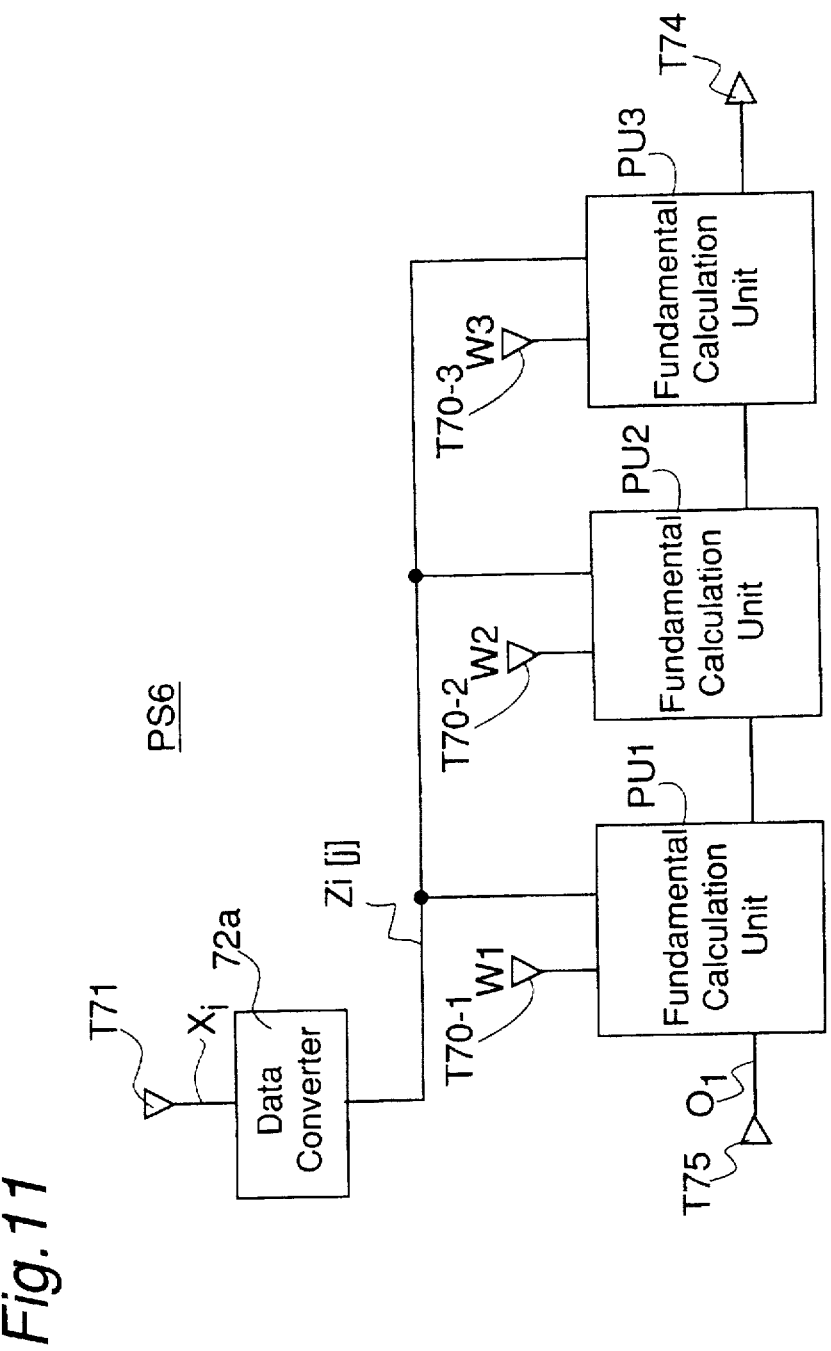
FIG. 11 is a block diagram showing a configuration of a product-sum calculation unit integrated circuit apparatus PS6 of the sixth preferred embodiment according to the present invention.

FIG. 11 is a block diagram showing a configuration of a product-sum calculation unit integrated circuit apparatus PS6 of the sixth preferred embodiment according to the present invention. The product-sum calculation unit integrated circuit apparatus PS6, as shown in FIG. 11, includes fundamental calculation units PU1, PU2 and PU3, and a data converter 72a. The fundamental calculation units PU1, PU2 and PU3 are configured in a manner similar to that of the fundamental calculation unit PU of the fifth preferred embodiment, and the data converter 72a is configured in a manner similar to that of the data converter 72a of the fifth preferred embodiment. The data converter 72a compresses and converts second input data $X_i$ inputted through an input terminal T71, and then, outputs converted data Zi(1), . . . , Zi(NUM) representing the positions of bit signals whose bit status is "1" out of the resulting compressed data $Y_i$, to the barrel shifters 44 of the fundamental calculation units PU1, PU2 and PU3, respectively. The fundamental calculation unit PU1 calculates a product of weight data W1 inputted as first input data through an input terminal T70-1, and the compressed data $Y_i$ of the second input data $X_i$, calculates a sum of the calculated product and offset data $O_1$ inputted as third input data through an input terminal T75, and then, outputs resulting data of the product-sum to the multiplexer 47 of the fundamental calculation unit PU2. The fundamental calculation unit PU2 calculates a product of weight data W2 inputted as first input data through an input terminal T70-2, and the compressed data $Y_i$ of the second input data $X_i$, calculates a sum of the calculated product and the calculated resulting data inputted from the fundamental calculation unit PU1, and then outputs the calculated resulting data of the product-sum to the multiplexer 47 of the fundamental calculation unit PU3. The fundamental calculation unit PU3 calculate a product of weight data W3 inputted as first input data through an input terminal T70-3, and the compressed data $Y_i$ of the second input data $X_i$, calculates a sum of the calculated product and the calculated resulting data inputted from the fundamental calculation unit PU2, and then, outputs the resulting data of the product-sum.

Next explained is a calculation process of the product-sum calculation unit integrated circuit apparatus PS6 constructed as described above. The second input data $X_i$ which is a time series signal inputted to the data compression circuit 48a for a cycle T=i is converted by the data compression circuit 48a into such compressed data $Y_i$ that the bit width is larger than that of the second input data $X_i$ 41 by one order, that the number of bits whose bit status is "1" is not larger than the number of iterations NUM, and yet that the difference from the second input data $X_i$ is the minimum, and then, the converted compressed data $Y_i$ is inputted to the shift amount conversion circuit 51 through the register 50. The compressed data $Y_i$ is converted by the shift amount conversion circuit 51 into converted data Zi[1], . . . , Zi[NUM] representing the positions of bits whose bit status is "1", and then, the converted data Zi[1], . . . , Zi[NUM] are inputted to the barrel shifters 44 of the fundamental calculation units PU1 to PU3.

The weight data W1 inputted to the barrel shifter 44 of the fundamental calculation unit PU1 is shifted based on the converted data Zi[j], and then, the converted data Zi[j] is inputted to the adder 45. To the shift value of the weight data W1 inputted to the adder 45, offset data $O_1$ of the third input data is added when Zi[1] is inputted to the barrel shifter 44, otherwise, data of the register 46 is added thereto when data other than Zi[1] is inputted to the barrel shifter 44. The resulting data is then outputted to the multiplexer 47 of the fundamental calculation unit PU2 through the register 46.

The weight data W2 inputted to the barrel shifter 44 of the fundamental calculation unit PU2 is shifted based on the converted data Zi[j], and then, the shifted data is inputted to the adder 45. To the shift value of the weight data W2 inputted to the adder 45, the data outputted from the fundamental calculation unit PU1 is added when Zi[1] is inputted to the barrel shifter 44, otherwise, data of the register 46 is added when data other than Zi[1] is inputted to the barrel shifter 44. The resulting data is then outputted to the multiplexer 47 of the fundamental calculation unit PU3 through the register 46.

The weight data W3 inputted to the barrel shifter 44 of the fundamental calculation unit PU3 is shifted based on the converted data Zi[j], and then, the shifted data is inputted to the adder 45. To the shift value of the weight data W2 inputted to the adder 45, the data outputted from the fundamental calculation unit PU2 is added when Zi[1] is inputted to the barrel shifter 44, otherwise, data of the register 46 is added when data other than Zi[1] is inputted to the barrel shifter 44. The resulting data is then outputted through the register 46.

TABLE 1

| Cycle T | Input | PU1 | PU2 | PU3 |
|---------|-------|-----|-----|-----|
| i | $X_i$ | $W1Y_i + O_1$ | | |
| i + 1 | $X_{i+1}$ | | $W2Y_{i+1} + W1Y_i + O_1$ | |
| i + 2 | $X_{i+2}$ | | | $W3Y_{i+2} + W2Y_{i+1} + W1Y_i + O_1$ |

Consequently, as shown in Table 1, for a cycle T=i, the fundamental calculation unit PU1 iterates the shift by the barrel shifter 44 and the addition by the adder 45 to a total of NUM times, and then, data $(W1Y_i+O_1)$ is calculated, and then, the calculated data $(W1Y_i+O_1)$ is outputted to the multiplexer 47 of the fundamental calculation unit PU2. Then, for a cycle T=i+1, the fundamental calculation unit PU2 iterates the shift by the barrel shifter 44 and the addition by the adder 45 to a total of NUM times, and then, data $(W2Y_{i+1}+$(data outputted from fundamental calculation unit PU1)) is calculated, and then, therefore data $(W2Y_{i+1}+W1Y_i+O_1)$ is outputted to the multiplexer 47 of the fundamental calculation unit PU3.

For a cycle T=i+2, the fundamental calculation unit PU3 iterates the shift by the barrel shifter 44 and the addition by the adder 45 to a total of NUM times, and then, data $(W3Y_{i+2}+W2Y_{i+1}+W1Y_i+O_1)$ is outputted.

In the way as shown above, the calculated resulting data $(W3Y_{i+2}+W2Y_{i+1}+W1Y_i+O_1$, i=1, 2, 3, ... ) is thus outputted sequentially from an output terminal T74.

In the case of offset data $O_1=0$, it is possible to execute a convolution integral of the compressed data $(Y_1, Y_2, Y_3, ...)$ and the kernel image data $(W_1, W_2, W_3)$. That is, it is possible to execute a convolution integral of the second input data $(X_1, X_2, X_3, ...)$ and the kernel image data (W1, W2, W3). However, since the second input data $X_i$ is converted into compressed data $Y_i$ before the calculation is done, the resulting data is such that the calculated resulting data $(W3Y_{i+2}+W2Y_{i+1}+W1Y_i+O_1)$=the calculated resulting data $(W3Y_{i+2}+W2Y_{i+1}+W1Y_i+O_1)$+error S. In this expression, the error S is assumed to be an error due to the conversion error, wherein the magnitude of the error changes depending on the value of the number of iterations NUM.

Whereas the sixth preferred embodiment has been described on such a case that the kernel size of the kernel image data is 3, the present invention is not limited to this, and the fundamental calculation units may be connected further in series. This makes it possible to execute a convolution integral using an even larger kernel image data.

In the product-sum calculation unit integrated circuit apparatus PS6 of the sixth preferred embodiment as described above, the processing time can be reduced to a great extent by setting the number of iterations NUM to the minimum while maintaining the calculation precision within the permissible range. For example, in a product-sum calculation unit integrated circuit apparatus constituted by multipliers and adders, if the circuit thereof is fabricated so as to cope with a precision of up to 8 bits, the processing time could be reduced only by a few percentages even with a precision of only seven required. On the other hand, the product-sum calculation unit integrated circuit apparatus PS6 of present the sixth preferred embodiment allows the number of iterations NUM=4 to be set when the precision is required only to be seven bits, and then, this results in be capable of reducing the processing time in half.

Seventh Preferred Embodiment

Figure 12:
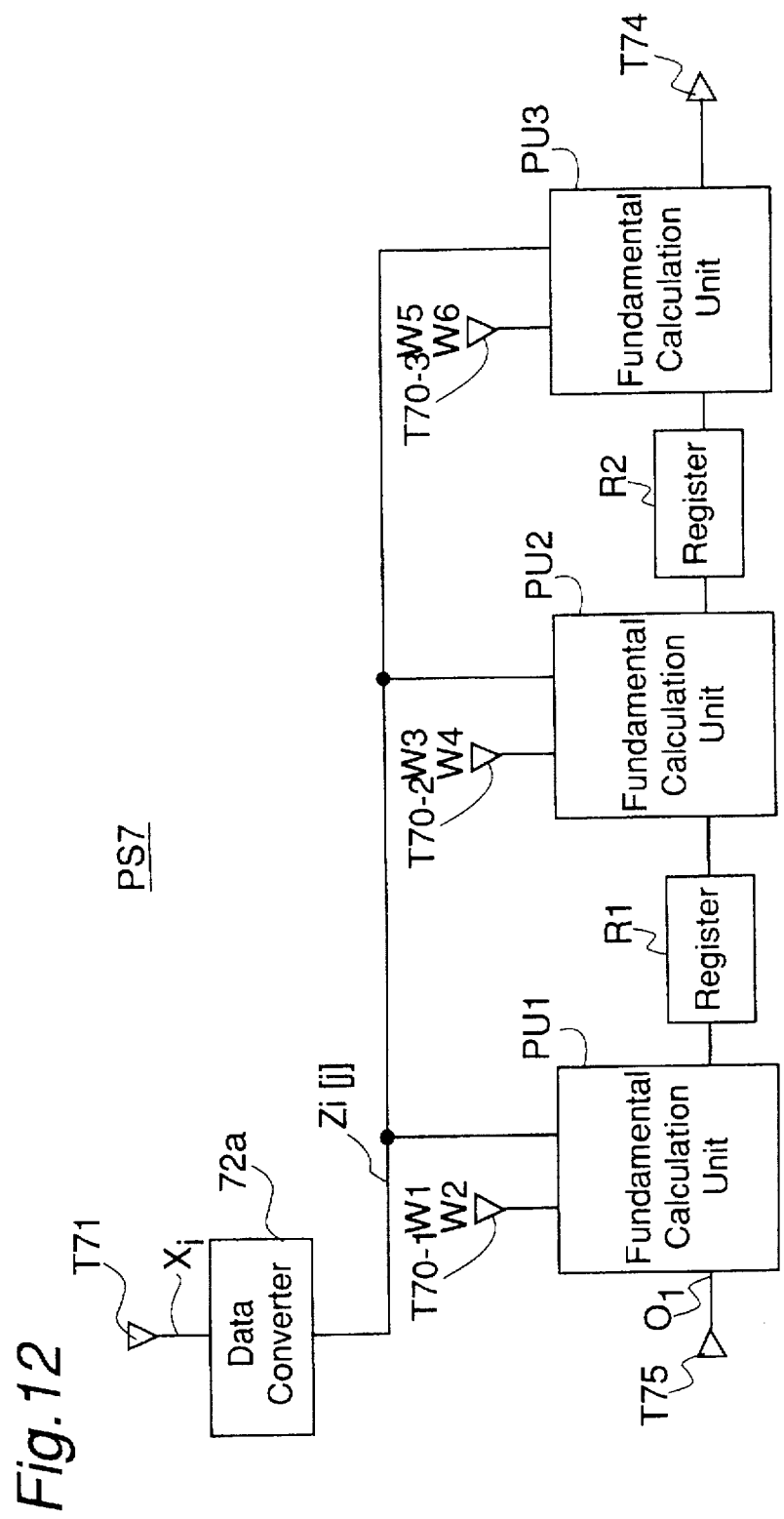
FIG. 12 is a block diagram showing a configuration of a product-sum calculation unit integrated circuit apparatus PS7 of the seventh preferred embodiment according to the present invention.

FIG. 12 is a block diagram showing the configuration of a product-sum calculation unit integrated circuit apparatus PS7 of the seventh preferred embodiment. The product-sum calculation unit integrated circuit apparatus PS7 of FIG. 12 differs from the product-sum calculation unit apparatus PS56 of FIG. 11 in that the product-sum calculation unit integrated circuit apparatus PS7 of FIG. 12 includes a register R1 provided between the fundamental calculation unit PU1 and the fundamental calculation unit PU2 as well as a register R2 provided between the fundamental calculation unit PU2 and the fundamental calculation unit PU3. The register RI temporarily holds or stores product-sum calculated resulting data outputted from the fundamental calculation unit PU1 for a period of one clock cycle, and then, outputs the data to the fundamental calculation unit PU2. The register R2 temporarily holds or stores product-sum calculated resulting data outputted from the fundamental calculation unit PU2 for a period of one clock cycle, and then, outputs the data to the fundamental calculation unit PU3.

Next explained is a calculation process of the product-sum calculation unit integrated circuit apparatus PS7 constructed as described above. In this calculation, weight data W1 and W2 are inputted to the barrel shifter 44 of the fundamental calculation unit PU2 through the input terminal T70-1, weight data W3 and W4 are inputted to the barrel shifter 44 of the fundamental calculation unit PU2 through the input terminal T70-2, and weight data W5 and W6 are inputted to the fundamental calculation unit PU2 through the input terminal T70-3. The second input data $X_i$ inputted to the data converter 72 through the input terminal T71 is processed by the data converter 72 in a manner similar to that of the product-sum calculation apparatus PM6 of FIG. 12, and the processed data is inputted to the fundamental calculation units PU1 to PU3.

For a cycle T=2i−1, the second input data $X_i$ is inputted to the data converter 72a, and then, the second input data $X_i$ is converted into converted data Zi[1], ..., Zi[NUM]. The converted data Zi[j] are inputted sequentially in the order from the converted data Zi[1] to the converted data Zi[NUM] respectively for cycles T=2i−1 and T=2i to the barrel shifter 44 of each of the fundamental calculation units PU.

In the barrel shifter 44 of the fundamental calculation unit PU1, in response to the converted data Zi[j], W2 is shifted for cycle T=2i−1 or W1 is shifted for cycle T=2i. and then, the shifted data is inputted to the adder 45. The offset data $O_1$ of the third input data is inputted to the adder 45 when Zi[1] is inputted to the barrel shifter 44 during a period of cycle T=2i, otherwise, the data of the register 46 is inputted. Iterating both of the shift by the barrel shifter 44 and the addition by the adder 45 up to the total of NUM times for each cycle allows data (W2Y$_i$+(calculated resulting data for a cycle T=2(i−1))) to be outputted for a cycle T=2i−1, and data (W1Y$_i$+O$_1$) to be outputted for a cycle T=2i.

In the fundamental calculation units PU2 and PU3, which operate in the same manner as the fundamental calculation unit PU1, the register R1 fetches output data of the left-side fundamental calculation unit PU1, i.e., data (W2Y$_i$+ (calculated resulting data for a cycle T=2(i−1))), at the beginning of cycle T=2i, and then, the register R2 fetches output data of the left-side fundamental calculation unit PU1, i.e., data (W4Y$_i$+ (calculated resulting data for a cycle T=2(i−1))) at the beginning of cycle T=2i.

Next, the flow of data is described with reference to Table 2. In the following description, it is assumed that the offset data O$_1$=0.

TABLE 2

| Cycle T | Input | PU1 | R1 | PU2 | R2 | PU3 |
|---|---|---|---|---|---|---|
| 2i | X$_i$ | W1Y$_i$ | | | | |
| 2(i+1)−1 | X$_{i+1}$ | W2Y$_{i+1}$ +W1Y$_i$ | | | | |
| 2(i+1) | X$_{i+1}$ | → | W2Y$_{i+1}$ +W1Y$_i$ | | | |
| 2(i+2)−1 | X$_{i+2}$ | | W2Y$_{i+1}$ +W1Y$_i$ | | | |
| 2(i+2) | X$_{i+2}$ | | → | W3Y$_{i+2}$ +W2Y$_{i+1}$ +W1Y$_i$ | | |
| 2(i+3)−1 | X$_{i+3}$ | | | W4Y$_{i+3}$ +W3Y$_{i+2}$ +W2Y$_{i+1}$ +W1Y$_i$ | | |
| 2(i+3) | X$_{i+3}$ | | | → | W4Y$_{i+3}$ +W3Y$_{i+2}$ +W2Y$_{i+1}$ +W1Y$_i$ | |
| 2(i+4)−1 | X$_{i+4}$ | | | | W4Y$_{i+3}$ +W3Y$_{i+2}$+ W2Y$_{i+1}$+ W1Y$_i$ | |
| 2(i+4) | X$_{i+4}$ | | | | → | W5Y$_{i+4}$ +W4Y$_{i+3}$ +W3Y$_{i+2}$ +W2Y$_{i+1}$ +W1Y$_i$ |
| 2(i+5)−1 | X$_{i+5}$ | | | | | W6Y$_{i+5}$ +W5Y$_{i+4}$ +W4Y$_{i+3}$ +W3Y$_{i+2}$ +W2Y$_{i+1}$ +W1Y$_i$ |

For the cycle T=2i, data W1Y$_i$ is calculated by the fundamental calculation unit PU1. For a cycle T=2(i+1)−1, data (W2Y$_{i+1}$+W1Y$_i$) is calculated by the fundamental calculation unit PU1. For a cycle T=2(i+1), the data (W2Y$_{i+1}$+W1Y$_i$) is fetched into the register R1. For a cycle T=2(i+2)−1, the data (W2Y$_{i+1}$+W1Y$_i$) remains held by the register R1. For a cycle T=2(i+2), data (W3Y$_{i+2}$+W2Y$_{i+1}$+W1Y$_i$) is calculated by the fundamental calculation unit PU2. For a cycle T=2(i+3)−1, data (W4Y$_{i+3}$+W3Y$_{i+2}$+W2Y$_{i+1}$+W1Y$_i$) is calculated by the fundamental calculation unit PU2. For a cycle T=2(i+3), the W4Y$_{i+3}$+W3Y$_{i+2}$+W2Y$_{i+1}$+W1Y$_i$ is fetched into the register R2. For a cycle T=2(i+4)−1, the data (W4Y$_{i+3}$+W3Y$_{i+2}$+W2Y$_{i+1}$+W1Y$_i$) remains held or temporarily stored by the register R2. For a cycle T=2(i+4), data (W5Y$_{i+4}$+W4Y$_{i+3}$+W3Y$_{i+2}$+W2Yi$_{+1}$+W1Y$_i$) is calculated by the fundamental calculation unit PU3. For a cycle T=2(i+5)−1, data (W6Y$_{i+5}$+W5Y$_{i+4}$+W4Y$_{i+3}$+W3Y$_{i+2}$+W2Y$_{i+}$$_1$+W1Y$_i$) is calculated by the fundamental calculation unit PU3.

Table 3 and Table 4 show data flow with numerical values substituted into "i". As is apparent from Table 4, data (W6Y$_{i+5}$+W5Y$_{i+4}$+W4Y$_{i+3}$+W3Y$_{i+2}$+W2Y$_{i+1}$+W1Y$_i$, i=1, 2, 3, . . . ) are successively outputted from an output terminal T74. This means that it is possible to execute a convolution integral of the compressed data (Y$_1$, Y$_2$, Y$_3$, . . . ) and the kernel image data (W1, W2, W3, W4, W5, W6). Therefore, according to the product-sum calculation unit integrated circuit apparatus PS7 of FIG. 12, it is possible to execute a convolution integral of the second input data (X$_1$, X$_2$, X$_3$, . . . ) and the kernel image data (W1, W2, W3, W4, W5, W6).

TABLE 3

| PU1 | Output of R1 | PU2 | Output of R2 |
|---|---|---|---|
| W2Y$_1$ | 0 | W4Y$_1$ | 0 |
| W1Y$_1$ | W2Y$_1$ | W3Y$_1$ | W4Y$_1$ |
| W2Y$_2$+W1Y$_1$ | W2Y$_1$ | W4Y$_2$+W3Y$_1$ | W4Y$_1$ |
| W1Y$_2$ | W2Y$_2$+W1Y$_1$ | W3Y$_2$+W2Y$_1$ | W4Y$_2$+W3Y$_1$ |
| W2Y$_3$+ W1Y$_2$ | W2Y$_2$+W1Y$_1$ | W4Y$_3$+W3Y$_2$+W2Y$_1$ | W4Y$_2$+W3Y$_1$ |
| W1Y$_3$ | W2Y$_3$+W1Y$_2$ | W3Y$_3$+W2Y$_2$+W1Y$_1$ | W4Y$_3$+W3Y$_2$+W2Y$_1$ |
| W2Y$_4$+ W1Y$_3$ | W2Y$_3$+W1Y$_2$ | W4Y$_4$+W3Y$_3$+W2Y$_2$+ W1Y$_1$ | W4Y$_3$+W3Y$_2$+W2Y$_1$ |
| W1Y$_4$ | W2Y$_4$+W1Y$_3$ | W3Y$_4$+W2Y$_3$+W1Y$_2$ | W4Y$_4$+W3Y$_3$+W2Y$_2$+ W1Y$_1$ |
| W2Y$_5$+ W1Y$_4$ | W2Y$_4$+W1Y$_3$ | W4Y$_5$+W3Y$_4$+W2Y$_3$+ W1Y$_2$ | W4Y$_4$+W3Y$_3$+W2Y$_2$+ W1Y$_1$ |
| W1Y$_5$ | W2Y$_5$+W1Y$_4$ | W3Y$_5$+W2Y$_4$+W1Y$_3$ | W4Y$_5$+W3Y$_4$+W2Y$_3$+ W1Y$_2$ |
| W2Y$_6$+ W1Y$_5$ | W2Y$_5$+W1Y$_4$ | W4Y$_6$+W3Y$_5$+W2Y$_4$+ W1Y$_3$ | W4Y$_5$+W3Y$_4$+W2Y$_3$+ W1Y$_2$ |
| W1Y$_6$ | W2Y$_6$+W1Y$_5$ | W3Y$_6$+W2Y$_5$+W1Y$_4$ | W4Y$_6$+W3Y$_5$+W2Y$_4$+ W1Y$_3$ |
| W2Y$_7$+ W1Y$_6$ | W2Y$_6$+W1Y$_5$ | W4Y$_7$+W3Y$_6$+W2Y$_5$+ W1Y$_4$ | W4Y$_6$+W3Y$_5$+W2Y$_4$+ W1Y$_3$ |
| W1Y$_7$ | W2Y$_7$+W1Y$_6$ | W3Y$_7$+W2Y$_6$+W1Y$_5$ | W4Y$_7$+W3Y$_6$+W2Y$_5$+ W1Y$_4$ |

TABLE 4

| PU1 | PU3 | Output from Output Terminal T74 |
|---|---|---|
| W2Y$_1$ | W6Y$_1$ | 0 |
| W1Y$_1$ | W5Y$_1$ | W6Y$_1$ |
| W2Y$_2$+W1Y$_1$ | W6Y$_2$+W5Y$_1$ | W6Y$_1$ |
| W1Y$_2$ | W5Y$_2$+W4Y$_1$ | W6Y$_2$+W5Y$_1$ |
| W2Y$_3$+W1Y$_2$ | W6Y$_3$+W5Y$_2$+W4Y$_1$ | W6Y$_2$+W5Y$_1$ |
| W1Y$_3$ | W5Y$_3$+W4Y$_2$+W3Y$_1$ | W6Y$_3$+W5Y$_2$+W4Y$_1$ |
| W2Y$_4$+W1Y$_3$ | W6Y$_4$+W5Y$_3$+W4Y$_2$+W3Y$_1$ | W6Y$_3$+W5Y$_2$+W4Y$_1$ |
| W1Y$_4$ | W5Y$_4$+W4Y$_3$+W3Y$_2$+W2Y$_1$ | W6Y$_4$+W5Y$_3$+W4Y$_2$ +W3Y$_1$ |
| W2Y$_5$+W1Y$_4$ | W6Y$_5$+W5Y$_4$+W4Y$_3$+W3Y$_2$+W2Y$_1$ | W6Y$_4$+W5Y$_3$+W4Y$_2$ +W3Y$_1$ |
| W1Y$_5$ | W5Y$_5$+W4Y$_4$+W3Y$_3$+W2Y$_2$+W1Y$_1$ | W6Y$_5$+W5Y$_4$+W4Y$_3$ +W3Y$_2$+W2Y$_1$ |
| W2Y$_6$+W1Y$_5$ | W6Y$_6$+W5Y$_5$+W4Y$_4$+W3Y$_3$+W2Y$_2$+W1Y$_1$ | W6Y$_5$+W5Y$_4$+W4Y$_3$ +W3Y$_2$+W2Y$_1$ |
| W1Y$_6$ | W5Y$_6$+W4Y$_5$+W3Y$_4$ +W2Y$_3$+W1Y$_2$ | W6Y$_6$+W5Y$_5$+W4Y$_4$ +W3Y$_3$+W2Y$_2$+W1Y$_1$ |
| W2Y$_7$+W1Y$_6$ | W6Y$_7$+W5Y$_6$+W4Y$_5$ +W3Y$_4$+W2Y$_3$+W1Y$_2$ | W6Y$_6$+W5Y$_5$+W4Y$_4$ +W3Y$_3$+W2Y$_2$+W1Y$_1$ |
| W1Y$_7$ | W5Y$_7$+W4Y$_6$+W3Y$_5$ +W2Y$_4$+W1Y$_3$ | W6Y$_7$+W5Y$_6$+W4Y$_5$ +W3Y$_4$+W2Y$_3$+W1Y$_2$ |

Whereas the product-sum calculation unit integrated circuit apparatus PS7 of the seventh preferred embodiment has been described for a case where the kernel size of the kernel image data is six, the product-sum calculation unit integrated circuit apparatus PS7 of the seventh preferred embodiment may also be arranged that fundamental calculation units PUk and registers Rk are further connected in series. Such an arrangement allows the kernel size of the kernel image data to be increased to 2n, and this results in making it possible to execute a convolution integral using an even larger kernel image data. According to the product-sum calculation unit integrated circuit apparatus PS7, it is possible execute calculations of as large a kernel size as 2n with a circuit scale or circuit cost provided with n fundamental calculation units Puk.

Eighth Preferred Embodiment

Figure 13:
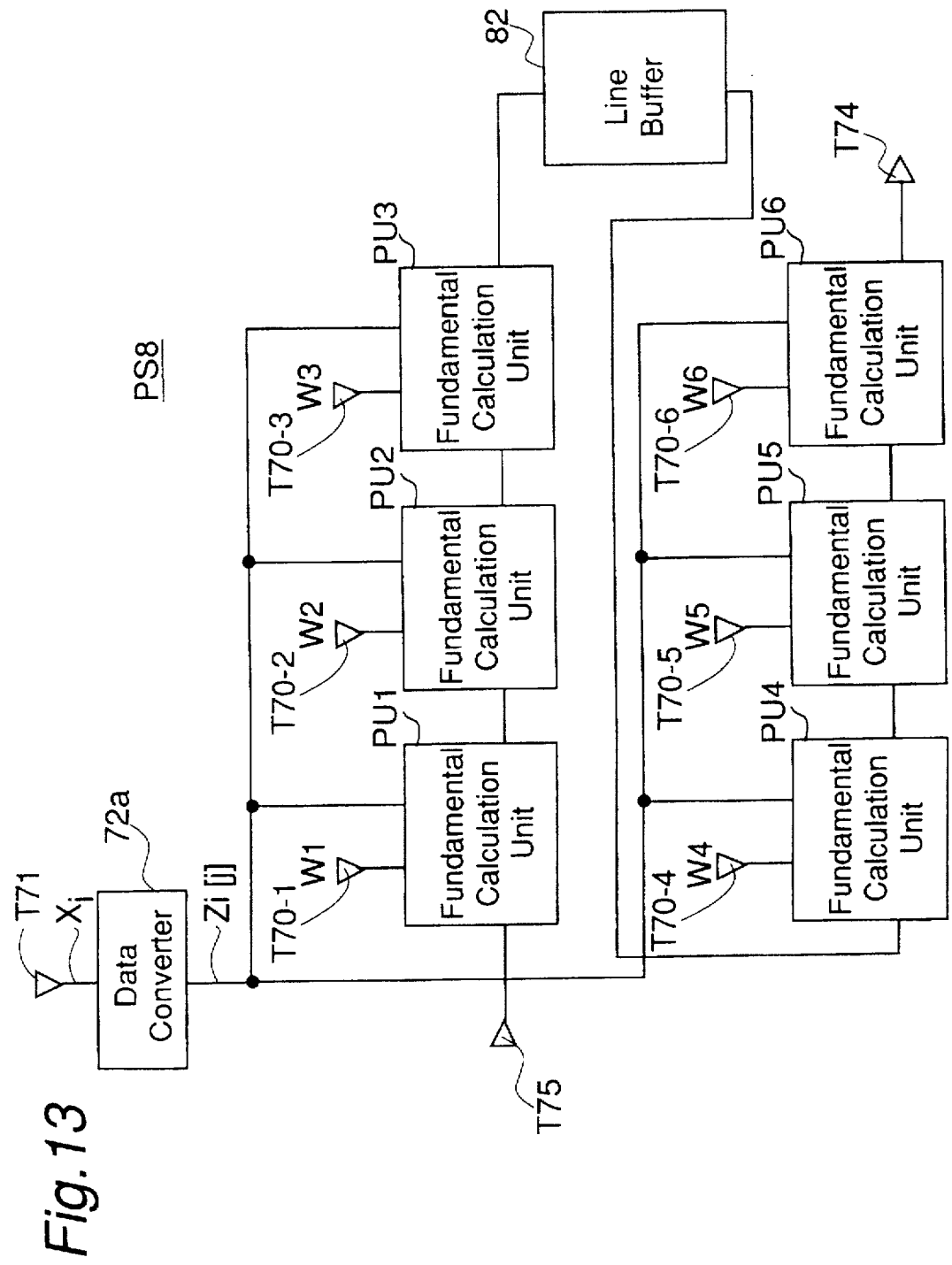
FIG. 13 is a block diagram showing a configuration of a product-sum calculation unit integrated circuit apparatus PS8 of the eighth preferred embodiment according to the present invention.

FIG. 13 is a block diagram showing a configuration of a product-sum calculation unit integrated circuit apparatus PS8 of the eight preferred embodiment.

Referring to FIG. 13, the product-sum calculation unit integrated circuit apparatus PS8 includes fundamental calculation units PU1 to PU6, a data converter 72a, and a line buffer 82 which is a serial line buffer memory. The product-sum calculation unit integrated circuit apparatus PS8 is characterized in that the line buffer 82 is further provided between the fundamental calculation unit PU3 and the fundamental calculation unit PU4.

In the product-sum calculation unit integrated circuit apparatus PS8, the data converter 72a outputs converted data $Zi[j]$ to the fundamental calculation units PU1 to PU6. The fundamental calculation unit PU1, based on the converted data $Zi[j]$ inputted, calculates a product of weight data W1 inputted through the input terminal T70-1 and compressed data $Y_i$, calculates a sum of the calculated product thereof and offset data $O_1$ inputted through the input terminal T75, and then, outputs the resulting data of the product-sum to the fundamental calculation unit PU2. The fundamental calculation unit PU2, based on the converted data $Zi[j]$ inputted, calculates a product of weight data W2 inputted through the input terminal T70-2 and the compressed data $Y_i$, calculates a sum of the calculated product and the calculated resulting data inputted from the fundamental calculation unit PU1, and then outputs the resulting data of the product-sum to the fundamental calculation unit PU3. The fundamental calculation unit PU3, based on the converted data $Zi[j]$ inputted, calculates a product of weight data W3 inputted through the input terminal T70-3 and the compressed data $Y_i$, calculates a sum of the calculated product and the calculated resulting data inputted from the fundamental calculation unit PU2, and then outputs the resulting data of the product-sum to the line buffer 82. The line buffer 82 temporarily holds or stores the calculated resulting data of three clock signal cycles inputted from the fundamental calculation unit PU3, and then, outputs the held data to the fundamental calculation unit PU4.

The fundamental calculation unit PU4, based on the converted data $Zi[j]$ inputted, calculates a product of weight data W4 inputted through the input terminal T70-4 and compressed data $Y_i$, calculates a sum of the calculated product thereof and data inputted from the line buffer 82, and then, outputs the resulting data of the product-sum to the fundamental calculation unit PU5. The fundamental calculation unit PU5, based on the converted data $Zi[j]$ inputted, calculates a product of weight data W5 inputted through the input terminal T70-5 and the compressed data $Y_i$, calculates a sum of the calculated product thereof and the calculated resulting data inputted from the fundamental calculation unit PU4, and then, outputs the resulting data of the product-sum to the fundamental calculation unit PU6. The fundamental calculation unit PU6, based on the converted data $Zi[j]$ inputted, calculates a product of weight data W6 inputted through the input terminal T70-6 and the compressed data $Y_i$, calculates a sum of the calculated product thereof and the calculated resulting data inputted from the fundamental calculation unit PU5, and then, outputs the result from the output terminal T74.

Figure 14A:
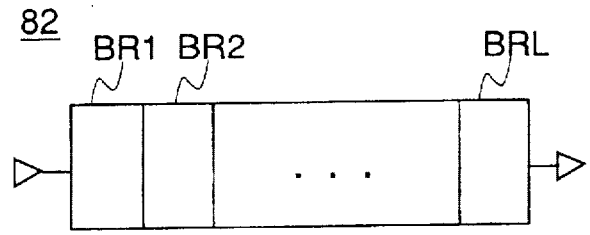
FIG. 14A is a block diagram showing a configuration of a line buffer 82.

FIG. 14A shows a configuration of the line buffer 82 using shift registers. The line buffer 82 of FIG. 14A includes registers BR1, BR2, ..., BRL which are connected in series, and input data is transferred successively to right-hand registers BRk (k=1, 2, ..., L) in response to a predetermined clock signal. If the input data exceeds the length L, the data are outputted, starting with the data that has been first inputted.

Figure 14B:
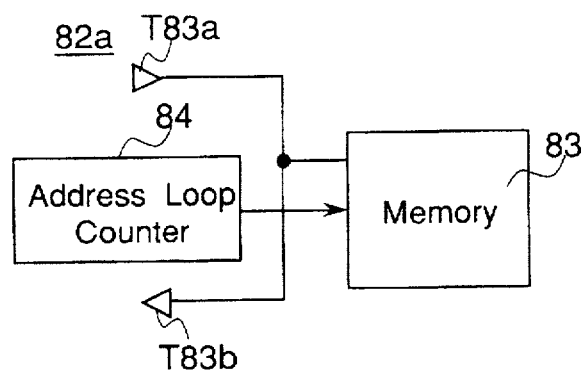

FIG. 14B is a block diagram showing a configuration of a line buffer 82a different from the line buffer 82 of FIG. 14A. The line buffer 82a includes a memory 83 and an address loop counter 84. The address loop counter 84 generates and outputs address data representing a predetermined address adr to the address terminal of the memory 83 through an address bus. The memory 83 outputs the data stored at the address adr based on the address data inputted from the address loop counter 84, from an output terminal T83b through a data bus, and moreover, stores data inputted from an input terminal T83a through the data bus, to the address adr of the memory 83.

Next, a calculation process of the line buffer 82a of FIG. 14B is described hereinafter with reference to a flowchart of FIG. 14C.

Figure 14C:
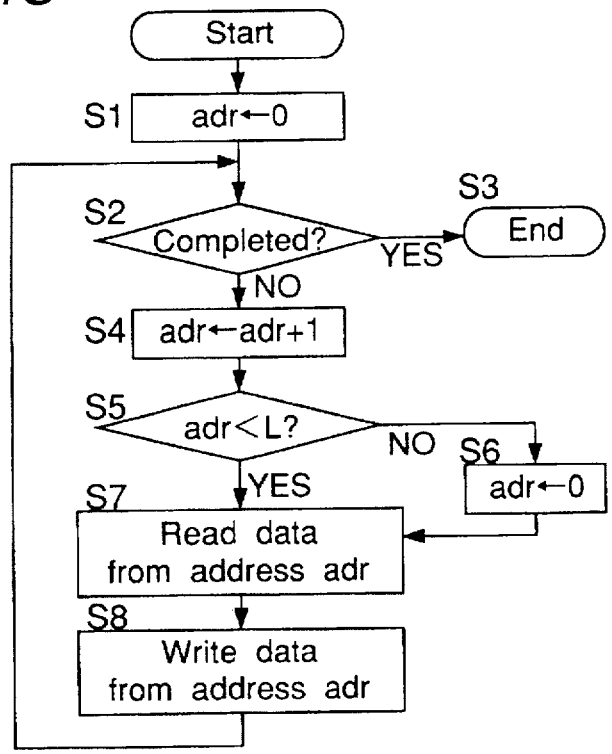
FIG. 14C is a flowchart showing a calculation process of the line buffer 82a of FIG. 14B.

Referring to FIG. 14C, first of all, at Step S1, the address adr is set to zero. At Step S2, it is decided whether or not the calculating process of the product-sum calculation unit integrated circuit apparatus PS8 has been completed. If it has been completed, the program flow goes to Step S3, at which the processing of the line buffer 82a is completed. If the calculating process has not been completed, the program flow goes to Step S4. At Step S4, address (adr+1) is substituted into the address adr, and then, an address adr is set, and the program flow goes to Step S5. At Step S5, it is decided whether address adr<L. If address adr<L, then the program flow goes to Step S7, otherwise the program flow goes to Step S6. At Step S6, "zero" is substituted into the address adr to set the address adr, and then, the program flow goes to Step S7. At Step S7, data stored at the address adr of the memory 83 is read out and outputted from the output terminal 83b, and then, the program flow goes to Step S8. At Step S8, data inputted from the input terminal T83a is written and stored at the address adr of the memory 83, and the program flow goes to Step S2. After this, by repeating Steps S3 through S8, the same calculation as that of the line buffer 82 of FIG. 14A can be effected. Therefore, in the product-sum calculation unit integrated circuit apparatus PS8, the line buffer 82a of FIG. 14B may be also used instead of the line buffer 82 of FIG. 14A. It is noted that, in the product-sum calculation unit integrated circuit apparatus PS8, the length L of the line buffer 82 or the line buffer 82a is set to 3. By this setting, the line buffer 82 temporarily holds or store data of three clock signal cycles.

Next explained is a calculation process of the product-sum calculation unit integrated circuit apparatus PS8 of FIG. 13 constructed as described above. For a cycle T=i, second input data $X_i$ of a time series signal is inputted to the data converter 72 through the input terminal T71, the input time series signal is compressed by the data converter 72 into such compressed data $Y_i$ that the bit width is larger than that of the second input data $X_i$ 41 by one order, that the number of bit signals whose bit status is "1" is not larger than the number of iterations NUM, and yet that the difference from the second input data $X_i$ is the minimum. Further, the compressed data $Y_i$ is converted into converted data $Zi[1], \ldots, Zi[NUM]$ representing the positions of bit signals whose bit status is "1". The converted data Zi[j] (j=1, 2, ..., NUM) are inputted sequentially to the barrel shifter 44 of the fundamental calculation units Puk. Each fundamental calculation unit Puk can obtain the output data of $WkY_1$+(third input) for a cycle T=i. It is noted that the third input data is offset data $O_1$ inputted from the input terminal T75 in this case of the fundamental calculation unit PU1, while the third input data is calculation data outputted from the fundamental calculation unit PU(k−1) in the case of the fundamental calculation units Puk(k=2, 3, 4, 5, 6). In addition, $WkY_j=$ $WkX_j$+(conversion error), wherein the conversion error changes depending on the value of the number of iterations NUM.

Next, the data flow in the product-sum calculation unit integrated circuit apparatus PS8 is described hereinafter with reference to FIGS. 15A, 15B, 15C, 15D, 15E, 15F and 15G. It is assumed that, in FIGS. 15A to 15G, the offset data $O_1=0$ in this case.

Figure 15A:
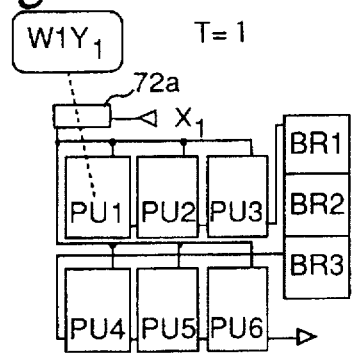
Figure 15B:
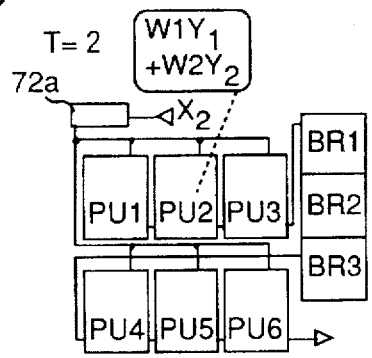
Figure 15C:
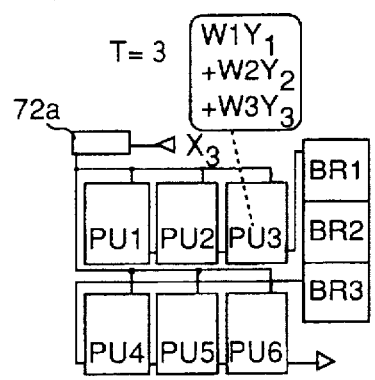
Figure 15D:
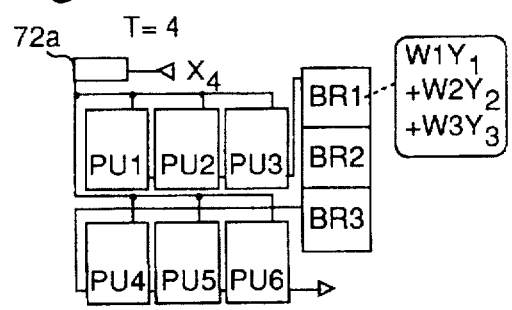
Figure 15E:
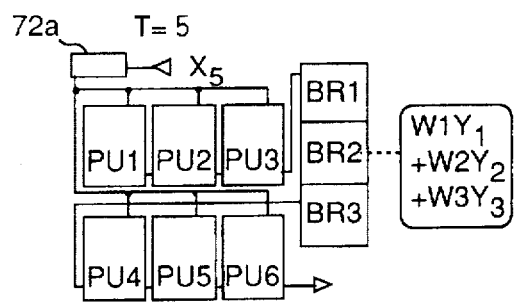
Figure 15F:
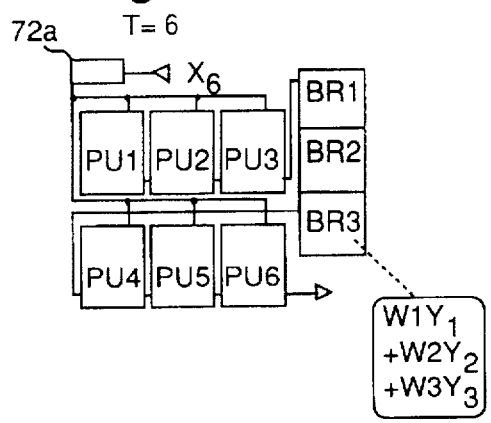
Figure 15G:
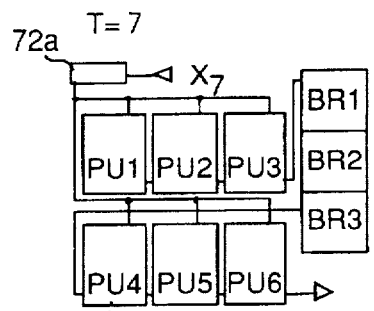

For a cycle T=1, as shown in FIG. 15A, data $W1Y_1$ is calculated by the fundamental calculation unit PU1. For a cycle T=2, as shown in FIG. 15B, data ($W2Y_2$+(data outputted from fundamental calculation unit PU1)), i.e., data ($W2Y_2+W1Y_1$) is calculated by the fundamental calculation unit PU2. For a cycle T=3, as shown in FIG. 15C, data ($W3Y_3$+(data outputted from fundamental calculation unit PU2)), i.e., data ($W3Y_3+W2Y_2+W1Y_1$) is calculated by the fundamental calculation unit PU3. For a cycle T=4, as shown in FIG. 15D, data ($W3Y_3+W2Y_2+W1Y_1$) is held by the register BRI of the line buffer 82. For a cycle T=5, as shown in FIG. 15E, the data ($W3Y_3+W2Y_2+W1Y_1$) transferred from the register BR1 is held by the register BR2. For a cycle T=6, as shown in FIG. 15F, the data ($W3Y_3+W2Y_2+W1Y_1$) transferred from the register BR2 is held by the register BR3. For a cycle T=7, as shown in FIG. 15G, data ($W1Y_7$+(data outputted from register BR3)), i.e., data ($W4Y_7+W3Y_3+W2Y_2+W1Y_1$) is calculated. For a cycle T=8, data ($W5Y_8$+(data outputted from fundamental calculation unit PU4)), i.e., data ($W5Y_8+W4Y_7+W3Y_3+W2Y_2+W1Y_1$) is calculated by the fundamental calculation unit PU5. For a cycle T=9, data ($W6Y_9$+(data outputted from fundamental calculation unit PU5)), i.e., data ($W6Y_9+W5Y_8+W4Y_7+W3Y_3+W2Y_2+W1Y_1$) is calculated by the fundamental calculation unit PU6, and then the calculated data is outputted as the calculated resulting data.

As is apparent from above, data ($W6Y_{i+8}+W5Y_{i+7}+W4Y_{i+6}+W3Y_{i+2}+W2Y_{i+1}+W1Y_i$, i=1, 2, 3, ...) are outputted sequentially for each cycle from the output terminal T74. The product-sum calculation unit integrated circuit apparatus PS8 which operates in the manner as described above is capable of executing two types of calculations. The first one is a convolution integral of the second input data ($X_1, X_2, X_3, ...$) and the kernel image data (W1, W2, W3, 0, 0, 0, W4, W5, W6). The second one is a convolution integral of six-width two-dimensional data {$X_i$} as shown in FIG. 16A and a 3×2 kernel image data (W1, W2, W3; W4, W5, W6) as shown in FIG. 16B. Generally speaking, if the image size is m×n, and the kernel size of the kernel image data is a×b, then it is proper to set the length of the line buffer to L=m−a.

In the calculations of the product-sum calculation unit integrated circuit apparatus PS8, not the second input data $X_i$ but compressed data $Y_i$ is used. As a result, when the number of iterations NUM<(bit width of $X_i$), conversion errors occur. The effect of these conversion errors on image convolution integral was evaluated by a simulation performed by the present inventors. For this simulation, 8-bit precision input images of 256×240 pixels was used, and image data passed through a 16×16 Laplacian filter as shown in FIG. 17 was used as a kernel image data. The calculations were executed on one case where the number of iterations NUM=8, i.e., compressed data $Y_i$=second input data $X_i$ and another case where the number of iterations NUM=4.

Figure 18A:
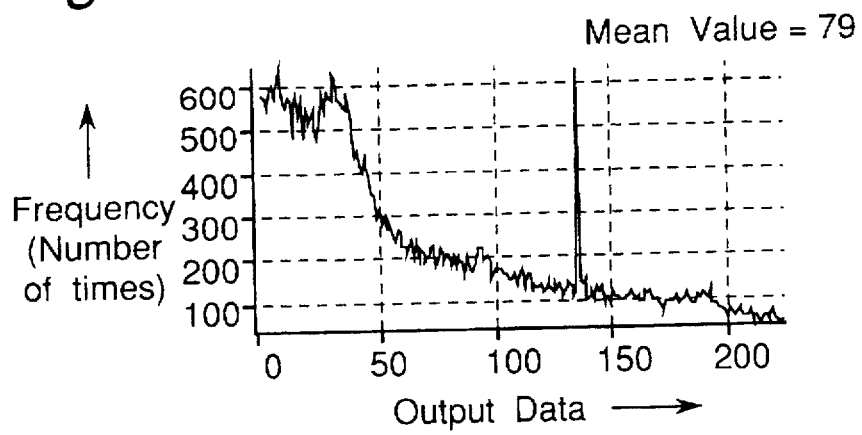
FIG. 18A is a graph showing a frequency distribution of pixel values in a calculated result with the number of iterations NUM=8.
Figure 18B:
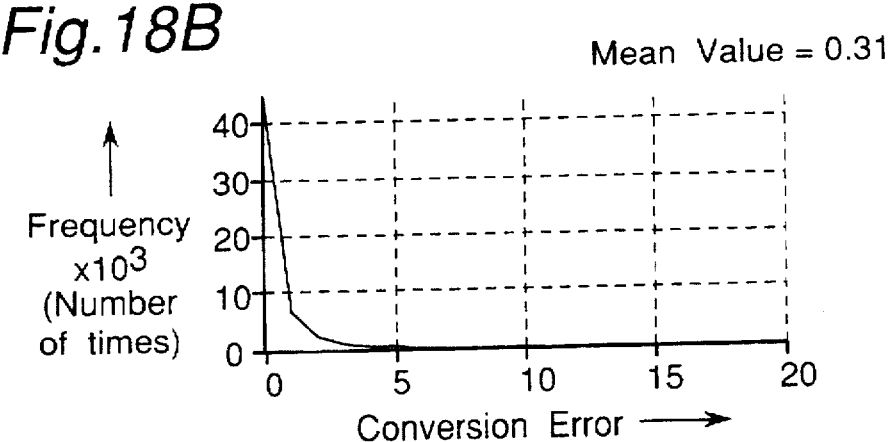
FIG. 18B is a graph showing a frequency distribution of pixel value differences between a number of iterations NUM=8 and another number of iterations NUM=4.

FIG. 18A shows a frequency distribution of values of individual pixels in the calculated results with number of iterations NUM=8, where the size was standardized to within 8 bits (255). FIG. 18B shows a distribution of differences between values of the individual pixels on both cases of NUM=8 and NUM=4. It can be established that the effect of conversion errors due to NUM=4 on the image convolution integral is very small.

According to the product-sum calculation unit integrated circuit apparatus PS8 of the eighth preferred embodiment as described above, it is possible, for example, to execute a convolution integral on raster scanned images without externally providing a buffer memory. Thus, image processing apparatuses using the product-sum calculation unit integrated circuit apparatus PS8 can be lower priced, and further can be more easily mounted on a printed circuit board, as compared with image processing apparatuses not using the product-sum calculation unit integrated circuit apparatus PS8.

Ninth Preferred Embodiment

Figure 19:
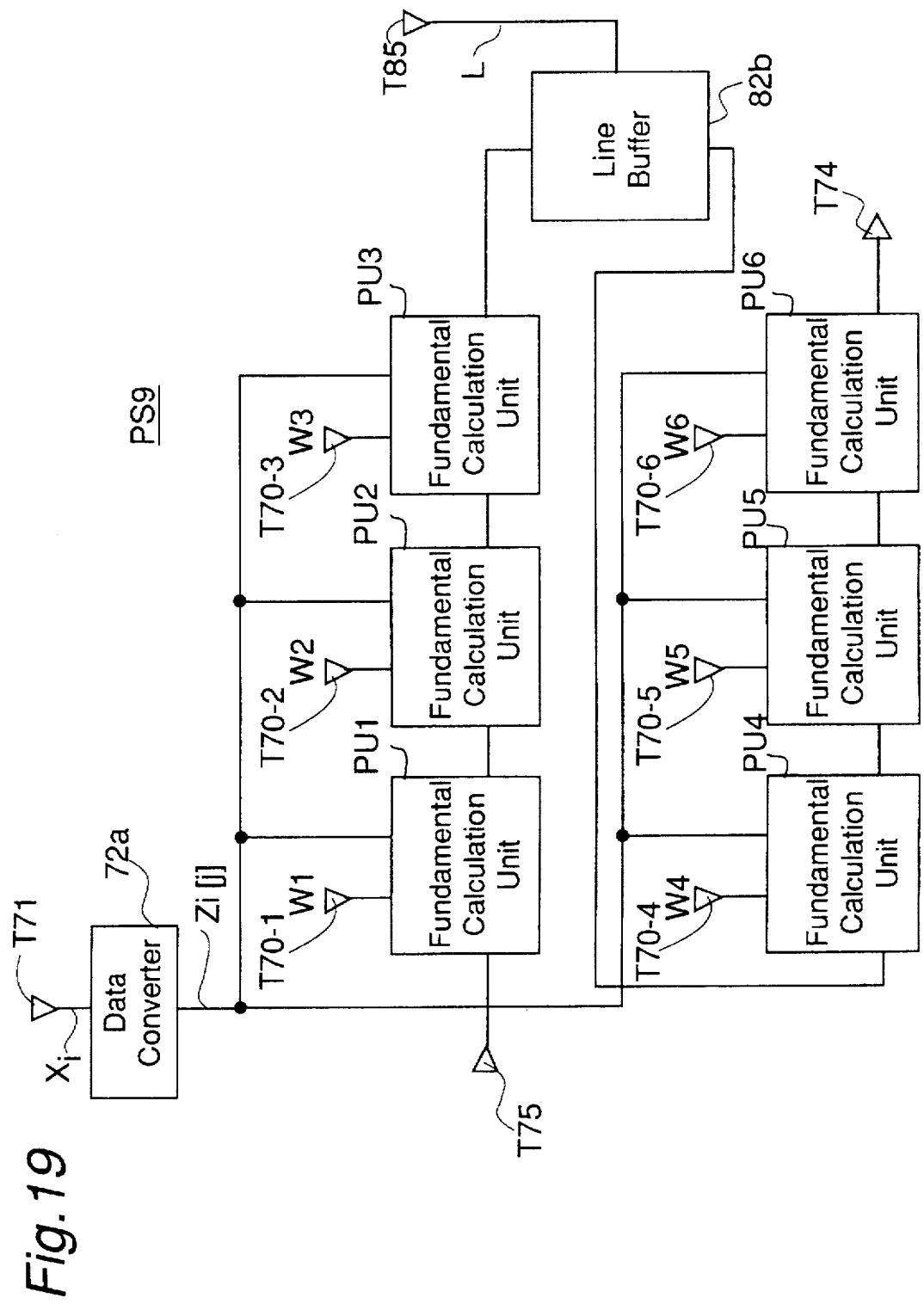
FIG. 19 is a block diagram showing a configuration of a product-sum calculation unit integrated circuit apparatus PS9 of the ninth preferred embodiment according to the present invention.
Figure 20A:
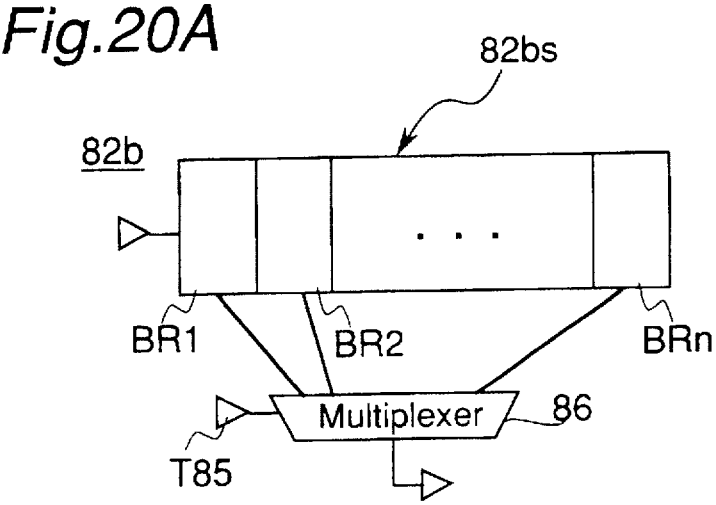
FIG. 20A is a block diagram showing a configuration of a line buffer 82b of FIG. 19.

FIG. 19 is a block diagram showing a configuration of a product-sum calculation unit integrated circuit apparatus PS9 of the ninth preferred embodiment. The product-sum calculation unit integrated circuit apparatus PS9 differs from the product-sum calculation unit integrated circuit apparatus PS8 of FIG. 13 in that a line buffer 82b is used instead of the line buffer 82 of the product-sum calculation unit integrated circuit apparatus PS9 of FIG. 13. The line buffer 82b of a serial line buffer memory, as shown in FIG. 20A, is a so-called variable-length line buffer includes a shift register 82bs having registers BR1 to BRn connected to one another in series, and a multiplexer 86. In more detail, in the line buffer 82b, the shift register 82bs inputs data inputted in synchronization with a predetermined clock signal, successively to the succeeding-stage register Brk, while the shift register 82bs shifts the data stored in each register Brk to the succeeding-stage register BR(k+1) and stores therein. Further, each of the registers Brk outputs stored data to the multiplexer 86. The multiplexer 86 selects and outputs one data piece inputted from either one register BRL based on a length L inputted through an input terminal T85, out of the data inputted from each of the registers Brk.

In the line buffer 82b, the input data is transferred sequentially to the right-succeeding register Brk, and the signal data of the L-th register BRL, as counted from the leftmost, is selected and outputted by the multiplexer 86. Thus, the line buffer 82b of length L can be implemented.

Figure 20B:
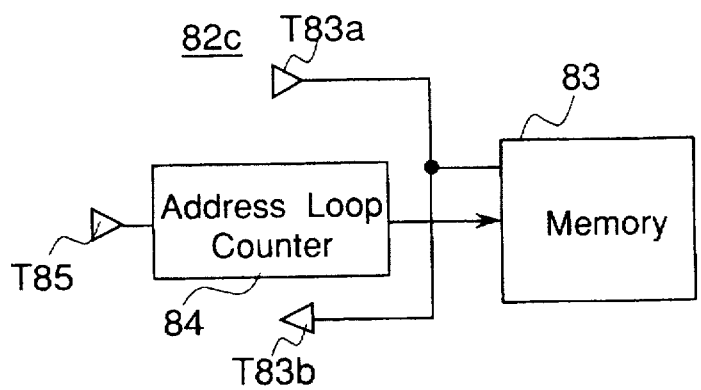
FIG. 20B is a block diagram showing a line buffer 82c which is different from the line buffer 82b of FIG. 20A.

Further, a line buffer 82c as shown in FIG. 20B includes a memory 83 and a address loop counter 84. The line buffer 82c differs from the line buffer 82a of FIG. 14B in that an input terminal T85 for inputting a length L to the address loop counter 84 is provided. Thus, the line buffer 82c becomes possible to set the length at which the memory address to be accessed is looped, to a value given prom the external unit. That is, if a predetermined length L is inputted to the input terminal T85, then the line buffer 82c of length L can be implemented. Consequently, the product-sum calculation unit integrated circuit apparatus PS9 of the ninth preferred embodiment may be configured by using the line buffer 82c of FIG. 20B in place of the line buffer 82b.

In the product-sum calculation unit integrated circuit apparatus PS9 constructed as described above, weight data Wi (i=1, 2, ..., 6) is inputted to fundamental calculation units PUi through input terminals T70-i, while second input data $X_i$ is inputted through the input terminal T71. Further, to the line buffer 82b, a signal representing a parameter L for setting the length of the line buffer is inputted through the input terminal T85. Now if the length L=3, then the product-sum calculation unit integrated circuit apparatus PS9 operates in a manner similar to that of the eighth preferred embodiment. More specifically, data $(W6Y_{i+8}+W5Y_{i+7}+W4Y_{i+6}+W3Y_{i+2}+W2Y_{i+1}+W1Y_i)$ is outputted from the fun through the output terminal T74 one by one for each cycle. A convolution integral of the second input data $\{X_i\}$, two-dimensional data of six-width, and a 3 ×2 kernel image data (W1, W2, W3; W4, W5, W6) is executed. In the case of a length L=0, data $(W6Y_{i+5}+W5Y_{i+4}+W4Y_{i+3}+W3Y_{i+2}+W2Y_{i+1}+W1Y_i)$ is outputted from the output terminal T74 one by one for each cycle. A convolution integral of the second input data $\{X_i\}$, two-dimensional data of width 6, and a 6×1 kernel image data (W1, W2, W3, W4, W5, W6) is executed.

Figure 21A:
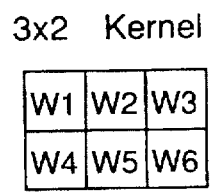
FIG. 21A is a block diagram showing a kernel image data selectable when a length L of the line buffer 82b is set to 3 in the product-sum calculation unit integrated circuit apparatus PS9 of FIG. 19.
Figure 21B:
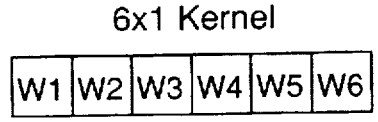
FIG. 21B is a block diagram showing a kernel image data selectable when the length L of the line buffer 82b is set to zero in the product-sum calculation unit integrated circuit apparatus PS9 of FIG. 19.

As described above, according to the product-sum calculation unit integrated circuit apparatus PS9 of the ninth preferred embodiment, the configuration of a kernel image data as shown in FIG. 21A can be selected by setting the magnitude of length L to "zero", while the configuration of a kernel image data as shown in FIG. 21B can be selected by setting the magnitude of length L to "m–a" (6–3=3 in this case). Further, even if the size (m×n) of image has changed, the product-sum calculation unit integrated circuit apparatus PS9 can cope with the change by changing the length L (=m–a). That is, one circuit or one chip can cope for different image sizes and kernel image data configurations.

Tenth Preferred Embodiment

Figure 22:
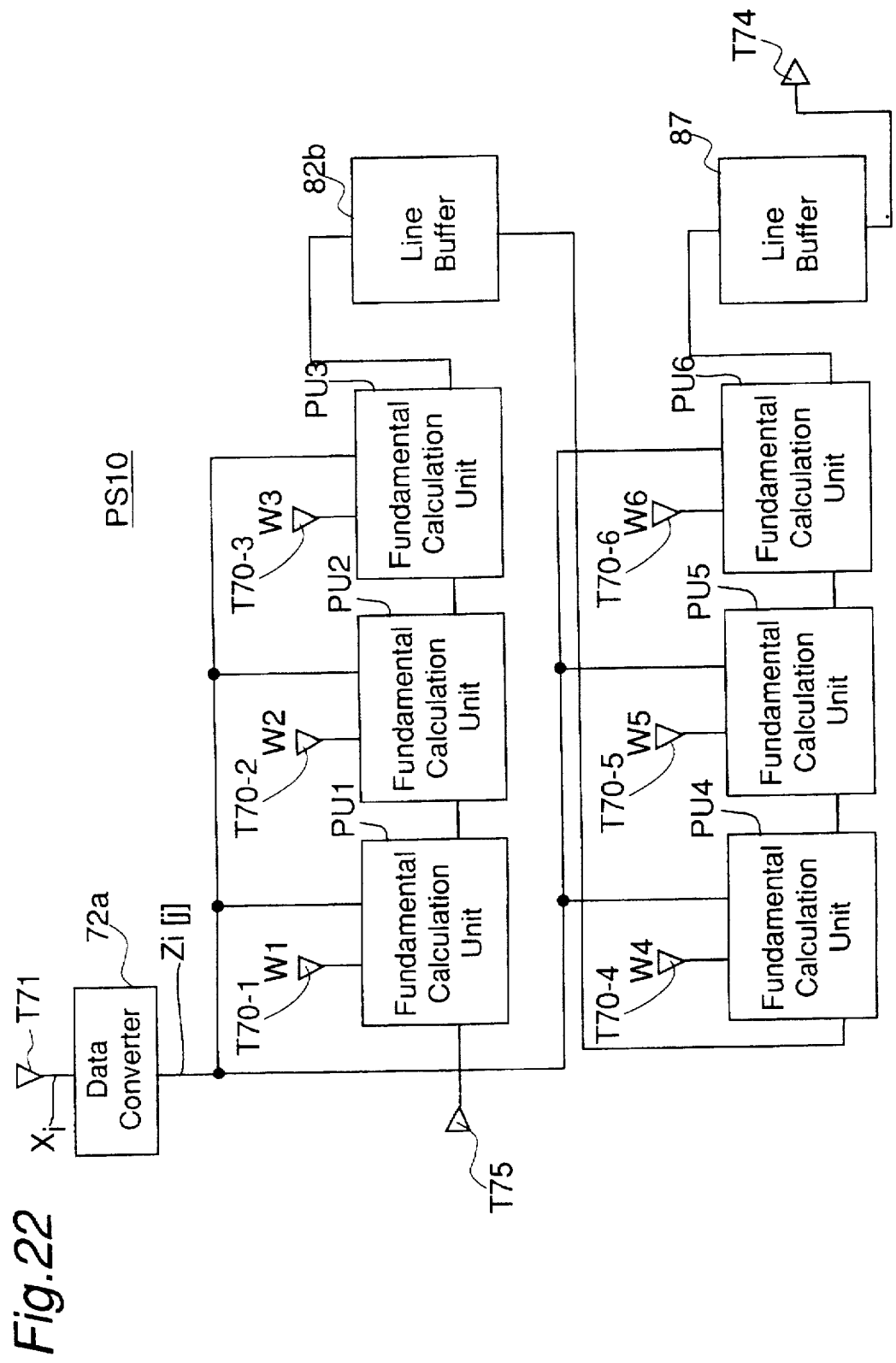
FIG. 22 is a block diagram showing a configuration of a product-sum calculation unit integrated circuit apparatus PS10 of the tenth preferred embodiment according to the present invention.

FIG. 22 is a block diagram showing a configuration of a product-sum calculation unit integrated circuit apparatus PS10 of the tenth preferred embodiment according to the present invention. Referring to FIG. 22, the product-sum calculation unit integrated circuit apparatus PS10 differs from the product-sum calculation unit integrated circuit apparatus PS9 of FIG. 19 in that a line buffer 87 of a serial line buffer memory is provided between the fundamental calculation unit PU6 and the output terminal T74.

In the product-sum calculation unit integrated circuit apparatus PS10 constructed as described above, weight data Wi (i=1, 2, ..., 6) is inputted to fundamental calculation units Pui through input terminals T70-i, while second input data $X_i$ is inputted through the input terminal T71. Then, a signal outputted from the fundamental calculation unit PU6 is outputted through the output terminal T74 with a delay of the length L of the line buffer 87. That is, for a cycle T=i+5+L, data $(W6Y_{i+5}+W5Y_{i+4}+W4Y_{i+3}+W3Y_{i+2}+W2Y_{i+1}+W1Y_i)$ is outputted. The timing for output data of calculated results (magnitude of delay) can be adjusted. This allows a plurality of product-sum calculation unit integrated circuit apparatuses PS10 to be connected as shown by the following the eleventh preferred embodiment of FIG. 23. Consequently, the output timing can be adjusted so that connection with other devices or elements can be implemented with simplicity.

Eleventh Preferred Embodiment

FIG. 23 is a block diagram showing a configuration of a product-sum calculation unit integrated circuit apparatus PS11 of the eleventh preferred embodiment according to the present invention. Referring to FIG. 23, the product-sum calculation unit integrated circuit apparatus PS11 is configured by connecting two product-sum calculation unit integrated circuit apparatuses PS9 and PS10 in series. That is,
the output terminal T74 of the product-sum calculation unit integrated circuit apparatus PS10 and the input terminal T75 of the product-sum calculation unit integrated circuit apparatus PS9 are connected to each other. In this case, the product-sum calculation unit integrated circuit apparatus PS9 is configured in a manner similar to that of the ninth preferred embodiment, and the product-sum calculation unit integrated circuit apparatus PS10 is configured in a manner similar to that of the tenth preferred embodiment. Further, the product-sum calculation unit integrated circuit apparatus PS9 and the product-sum calculation unit integrated circuit apparatus PS10 have the same second input data $X_i$ inputted thereto.

The calculation process of the product-sum calculation unit integrated circuit apparatus PS11 constructed as described above is explained hereinafter. It is assumed here that the second input data $X_i$ is "m×n" image data. The length L of line buffers 82b of the product-sum calculation unit integrated circuit apparatuses PS9 and PS10 is set to zero, and the length of a line buffer 87 of the product-sum calculation unit integrated circuit apparatus PS10 is set to "m–6". If weight data inputted to the fundamental calculation units PU1 to PU6 of the product-sum calculation unit integrated circuit apparatus PS10 are W1, W2, ..., W6, then data $(W6Y_6+W5Y_5+...+W1Y_1)$ is outputted from the output terminal T74 of PM10 for a cycle T=m. This signal is inputted to the input terminal T75 of the product-sum calculation unit integrated circuit apparatus PS9. If weight data inputted to the fundamental calculation units PU1 to PU6 of the product-sum calculation unit integrated circuit apparatus PS9 are W7, W8, ..., W12, respectively, then the output data from PM9 for a cycle T=m+6 is data $(W12Y_{m+6}+...+W7Y_{m+1}+W6Y_6+...+W1Y_1)$. This is resulting data of the convolution integral of the second input data $\{X_i\}$ and the 6=2 kernel image data (W1, W2, ..., W6; W7, W8, ..., W12).

The product-sum calculation unit integrated circuit apparatus PS11a of FIG. 25 is configured by connecting "b" product-sum calculation unit integrated circuit apparatuses PS10-1 to PS10-b in series. The product-sum calculation unit integrated circuit apparatuses PS10-1 to PS10-b are configured in a manner similar to that of the product-sum calculation unit integrated circuit apparatus PS10 of the tenth preferred embodiment. The product-sum calculation unit integrated circuit apparatus PS11a constructed as described above is capable of executing a convolution integral using a "16×b" kernel image data. That is, the kernel size of the kernel image data with which calculations can be executed can be enlarged the "b", times in one direction by connecting the "b" product-sum calculation unit integrated circuit apparatuses PS10-1 to PS10-b with one another. Further, the product-sum calculation unit integrated circuit apparatuses PS10 can be connected directly with one another, so that no other devices or elements are required. Thus, the product-sum calculation unit integrated circuit apparatus PS11a is suitable for on-board mounting using the multi-chip module technique.

Twelfth Preferred Embodiment

Figure 26:
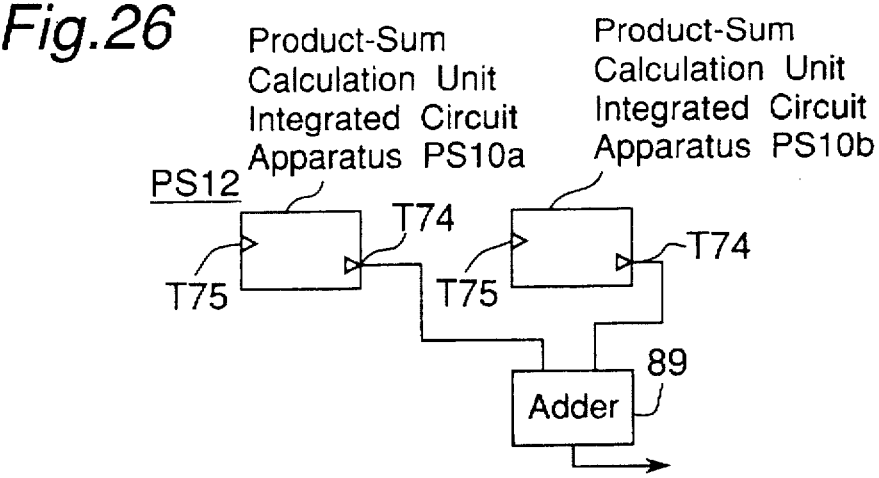
FIG. 26 is a block diagram showing a product-sum calculation unit integrated circuit apparatus PS12 of the twelfth preferred embodiment according to the present invention.

FIG. 26 is a block diagram showing a configuration of a product-sum calculation unit integrated circuit apparatus PS12 of the twelfth preferred embodiment according to the present invention. Referring to FIG. 26, the product-sum calculation unit integrated circuit apparatus PS12 includes:

(a) two product-sum calculation unit integrated circuit apparatuses PS10a and PS10b constructed in a manner similar to that of the tenth preferred embodiment of FIG. 22; and (b) an adder 89 for adding calculated resulting data outputted from the product-sum calculation unit integrated circuit apparatuses PS10a and PS10b.

The product-sum calculation unit integrated circuit apparatus PS10a and the product-sum calculation unit integrated circuit apparatus PS10b are configured in a manner similar to that of the product-sum calculation unit integrated circuit apparatus PS10 of the tenth preferred embodiment. Further, the product-sum calculation unit integrated circuit apparatus PS10a and the product-sum calculation unit integrated circuit apparatus PS10b have the same second input data $X_i$ inputted thereto.

Figure 27:
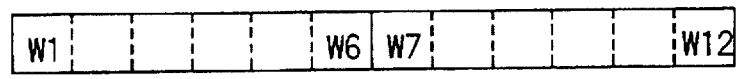
FIG. 27 is a block diagram showing a 12×1 kernel image data used for explaining a calculation process of the product-sum calculation unit integrated circuit apparatus PS12 of FIG. 26.

Next, the calculation process of the product-sum calculation unit integrated circuit apparatus PS12 constructed as described above is explained hereinafter. It is assumed that the length of line buffers 82b of the product-sum calculation unit integrated circuit apparatuses PS10a and PS10b is set to zero, the length L of a line buffer 87 of PS10a is set to 6, and the length L of a line buffer 87 of the product-sum calculation unit integrated circuit apparatus PS10b is set to zero. If weight data inputted to the fundamental calculation units PU1 to PU6 of the product-sum calculation unit integrated circuit apparatus PS10a are W1, W2, ..., W6, then data $(W6Y_6+W5Y_5+\ldots+W1Y_1)$ is outputted from the output terminal T74a of the product-sum calculation unit integrated circuit apparatus PS10a for a cycle T=12. On the other hand, if weight data inputted to the fundamental calculation units PU1 to PU6 of the product-sum calculation unit integrated circuit apparatus PS10b are W7, W8, ..., W12, respectively, then data $(W12Y_{12}+W11Y_{11}+\ldots+W7Y_7)$ is outputted from the output terminal T74b of the product-sum calculation unit integrated circuit apparatus PS10b for a cycle T=12. Adding up these data results in data $(W12Y_{12}+\ldots+W1Y_1)$. In this way, a convolution integral of the second input data $\{X_i\}$ and the 12×1 kernel image data as shown in FIG. 27 can be executed.

Thirteenth Preferred Embodiment

Figure 28:
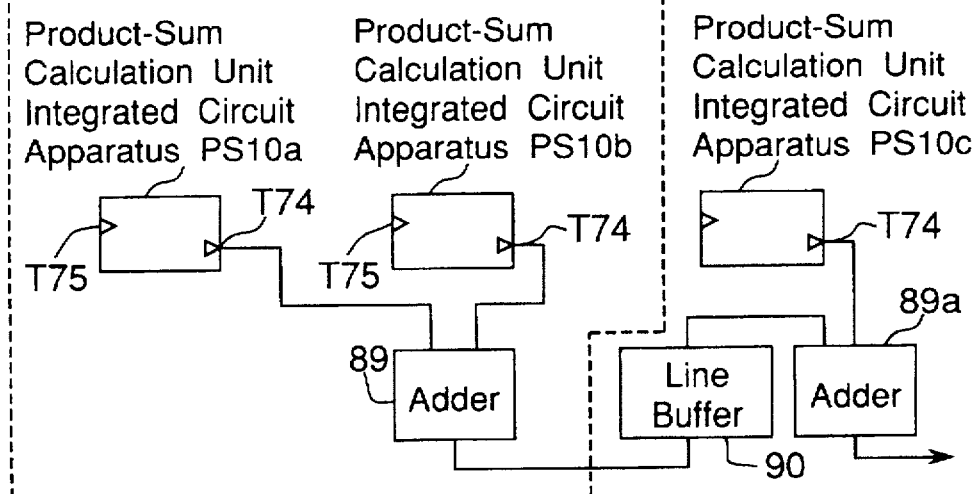
FIG. 28 is a block diagram showing a configuration of a product-sum calculation unit integrated circuit apparatus PS13 of the thirteenth preferred embodiment according to the present invention.
Figure 29:
FIG. 29 is a block diagram showing a 18×1 kernel image data used for explaining a calculation process of the prof the product-sum calculation unit integrated circuit apparatus PS13 of FIG. 28.
Figure 30:
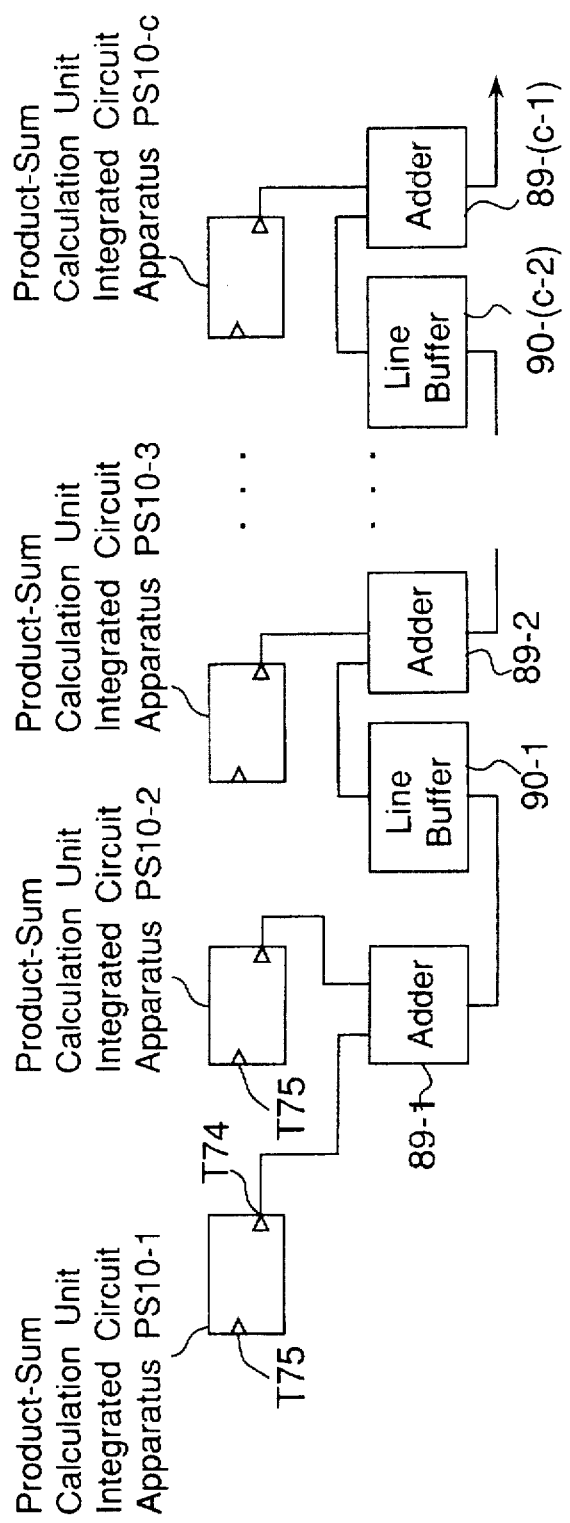
FIG. 30 is a block diagram showing a configuration of a product-sum calculation apparatus PM13a, which is a modification of the product-sum calculation unit integrated circuit apparatus PS13 of FIG. 28.

FIG. 28 is a block diagram showing a configuration of a product-sum calculation unit integrated circuit apparatus PS13 of the thirteenth preferred embodiment according to the present invention. Referring to FIG. 28, the product-sum calculation unit integrated circuit apparatus PS13 includes:

(a) the product-sum calculation unit integrated circuit apparatus PS12 of FIG. 26;

(b) a conjunction line buffer 90 for temporarily holding or storing data outputted from the adder 89 of the product-sum calculation unit integrated circuit apparatus PS12 for a period of six clock signal cycles and then outputting it to an adder 89a;

(c) a product-sum calculation unit integrated circuit apparatus PS10c; and (d) the adder 89a for adding up a signal outputted from the product-sum calculation unit integrated circuit apparatus PS10c and data outputted from the conjunction line buffer 90.

The product-sum calculation unit integrated circuit apparatus PS10c is configured in a manner similar to that of the product-sum calculation unit integrated circuit apparatus PS10 of the tenth preferred embodiment.

Next, the calculation process of the product-sum calculation unit integrated circuit apparatus PS13 constructed as described above is explained hereinafter. The length L of line buffers 82b of the product-sum calculation unit integrated circuit apparatuses PS10a, PS10b and P10c is set to zero, respectively, the length L of a line buffer 87 of the product-sum calculation unit integrated circuit PM10a is set to 6, and the length L of line buffers 87 of the product-sum calculation unit integrated circuits PM10b and PM10c is set to zero. The length L of the conjunction line buffer 90 is set to 6. If weight data inputted to the fundamental calculation units PU1 to PU6 of the product-sum calculation unit integrated circuit apparatus PS10a are W1, W2, ..., W6, then data $(W6Y_6+W5Y_5+\ldots+W1Y_1)$ is outputted from the product-sum calculation unit integrated circuit apparatus PS10a for a cycle T=12. On the other hand, if weight data inputted to the fundamental calculation units PU1 to PU6 of the product-sum calculation unit integrated circuit apparatus P10b are W7, W8, ..., W12, respectively, then data $(W12Y_{12}+W11Y_{11}+\ldots+W7Y_7)$ is outputted from the product-sum calculation unit integrated circuit apparatus PS10b for a cycle T=12. Adding this data results in data $(W12Y_{12}+\ldots+W1Y_1)$ for a cycle T=12. This value is held for a period of six clock signal cycles by the conjunction line buffer 90, and inputted to the adder 89a for a cycle T=18. If weight data inputted to the fundamental calculation units PU1 to PU6 of the product-sum calculation unit integrated circuit apparatus PS10c are W13, ..., W18, respectively, then data $(W18Y_{18}+W17Y_{17}+\ldots+W13Y_{13})$ is outputted from the product-sum calculation unit integrated circuit apparatus PS10c for a cycle T=18. As a result, the output data of the adder 89a with T=18 is data $(W18Y_8+\ldots+W1Y_1)$. In this way, a convolution integral of the second input data $\{X_i\}$ and the 18×1 kernel image data as shown in FIG. 28 can be executed.

Similarly, a product-sum calculation unit integrated circuit apparatus PS13a can be constructed by connecting "c" product-sum calculation unit integrated circuit apparatuses PS10-1 to PS10-c, (c−2) conjunction line buffers 90-1 to 90-(c−2), and (c−1) adders 89-1 to 89-(c−2) in the way as described below.

In the product-sum calculation unit integrated circuit apparatus PS13a, the product-sun calculation unit integrated circuit apparatus PS10-1 and the product-sum calculation unit integrated circuit apparatus PS10-2 output their respective calculated resulting data to an adder 89-1, respectively. The adder 89-1 adds the calculated resulting data outputted from the product-sum calculation unit integrated circuit apparatus PS10-1 and the calculated resulting data outputted from the product-sum calculation unit integrated circuit apparatus PS10-2, and then, outputs the resulting data of the sum to a conjunction line buffer 90-1. The conjunction line buffer 90-1 temporarily holds or stores data outputted from the adder 89-1 for a period of six clock signal cycles, and then, outputs the held data to an adder 89-2. The adder 89-2 adds the data outputted from a conjunction line buffer 90-1 and the calculated resulting data outputted from the product-sum calculation unit integrated circuit apparatus PS10-3, and then, outputs the resulting data of the sum to a conjunction line buffer 90-2 (not shown).

Likewise, the product-sum calculation unit integrated circuit apparatus PS10-k (k=4, 5, ..., c) outputs calculated resulting data to the adder 89-(k−1). Further, the adder 89-k (k=3, 4, ..., c−2) adds data outputted from the conjunction line buffer 90-(k−1) and the calculated resulting data outputted from the product-sum calculation unit integrated circuit apparatus PS10-(k+1), and then, outputs the resulting data to the conjunction line buffer 90-k. The conjunction line buffer 90-k (k=2, 3, ..., c−2) temporarily holds or stores data outputted from the adder 89-k for a period of six clock signal cycles, and then outputs the held data to the adder 89-(k+1). The adder 89-(c−1) adds data outputted from the conjunction line buffer 90-(c−2) and the calculated resulting data outputted from the product-sum calculation unit integrated circuit apparatus PS10-c, and outputs the resulting data of the sum. Accordingly, the product-sum calculation unit integrated circuit apparatus PS13a constructed as described above is capable of executing a convolution integral using a (6×c) kernel image data.

Fourteenth Preferred Embodiment

Figure 31:
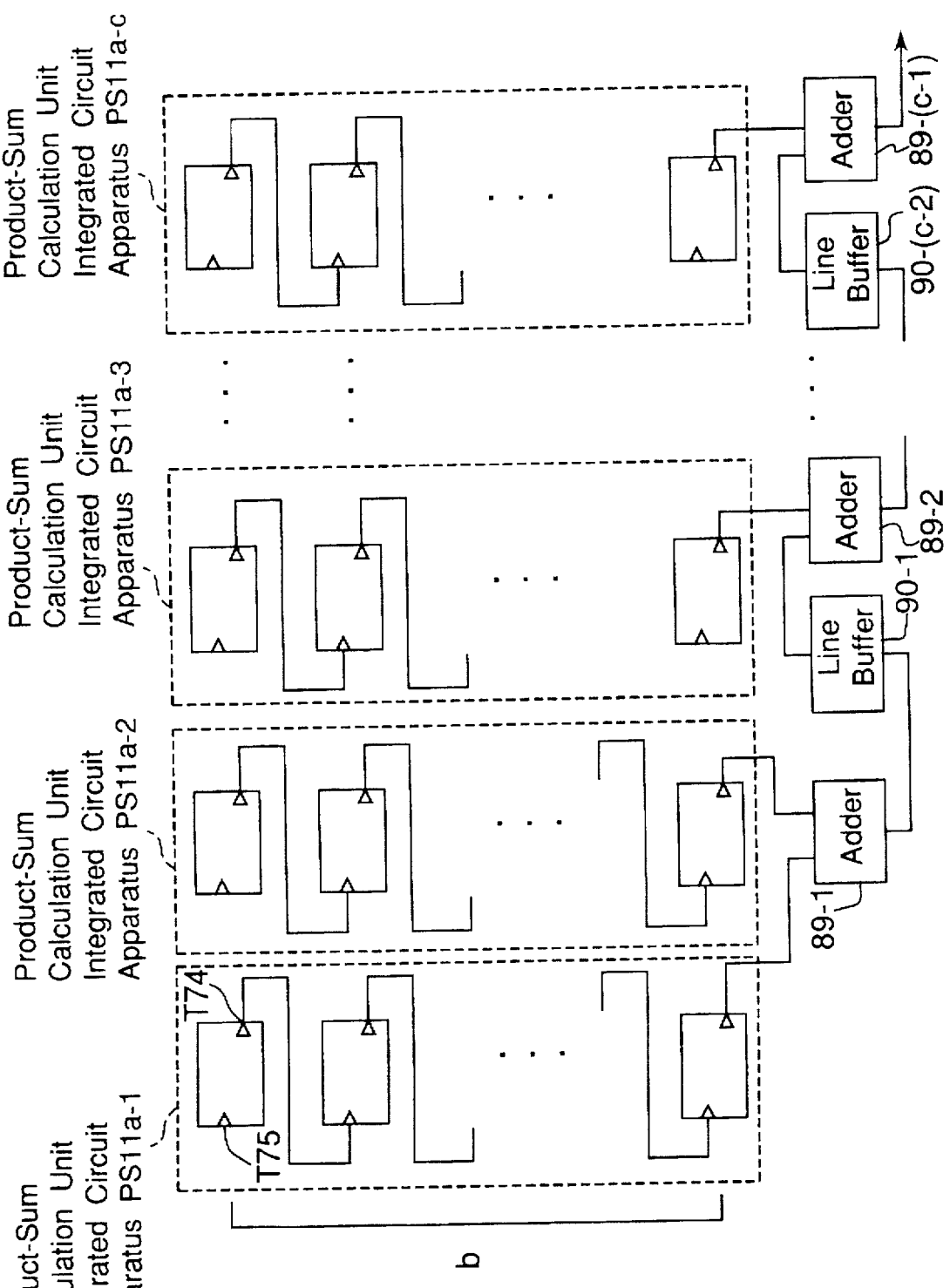
FIG. 31 is a block diagram showing a configuration of a product-sum calculation unit integrated circuit apparatus PS14 of the fourteenth preferred embodiment according to the present invention.

FIG. 31 is a block diagram showing a configuration of a product-sum calculation unit integrated circuit apparatus PS14 of the fourteenth preferred embodiment according to the present invention. Referring to FIG. 31, the product-sum calculation unit integrated circuit apparatus PS14 is characterized in that it includes "c" product-sum calculation unit integrated circuit apparatuses PS11a-1 to PS11a-c, and includes:

(a) product-sum calculation unit integrated circuit apparatuses PS11a-1 to PS11a-c;

(b) (c−1) adders 89-1 to 89-(c−1); and (c) (c−2) conjunction line buffers 90-1 to 90-(c−2).

The product-sum calculation unit integrated circuit apparatuses PS11a-c to PS11a-c are configured in a manner similar to that of the product-sum calculation unit integrated circuit apparatus PS11a of FIG. 25.

In the product-sum calculation unit integrated circuit apparatus PS14, the product-sum calculation unit integrated circuit apparatus PS11a-1 and the product-sum calculation unit integrated circuit apparatus PS11a-2 output their respective calculated resulting data to an adder 89-1, respectively. Further, each of the product-sum calculation unit integrated circuit apparatus PS11a-k (k=3, 4, . . . , c) outputs a calculated resulting data to an adder 89-(k−1). The adder 89-1 adds the calculated resulting data outputted from the product-sum calculation unit integrated circuit apparatus PS11a-1 and the calculated resulting data outputted from the product-sum calculation unit integrated circuit apparatus PS11a-2, and then, outputs the resulting data of the sum to a conjunction line buffer 90-1. The conjunction line buffer 90-1 temporarily holds or stores the addition data outputted from the adder 89-1 for a period of predetermined clock signal cycles, and then, outputs the held data to an adder 89-2. The adder 89-2 adds the calculated resulting data outputted from the product-sum calculation unit integrated circuit apparatus PS11a-3 and the stored data outputted from the conjunction line buffer 90-1, and then, outputs addition resulting data.

The conjunction line buffer 90-k (k=2, 3, c−2) temporarily holds or stores addition data outputted rom the adder 89-k for a period of predetermined clock signal cycles, and then, outputs the held data to the adder 89-(k+1). The adder 89-k (k=3, 4, . . . , c−2) adds the calculated resulting data outputted from the product-sum calculation unit integrated circuit apparatus PS11a-(k+1) and the stored data outputted from the conjunction line buffer 90-(k−1), and then, outputs the addition resulting data. The adder 89-(c−1) adds the calculated resulting data outputted from the product-sum calculation unit integrated circuit apparatus PS11a-c and the stored outputted from the conjunction line buffer 90-(c−2), and then, outputs the addition resulting data as output data of the product-sum calculation unit integrated circuit apparatus PS14. The second input data $\{X_i\}$ is inputted to all the product-sum calculation unit integrated circuit apparatuses PS11a-1 to PS11a-c.

Accordingly, the product-sum calculation unit integrated circuit apparatus PS14 constructed as described above is capable of executing a convolution integral using the second input data $\{X_i\}$ and a (6×c)×(b) kernel image data, as in the calculations in the twelfth and thirteenth preferred embodiments.

Fifteenth Preferred Embodiment

Figure 32:
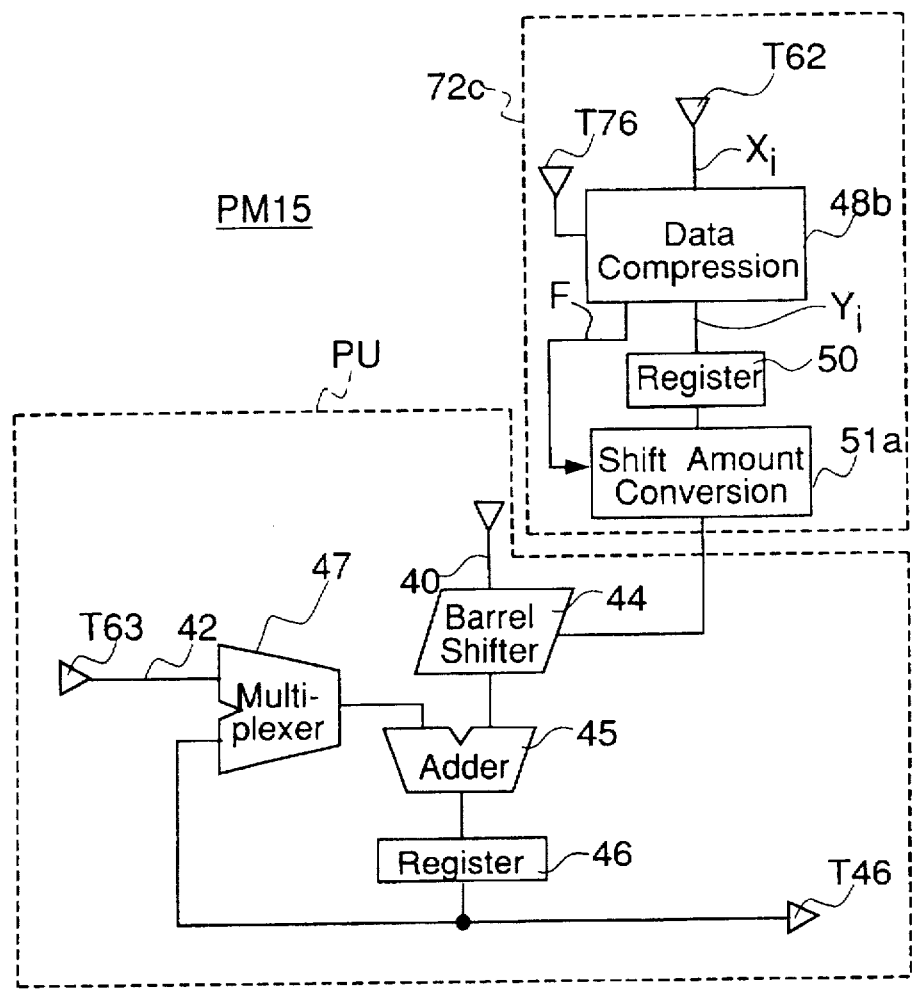
FIG. 32 is a block diagram showing a configuration of a product-sum calculation apparatus PM15 of the fifteenth preferred embodiment according to the present invention.

FIG. 32 is a block diagram showing a configuration of a product-sum calculation apparatus PM15 of the fifteenth preferred embodiment according to the present invention. Referring to FIG. 32, the product-sum calculation apparatus PM15 is constructed by using the fundamental calculation unit PU contained in the product-sum calculation apparatus PM3 of the third preferred embodiment of FIG. 7, and a data converter 72c, and has the following characteristics. That is, in the data converter 72c, the data compression circuit 48b converts second input data $X_i$ into compressed data $Y_i$, and then outputs the compressed data $Y_i$ to a register 50, while the data compression circuit 48b outputs to a shift amount conversion circuit 51a the number F (the maximum NUM) of bit signals whose bit status is "1" out of the compressed data $Y_i$. Then, the shift amount conversion circuit 51a converts the compressed data $Y_i$ into F converted data $Zi(1), \ldots Zi(F)$ representing the positions of bit signals whose bit status is "1" out of the compressed data $Y_i$, and then, outputs the converted resulting data. The shift amount conversion circuit 51a, to which the number F has been inputted from the data compression circuit 48b, starts processing the next second input data $X_{i+1}$ without any waiting time upon completion of the conversion output data of the last converted data Zi(F).

The data converter 72c, as shown in FIG. 32, includes the data compression circuit 48b, the register 50, and the shift amount conversion circuit 51a. The data compression circuit 48b converts the second input data $X_i$ into such compressed data $Y_i$ that the number of bit signals whose bit status is "1" is not larger than NUM, and that the number of digits is more than that of the second input data $X_i$ by one but the difference from the second input data $X_i$ is smaller, and then, outputs the compressed data $Y_i$ to the register 50. Besides, the data compression circuit 48b outputs to the shift amount conversion circuit 51a the number F (the maximum NUM) of bit signals whose bit status is "1" out of the compressed data $Y_i$. In this case, the number of iterations NUM is inputted through an input terminal T76. The shift amount conversion circuit 51a, in response to the compressed data $Y_i$ stored in the register 50, converts the compressed data $Y_i$ into converted data $Zi(1), \ldots, Zi(F)$ representing the positions of bit signals whose bit status is "1", and then, outputs the converted resulting data to the barrel shifter 44. The shift amount conversion circuit 51a, to which the number F has been inputted from the data compression circuit 48b, starts processing the next second input data $Xi_{i+1}$ without any waiting time upon completion of the conversion output data of the last converted data Zi(F) representing the positions of bit signals whose bit status is "1" out of the compressed data Y.

Next the operation of the present apparatus is explained hereinafter. The second input data $X_i$ inputted through an input terminal T62 is converted by the data compression circuit 48b into such compressed data $Y_i$ that the number of bit signals whose bit status is "1" is NUM, and that the number of digits is more than that of the second input data $X_i$ by one but the difference from the second input data $X_i$ is smaller. At this time, the number F (the maximum NUM) of bit signals whose bit status is "1" out of the compressed data $Y_i$ is also outputted. By the shift amount conversion circuit 51a, the compressed data $Y_i$ is converted into converted data $Zi(1), \ldots, Zi(F)$ representing the positions of bit signals whose bit status is "1" out of the compressed data $Y_i$, and the converted data $Zi(1), \ldots, Zi(F)$ are outputted to the barrel shifter 44 of the fundamental calculation unit PU. The fundamental calculation unit PU, in a manner similar to that of the third preferred embodiment, calculates a product of first input data 40 and second input data $X_i$, from the converted data $Zi(1), \ldots, Zi(F)$ derived from the second input data $X_i$ and the first input data 40, and further calculates the sum of the calculated product thereof and the third input data 42, that is, executes a calculation process of (first input data 40)×(second input data $X_i$)+(third input data 42), and then, outputs the result through an output terminal T46.

In the fourth to fourteenth preferred embodiments, since the time for one calculation is given by the time required for executing the number of iterations NUM of shifts and additions, there arises a waiting time if the number of bit signals whose bit status is "1" out of the converted compressed data $Y_i$ is smaller than the number of iterations NUM. In contrast to this, in the product-sum calculation apparatus PM15 of present the fifteenth preferred embodiment, the waiting time can be eliminated or omitted by detecting the number F (the maximum NUM) of bit signals whose bit status is "1" out of the converted data. Therefore, according to the product-sum calculation apparatus PM15 of the fifteenth preferred embodiment, the number of shifts and the number of additions can be set to required minimums according to the second input data $X_i$, so that the calculation time can be reduced.

Sixteenth Preferred Embodiment

Figure 33:
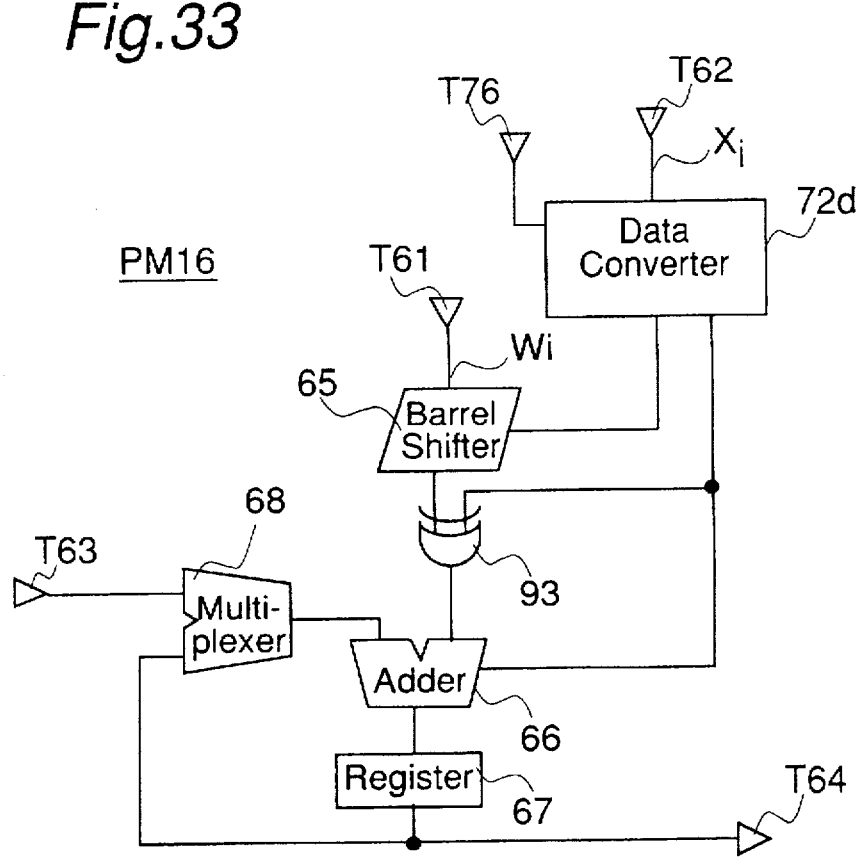
FIG. 33 is a block diagram showing a configuration of a product-sum calculation apparatus PM16 of the sixteenth preferred embodiment according to the present invention.

FIG. 33 is a block diagram showing a configuration of a product-sum calculation apparatus PM16 of the sixteenth preferred embodiment according to the present invention. Referring to FIG. 33, the product-sum calculation apparatus PM16 includes a data converter 72d, a barrel shifter 65, an exclusive OR gate array 93 (hereinafter, referred to as an EX-OR gate array), an adder 66, a register 67, and a multiplexer 68, and has the following features. That is, the data converter 72d converts second input data $X_i$ into $\Sigma Aj \cdot 2^j - \Sigma Bj \cdot 2^j$. If Aj is a status "1", j is outputted to the barrel shifter 65 as the shift amount, while a code signal "zero" is outputted to the EX-OR gate array 93 and the input carry terminal of the adder 66. Conversely, if Bj is a status "1", j is outputted to the barrel shifter 65 as the shift amount, while a code signal "1" is outputted to one input terminal of the gates of the EX-OR gate array 93 and to the input carry terminal of the adder 66.

In the product-sum calculation apparatus PM16, the data converter 72d converts second input data $X_i$ into $\Sigma Aj \cdot 2^j - \Sigma Bj \cdot 2^j$, where $\Sigma$ is a product-sum resulting when j is iterated from j=0 to j=M−1, where M is the number of bits of the second input data $X_i$. Further, Aj and Bj are "zero" or "1", and an example of the method for determining them is shown below. First of all, the first highest-order position where the bit status is "1" out of the second input data $X_i$ (hereinafter, referred to as a position $j_{top}$), is detected, next the (number of iterations NUM−1)-th position where the bit status is "zero", as counted from the position $j_{top}$ (hereinafter, referred to as a position $j_{limit}$), is detected, and further, the lowest-order digit where the bit status is "1", within the range from the position $j_{top}$ to the position $j_{limit}$ (hereinafter, referred to as a position $j_{bottom}$), is detected. Then, the number of bit signals whose bit status is "1" (hereinafter, referred to as a number S1) as well as the number of bit signals whose bit status is "zero" (hereinafter, referred to as a number S0), within the range from the position $j_{top}$ to the position $j_{bottom}$, are determined. If the number of iterations NUM=1 or if (S0+3)≦S1, then the processes of Step S1 and Step S2 as shown in the fourth preferred embodiment are executed, and then, the second input data $X_i$ is converted into compressed data $Y_i$, where Aj's corresponding to the bit signals whose bit status is set to "1" out of the compressed data $Y_i$ are set to 1, Aj's corresponding to the bit signals whose bit status is set to "zero" out of the compressed data $Y_i$ are set to zero, and all Bj's are set to "zero"). If the number of iterations NUM≠1 and (S0+3)>S1, then only Aj's corresponding to j=$j_{top}$+1 are set to 1 and the other Aj's are set to zero, while Bj's corresponding to j=$j_{bottom}$ as well as Bj's corresponding to the bit signals whose bit status is "zero" between the position $j_{top}$ and the position $j_{bottom}$ are set to 1 and the other Bj's are set to zero. By setting Aj's and Bj's in this way, the second input data $X_i$ is converted into $\Sigma Aj \cdot 2^j - \Sigma Bj \cdot 2^j$ so that the conversion error is minimized under the condition that the total number of "1s" among the Aj's and Bj's. In other words, the data converter 72d converts the second input data $X_i$ into data that results from adding up positive and negative values whose absolute value is some power of 2, to a number of times that is smaller than the bit width of the second input data $X_i$. Then, if Aj is a status "1", j is outputted to the barrel shifter 65 as a shift amount, while a code signal "zero" is transferred to one input terminal of the gates of the EX-OR gate array 93 and to the input carry terminal of the adder 66. Next, if Bj is a status "1", then j is outputted to the barrel shifter 65 as a shift amount, while a code signal "1" is transferred to one input terminal of the gates of the EX-OR gate array 93 and to the input carry terminal of the adder 66.

The barrel shifter 65 shifts the digit of first input data Wi by an input shift amount j, and outputs the shifted data to the EX-OR gate array 93. When the code signal is "zero", the EX-OR gate array 93 outputs the barrel shift data outputted from the barrel shifter 65 to the adder 66 as it is, whereas, when the code signal is "1", the EX-OR gate array 93 inverts the barrel shift data outputted from the barrel shifter 65, and then, outputs the inverted resulting data to the adder 66. The adder 66 adds the data outputted from the EX-OR gate array 93 and the data inputted from the multiplexer 68, and then, outputs the resulting data of the sum to the register 67. The register 67 temporarily holds or stores the addition data outputted from the adder 66 for a period of predetermined clock signal cycles, and then, outputs the held data to the multiplexer 68 and also through an output terminal T64.

Next the operation of the present apparatus is explained hereinafter. The second input data $X_i$ inputted from through the input terminal T62 is converted into $\Sigma Aj \cdot 2^j - \Sigma Bj \cdot 2^j$ by the data converter 72d, where Aj and Bj are each "zero" or "1". The conversion is made so that the conversion error is minimized under the condition that the total number of "1s" among Aj's and Bj's is not larger than the number of iterations NUM. The number of iterations NUM is inputted through the input terminal T76. Next, if Aj is a status "1", then j is inputted to the barrel shifter 65 as a shift amount, while a code signal "zero" is transferred to one input terminal of the gates of the EX-OR gate array 93 and to the input carry terminal of the adder 66. In the barrel shifter 65, the first input data Wi inputted through an input terminal T61 is shifted, and thereafter, the shifted data is sent to the EX-OR gate array 93. Since the code signal that is one input for each gate of the EX-OR gate array 93 is "zero", the output data of the barrel shifter 65 is inputted to the adder 66 as it is. This is done for all the Aj's whose bit status is "zero" one after another, and data (Wi·$\Sigma Aj \cdot 2^j$) is outputted as output data of the adder 66. Next, if Bj is a status "1", then j is outputted to the barrel shifter 65 as the shift amount, while a code signal "1" is transferred to one input terminal of the gates of the EX-OR gate array 93 and to the input carry terminal of the adder 66. In the barrel shifter 65, the first input data Wi is shifted, and thereafter, the shifted data is sent to the EX-OR gate array 93. Since the code signal that is one input data for each gate of the EX-OR gate array 93 is "1", the inversion of output data of the barrel shifter 65 is inputted to the adder 66. A data "1" is inputted also to the input carry terminal of the adder 66. At this time, the adder 66 executes the addition of the 2's complement of the output data of the barrel shifter 65 and another input terminal of the adder 66. The resulting data of this is data $(-WiBj2^j+(data\ of\ register\ 67))$. If this is done for all the Bj's whose bit status is "1" one after another, data $(Wi(\Sigma Aj \cdot 2^j - \Sigma Bj \cdot 2^j))$ is finally obtained as the output data of the adder 66. This means that $WiX_i$ is calculated.

According to the product-sum calculation apparatus PM16 of the sixteenth preferred embodiment as described above, since the converted values may be add values of positive and negative powers, the conversion error can be reduced as compared with the addition with only positive powers.

Seventeenth Preferred Embodiment

Figure 34:
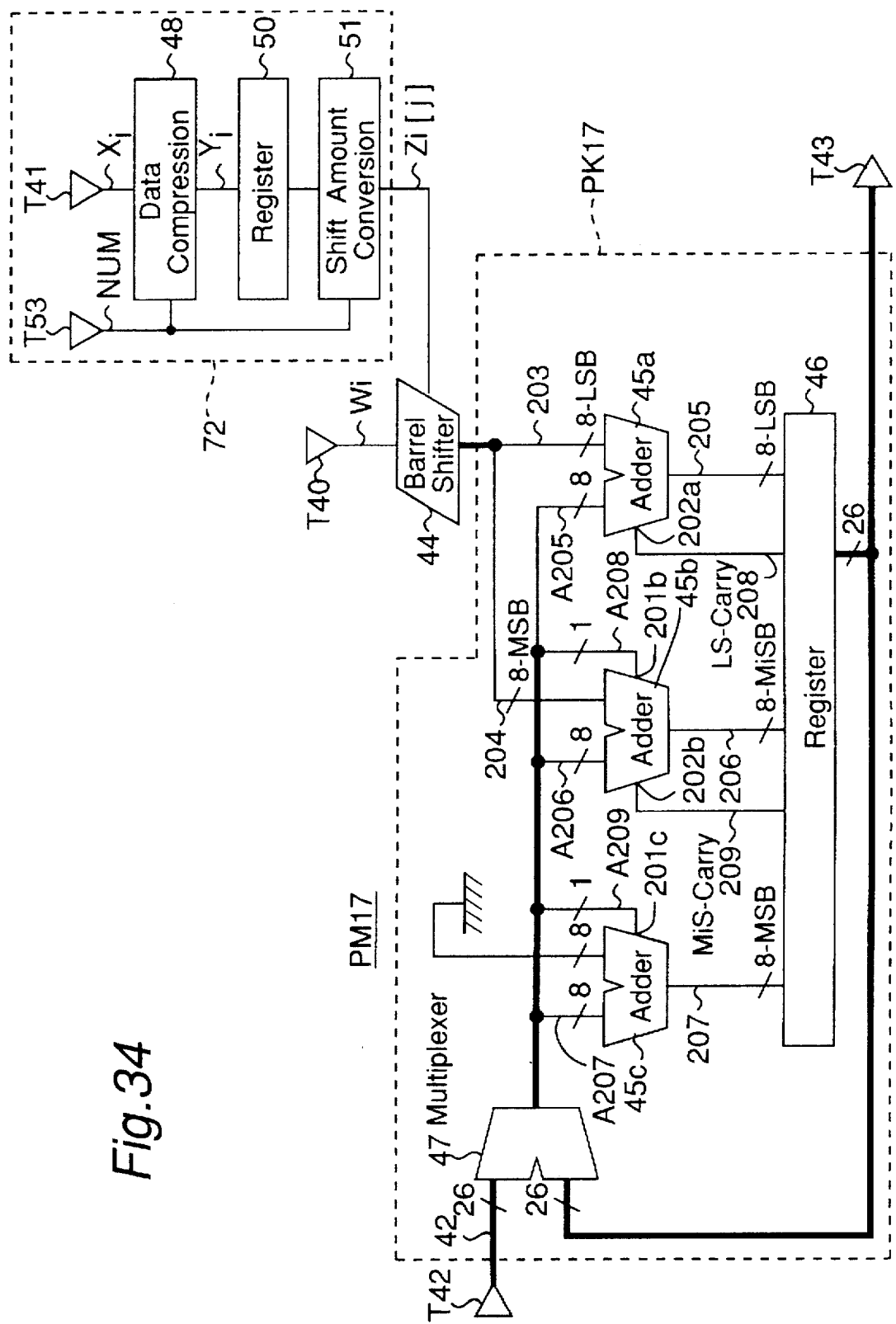
FIG. 34 is a block diagram showing a configuration of a product-sum calculation apparatus PM17 of the seventeenth preferred embodiment according to the present invention.
Figure 35:
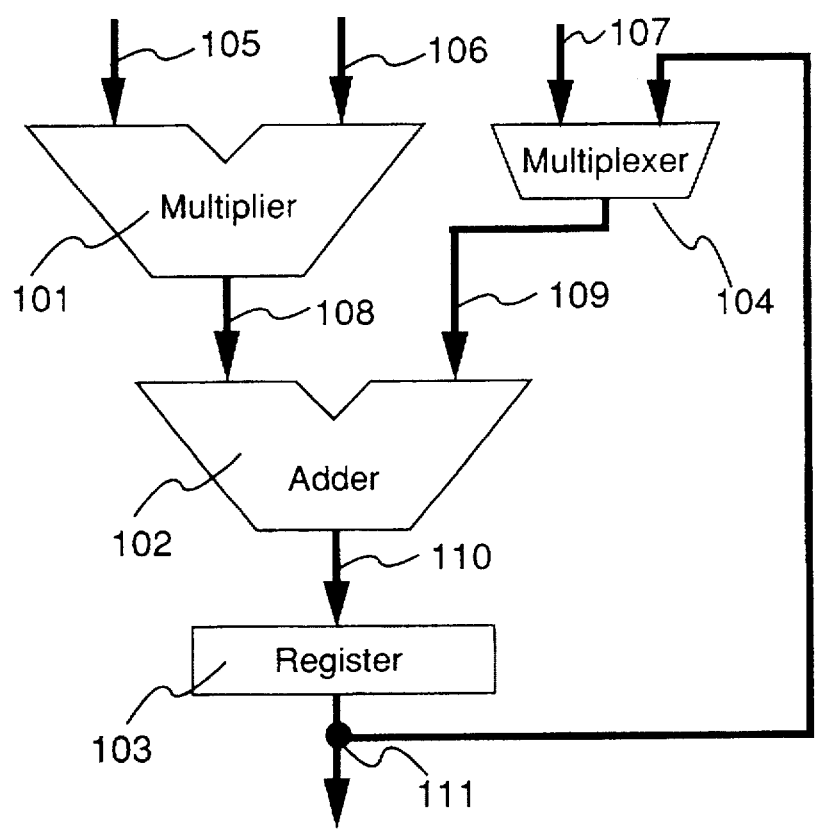
FIG. 35 is a block diagram showing a configuration of a first conventional product-sum calculation apparatus.
Figure 36:
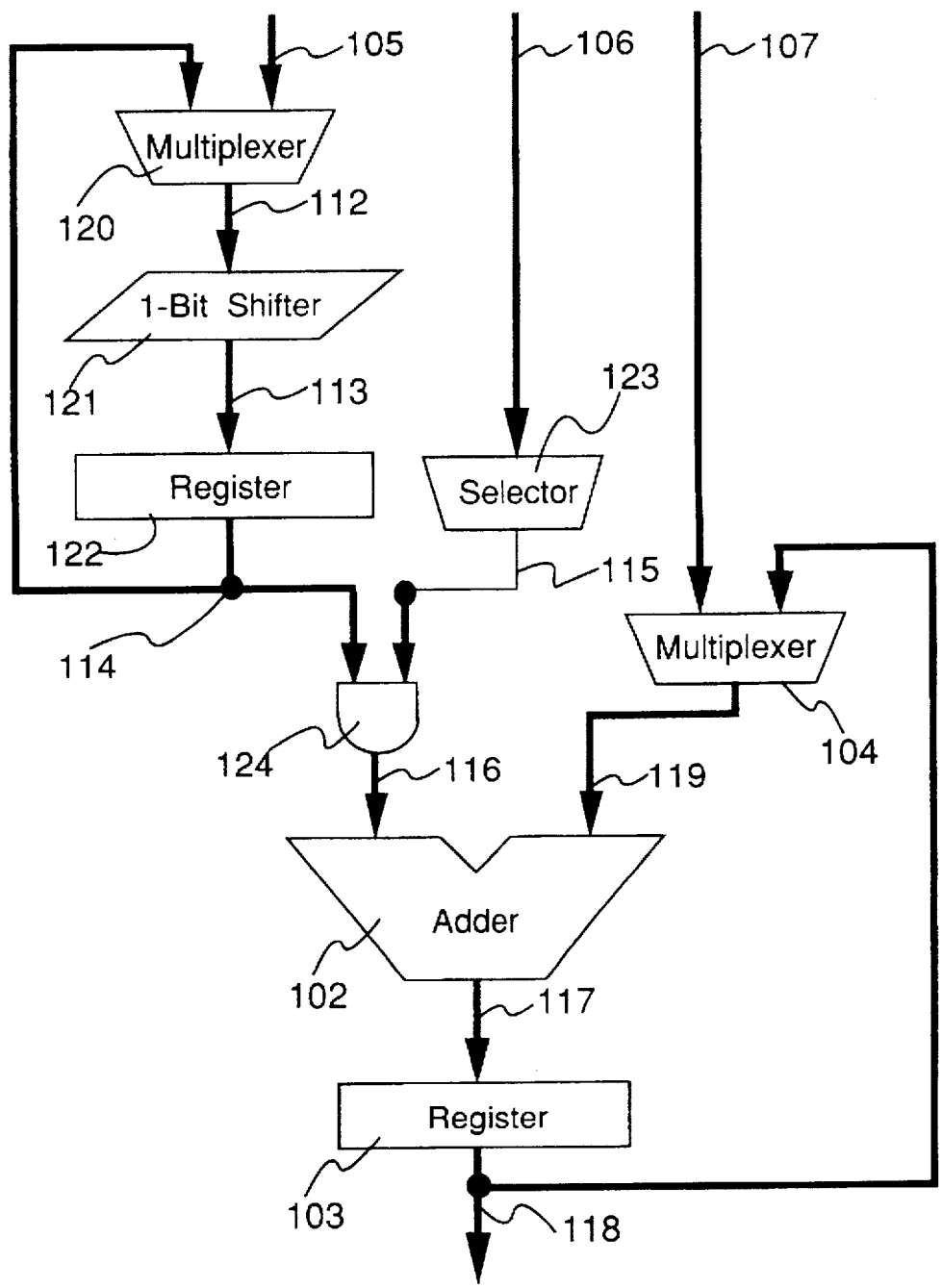
FIG. 36 is a block diagram showing a configuration of a second conventional product-sum calculation apparatus.
Figure 37:
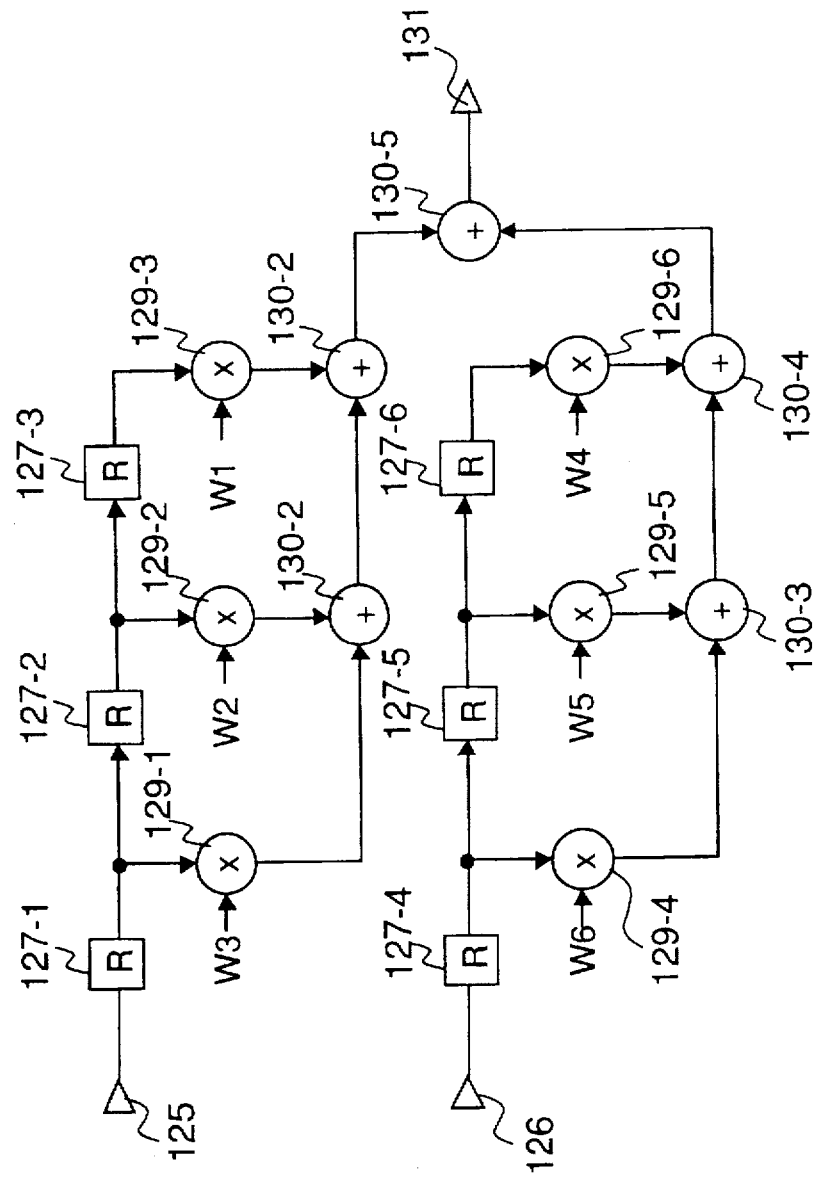
FIG. 37 is a block diagram showing a configuration of a third conventional product-sum calculation apparatus.

FIG. 34 is a block diagram showing a configuration of a product-sum calculation apparatus PM17 of the seventeenth preferred embodiment according to the present invention.

Referring to FIG. 34, the product-sum calculation apparatus PM17 of the seventeenth preferred embodiment includes the product-sum calculation apparatus PM4 of the fourth preferred embodiment shown in FIG. 7, in which the adder 45 is replaced with an adder 45a for lower 8 bits or eight least significant bits (8-LSB) of output data of the cumulative adder PK17, an adder 45b for middle 8 bits or eight middle significant bits (8-MiSB) of output data of the cumulative adder PK17, and an adder 45c for higher 8 bits or eight most significant bits (8-MSB) of output data of the cumulative adder PK17, where cumulative addition is executed by the adders 45a, 45b and 45c. The cumulative adder PK17 includes the adder 45a, the adder 45b, the adder 45c, the register 46, and the multiplexer 47.

In the product-sum calculation apparatus PM17 of FIG. 34, the data converter 72 converts second input data $X_i$ of 8-bit data inputted through the input terminal T41 into converted data Zi[j] (j=1, 2, . . . , NUM), and then, outputs the converted data to the barrel shifter 44. The barrel shifter 44 shifts the digit of weight data Wi of 8-bit data inputted through the input terminal T40 based on the converted data Zi[j], and then outputs lower-order 8 bit (8-LSB) data (b0–b7) 203 of the barrel shift data (b0–b15), which is the shifted 16-bit data, to one input terminal of the adder 45a, while the barrel shifter 44 outputs higher-order 8 bit (8-MSB) data (b8–b15) 204 of the barrel shift data (b0–b15) to one input terminal of the adder 45b.

The adder 45a adds the lower-order 8 bit (8-LSB) data (b0–b7) 203 inputted from the barrel shifter 44 and the 8-bit data A205 inputted from the multiplexer 47, and then, outputs the addition resulting data to the register 46 as the lower-order 8 bit (8-LSB) data 205 of the cumulative adder PK17, while the adder 45a outputs a lower-order carry signal 208 from a carry output terminal 202a to the register 46. In this process, if there is an overflow in the data of the addition result, the adder 45a outputs to the register 46 a lower-order carry signal 208 whose bit status is "1", while if there is no overflow in the data of the addition result, the adder 45a outputs to the register 46 a lower-order carry signal 208 whose bit status is "zero".

The adder 45b adds the higher-order 8 bit (8-MSB) data (b8–b15) 204 inputted from the barrel shifter 44 and the 8-bit data A206 inputted from the multiplexer 47 based on the carry signal inputted from an carry input terminal 201b, and then, outputs the addition resulting data to the register 46 as the middle-order 8 bit (8-MiSB) data 206 of the cumulative adder PK17, while the adder 45b outputs a middle-order carry signal 209 from a carry output terminal 202b to the register 46. In this process, if the bit status of the input carry signal is "1", the adder 45b further adds "1" to the least significant digit of the addition data of the higher-order 8 bit (8-MSB) data (b8–b15) 204 and the 8-bit data A206 inputted from the multiplexer 47, and then, outputs the resulting data to the register 46 as the 8-bit data 206 of addition result. If the bit status of the input carry signal is "zero", the adder 45b outputs the addition data of the higher-order 8 bit (8-MSB) data (b8–b15) 204 and the 8-bit data A206 inputted from the multiplexer 47, as it is, to the register 46 as the 8-bit data 206 of the addition result. Further, if there is an overflow in the 8-bit data 206 of the addition result, the adder 45b outputs to the register 46 a middle-order carry signal 209 whose bit status is "1", while if there is no overflow in the 8-bit data 206 of the addition result, the adder 45b outputs to the register 46 a middle-order carry signal 209 whose bit status is "zero".

The adder 45c, based on the carry signal inputted from a carry input terminal 201c, adds "1" to the least significant digit of the 8-bit data A207 inputted from the multiplexer 47, and then, outputs the resulting data of the sum to the register 46 as the 8-bit data 207 of the addition result when the bit status of the carry signal is "1", while the adder 45c outputs the 8-bit data A207 inputted from the multiplexer 47, as it is, to the register 46 as the 8-bit data 207 of the addition result when the bit status of the carry signal is "zero". In this process, one input terminal of the adder 45c is grounded, where the input to the input terminal is always the data of "zero". The register 46 temporarily holds or stores the 8-bit data 205 of addition result inputted from the adder 45a, the lower-order carry signal 208, the 8-bit data 206 of addition result inputted from the adder 45b, the middle-order carry signal 209, and the 8-bit data 207 of addition result inputted from the adder 45c, for a period of one clock cycle, and then, outputs these signal data to the multiplexer 47.

The multiplexer 47 selects either one data from the 26-bit data 42 inputted through the input terminal T42 or the 26-bit data inputted from the register 46, and then, outputs the selected 26-bit data. That is, in response to the first clock, the multiplexer 47 outputs the third input data 42 all the bit states of which are zero, and which is inputted through the input terminal T42, selectively to another input terminal of the adder 45a as the 8-bit data A205, the carry input terminal 201b of the adder 45b, another input terminal of the adder 45b, the carry input terminal 201c of the adder 45c, and another input terminal of the adder 45c. Further, in response to the second and following clocks, the multiplexer 47 outputs the respective data inputted from the register 46 to the adders 45a, 45b and 45c, in the following manner. The multiplexer 47 outputs the 8-bit data 205 of the addition result outputted from the adder 45a to another input terminal of the adder 45a, outputs the lower-order carry signal 208 outputted from the adder 45a to the carry input terminal 201b of the adder 45b as the 8-bit data A205, outputs the 8-bit data 206 of the addition result outputted from the adder 45b to another input terminal of the adder 45b as the 8-bit data A206, outputs the middle-order carry signal 209 outputted from the adder 45b to the carry input terminal 201c of the adder 45c, and outputs the 8-bit data 207 of the addition result outputted from the adder 45c to another input terminal of the adder 45c as the 8-bit data A207.

In the product-sum calculation apparatus PM17 constructed as described above, the second input data $X_i$ of 8-bit data inputted through the input terminal T41 is converted by the data compression circuit 48 into compressed data $Y_i$ of 8-bit data converted in such a way that the number of bit signals whose bit status is "1" is not larger than the number of iterations NUM, and that the conversion error becomes small. The compressed data $Y_i$ is converted by the shift amount conversion circuit 51 into converted data Zi[j] (j=1, 2, . . . , NUM), and then, the converted data Zi[j] is inputted to the barrel shifter 44. Thereafter, the lower-order 8 bit (8-LSB) data (b0–b7) 203 of the barrel shift data (b0–b15) is inputted to the adder 45a, while the higher-order 8 bit (8-MSB) data (b8–b15) 204 is inputted to the adder 45b.

The lower-order 8 bit (8-LSB) data (b0–b7) 203 inputted to the adder 45a is added by the adder 45a to product-sum result lower-order 8 bit (8-LSB) data (s0–s7) A205, which is the output data of the cumulative adder PK17, and then, the product-sum result lower-order 8 bit (8-LSB) data (s0–s7) A205 and the lower-order carry signal 208 are inputted to the register 46. In this process, the product-sum result lower-order 8 bit (8-LSB) data (s0–s7) A205 is product-sum result lower-order 8 bit (8-LSB) data (s0–s7) 205 outputted from the adder 45a in response to the one-cycle preceding clock. The product-sum result lower-order 8 bit (8-LSB) data (s0–s7) 205 is held by the register 46 for a period of one clock cycle, and is inputted as the 8-bit data A205 to the adder 45a through the multiplexer 47. The lower-order carry signal 208 is held by the register 46 for a period of one clock cycle, and inputted to the carry input terminal 201b of the adder 45b through the multiplexer 47.

The higher-order 8 bit (8-MSB) data (b8–b15) 204 inputted to the adder 45b is added to middle-order 8 bit (8-MiSB) data (s8–s15) A206, which is output data of the cumulative adder PK17. Then, based on the lower-order carry signal A208, a "1" is further added to the least significant digit of the addition result when the bit status of the lower-order carry signal A208 is "1", and product-sum result middle-order 8 bit (8-MiSB) data (s8–s15) 206 and the middle-order carry signal 209 are inputted to the register 46. The product-sum result middle-order 8 bit (8-MiSB) data (s8–s15) A206 is product-sum result middle-order 8 bit (8-MiSB) data (s8–s15) 206 outputted from the adder 45b in response to the one-cycle preceding clock, while the lower-order carry signal A208 is a lower-order carry signal 208 outputted from the adder 45a in response to the one-cycle preceding clock. The product-sum result middle-order 8 bit (8-MiSB) data (s8–s15) 206 is held by the register 46 for a period of one clock cycle, and inputted as the 8-bit data A206 to the adder 45b through the multiplexer 47. The middle-order carry signal 209 is held by the register 46 for a period of one clock cycle, and inputted as the carry signal A209 to the adder 45c through the multiplexer 47.

Product-sum result higher-order 8 bit (8-MSB) data (s16–s23) 207, which is output data of the cumulative adder PK17 and which has been inputted to the adder 45c, is outputted to the register 46 as product-sum result higher-order 8 bit (8-MSB) data (s16–s23) 207 after a 1 is added to its least significant digit when the bit status of the middle-order carry signal A209 is "1". The product-sum result higher-order 8 bit (8-MSB) data (s16–s23) A207 is outputted to the register 46, as it is, as the product-sum result higher-order 8 bit (8-MSB) data (s16–s23) 207, when the bit status of the middle-order carry signal A209 is "zero". The product-sum result higher-order 8 bit (8-MSB) data (s16–s23) A207 is product-sum result higher-order 8 bit (8-MSB) data (s16–s23) 207 outputted from the adder 45c in response to the one-cycle preceding clock, while the middle-order carry signal A209 is a middle-order carry signal 209 outputted from the adder 45b in response to the one-cycle preceding clock. The product-sum result higher-order 8 bit (8-MSB) data (s16–s23) 207 is held by the register 46 for a period of one clock cycle and then, is inputted as the 8-bit data A207 to the adder 45c.

The above-mentioned calculations are iterated until the lower-order 8 bit (8-LSB) data (b0–b7) 203 corresponding to the last converted data Zi[NUM] and the higher-order 8 bit (8-MSB) data (b8–b15) 204 are added up by the adder 45a and the adder 45b, respectively. Thereafter, with the output data of the barrel shifter 44 set to zero, further two times of additions are executed by the adders 45a, 45b and 45c. Thus, it becomes possible to execute a cumulative addition including the addition based on the lower-order carry signal 208 and the middle-order carry signal 209 which are the last ones left and correspond to the converted data Zi[j] (j=1, 2, . . . , NUM). Accordingly, the weight data Wi and the compressed data $Y_i$, i.e., the weight data Wi and the second input data $X_i$, can be multiplied by each other, and then, the resulting data of the multiplication outputted through the output terminal T43. Further, by updating the weight data Wi and the second input data $X_i$ and iterating the above-mentioned calculations, it becomes possible to execute a product-sum calculation process of a plurality of weight data Wi and the second input data $X_i$.

The product-sum calculation apparatus PM17 of the seventeenth preferred embodiment as described above includes a 24-bit adder formed by three 8-bit adders 45a, 45b and 45c, and a register 46, wherein the lower-order carry signal 208 of the adder 45a and the middle-order carry signal 209 of the adder 45b are held by the register 46 each for a period of one clock cycle and then, at the time of adding the next clock, the carry signals 208 and 209 are propagated to the higher-order side adders 45b and 45c. This allows the carry propagation at one-time addition to become shorter, so that its delay time becomes shorter. Accordingly, for the product-sum calculation apparatus PM17 of the seventeenth preferred embodiment, two addition times need to be executed by the adders 45a, 45b and 45c after a cumulative addition, however, one-time addition time can be reduced when a large number of cumulations are involved, so that the product-sum calculation time can be reduced.

The above product-sum calculation apparatus PM17 of the seventeenth preferred embodiment has been configured by incorporating three adders 45a, 45b and 45c. However, the present invention is not limited to this arrangement, however, the product-sum calculation apparatus PM17 may incorporate at least two adders, or three or more adders. With such an arrangement, the product-sum calculation apparatus PM17 has the same advantages as those in the seventeenth preferred embodiment.

The preferred embodiments of the present invention have constitutions or compositions as described above, and exhibit the following advantageous effects.

The product-sum calculation apparatus according to the first aspect of the present invention includes the barrel shifter, the adder, and the register. Therefore, the product-sum calculation apparatus can be reduced in circuit area, as compared with the prior art product-sum calculation apparatus using a multiplier.

Also, the product-sum calculation apparatus according to the second aspect of the present invention further includes a multiplexer in the product-sum calculation apparatus of the first aspect thereof. Therefore, the product-sum calculation apparatus can produce output data by adding the product of first input data and second input data, to third input data.

Further, the product-sum calculation apparatus according to the third aspect of the present invention further includes the bit-position encoder in the product-sum calculation apparatus of the first or second aspect of the present invention, and then, the calculation corresponding to a bit signal whose bit status is "zero" out of the second input data can be thinned out or decimated. Therefore, the product-sum calculation apparatus can be reduced in calculation processing time, as compared with any product-sum calculation apparatus not using the bit-position encoder.

Still further, in the product-sum calculation apparatus according to the fourth aspect of the present invention, the bit-position encoder includes the first, second, and third delay flip-flops, and a pair of selectors, so that the product-sum calculation apparatus can detect the positions of bit signals whose bit status is "1" out of the second input data, and then output positional data representing the positions.

Also, in the product-sum calculation apparatus according to the fifth aspect of the present invention, the bit-position encoder detects the position of a bit signal whose predetermined number of bit statuses is "1" from the higher-order digits of the second input data, and then, outputs positional data. Therefore, the product-sum calculation apparatus is allowed to thin out or decimate calculation processes for bit signals that are located at lower orders out of the bit signals of the second input data and that would relatively less affect calculated results, so that the calculation processing time can be reduced.

Further, in the product-sum calculation apparatus according to the sixth aspect of the present invention, the bit-position encoder includes the counter and the comparator, wherein the product-sum calculation apparatus ends or finishes the position detection when the number of shifts is larger than a predetermined number of shifts. As a result, the product-sum calculation apparatus of the sixth aspect of the present invention is allowed to thin out or decimate calculation processes for bit signals that are located at lower orders out of the bit signals of the second input data and that would relatively less affect calculated results.

Yet further, the product-sum calculation apparatus according to the seventh aspect of the present invention includes the data compression means, and then, the second input data is converted into such compressed data that the number of bit signals whose bit status is "1" is not larger than a predetermined restrictive number smaller than the bit width of the second input data. Thus, the product-sum calculation apparatus can be enhanced in processing speed.

Also, in the product-sum calculation apparatus according to the eighth aspect of the present invention, the data compression means converts the second input data into such compressed data that the number of digits is the same as that of the input data, that the number of bit signals whose bit status is "1" is not larger than the restrictive number, and that the difference from the second input data is the minimum, as its output. As a result, the product-sum calculation apparatus of the eighth aspect of the present invention can be reduced in calculation error and enhanced in processing speed.

Further, in the product-sum calculation apparatus according to the ninth aspect of the present invention, the data compression means converts the second input data into such compressed data that the number of digits is one digit larger than that of the second input data, that the number of bit signals whose bit status is "1" is not larger than the restrictive number, and that the difference from the second input data is the minimum, as its output. Thus, the product-sum calculation apparatus of the ninth aspect of the present invention can be enhanced in processing speed like the product-sum calculation apparatus of the eighth aspect of the present invention, and reduced in calculation error as compared with the product-sum calculation apparatus of the eighth aspect of the present invention.

Still further, in the product-sum calculation apparatus according to the tenth aspect of the present invention, the data compression means outputs a number F of bit signals whose bit status is "1" out of the compressed data, and the bit-position encoder outputs bit-position data representing the bit positions of bit signals whose bit status is "1" out of the number F, and thereafter starts the processing of the next compressed data. As a result, the bit-position encoder can execute processing without any waiting time, so that the product-sum calculation apparatus of the tenth aspect of the present invention can be enhanced in processing speed.

Also, in the product-sum calculation apparatus according to the eleventh aspect of the present invention, the data conversion means processes calculations by conversion to data which is obtained by adding positive and negative numerical values whose absolute values are powers of 2. Thus, the product-sum calculation apparatus of the eleventh aspect of the present invention can be reduced in conversion error.

Further, the product-sum calculation apparatus according to the twelfth aspect of the present invention includes one bit-position encoder and a plurality of product-sum calculation apparatuses, wherein the bit-position encoder outputs bit-position data to the individual product-sum calculation apparatuses. Thus, the circuit area can be reduced.

Also, the product-sum calculation unit integrated circuit apparatus according to the thirteenth aspect of the present invention includes a data conversion means and a plurality of product-sum calculation apparatuses. The data conversion means outputs bit-position data to each product-sum calculation apparatus, and each product-sum calculation apparatus adds up a multiplication result of the product-sum calculation apparatus and a calculated result outputted from the preceding-stage product-sum calculation apparatus, and outputs the resulting data. Thus, according to the product-sum calculation unit integrated circuit apparatus of the thirteenth aspect of the present invention, there can be provided a product-sum calculation unit integrated circuit apparatus which can be reduced in processing time to a large extent.

Further, the product-sum calculation unit integrated circuit apparatus according to the fourteenth aspect of the present invention includes storage means, and then, the processible kernel image data can be increased in size without increasing the circuit scale or cost.

Also, in the product-sum calculation unit integrated circuit apparatus according to the fifteenth aspect of the present invention, the storage means can store a plurality of M data. Thus, there can be provided a product-sum calculation unit integrated circuit apparatus which does not need to provide any external buffer memory.

Still further, in the product-sum calculation unit integrated circuit apparatus according to the sixteenth aspect of the present invention, the number M of data that can be stored in the storage means can be predetermined from an external unit. Thus, the size of data that can be arithmetically processed or calculated can be changed.

Further, the product-sum calculation unit integrated circuit apparatus according to the seventeenth aspect of the present invention includes an output-use storage means in the product-sum calculation unit integrated circuit apparatus of the thirteenth, fourteenth, fifteenth, or sixteenth aspect of the present invention, and then, the timing for output can be adjusted. Thus, connection with other devices or elements becomes easier to accomplish.

Still further, the product-sum calculation unit integrated circuit apparatus according to the eighteenth aspect of the present invention includes a plurality of "b" product-sum calculation unit integrated circuit apparatuses of the seventeenth aspect of the present invention. Thus, the size of the first input data that can be arithmetically processed or calculated can be enlarged in one direction up to "b" times that of the product-sum calculation unit integrated circuit apparatus of the seventeenth aspect of the present invention.

Also, the product-sum calculation unit integrated circuit apparatus according to the nineteenth aspect of the present invention includes two product-sum calculation unit integrated circuit apparatuses of the seventeenth aspect of the present invention and adders for adding up calculated results outputted from the product-sum calculation unit integrated circuit apparatuses. Thus, the size of the first input data that can be arithmetically processed or calculated can be enlarged in a direction different from that in the eighteenth aspect of the present invention, to "b" times that of the product-sum calculation unit integrated circuit apparatus of the seventeenth aspect.

Further, the product-sum calculation unit integrated circuit apparatus according to the twentieth aspect of the present invention includes a plurality of "c" product-sum calculation unit integrated circuit apparatuses PM11a-1 to PM11a-c of the seventeenth or eighteenth aspect of the present invention. Thus, the size of the first input data that can be arithmetically processed or calculated can be enlarged up to "c" times that of the product-sum calculation unit integrated circuit apparatuses PM11a-1 to PM11a-c.

Further, the cumulative adder according to the twenty-first aspect of the present invention includes a plurality of adders and a register, wherein a carry signal outputted from a carry output terminal of the adder that processes a lower-order bit range out of the bit range processed by the adders is inputted to the carry input terminal of each adder through the register. Thus, one-time addition time can be reduced so that the cumulative addition time can be reduced.

Yet further, the product-sum calculation apparatus according to the twenty-second aspect of the present invention includes the cumulative adder, and can be reduced in addition time. As a result, the product-sum calculation time can be reduced.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A product-sum calculation apparatus for cumulatively adding respective products of first input data and second input data, and outputting a sum of the respective products through an output terminal, comprising:

a barrel shifter for shifting the first input data by a predetermined number of bits based on the second input data, and outputting shifted data;

an adder having first and second input terminals, for adding the shifted data outputted from said barrel shifter and inputted through said first input terminal of said adder; and data inputted through said second input terminal of said adder, and outputting addition result data;

a register for temporarily storing the addition result data outputted from said adder, outputting stored data to said adder through said second input terminal of said adder, and outputting the stored data through said output terminal; and a bit-position encoder for detecting bit positions of bit signals whose bit status is "1" out of the second input data, and outputting bit-position data representing the bit position to said barrel shifter, wherein said barrel shifter shifts the first input data based on the bit-position data outputted from said bit-position encoder, and outputs the shifted data.

2. The product-sum calculation apparatus of claim 1, further comprising:

a multiplexer having first and second input terminals, for selecting one of third input data inputted through said first input terminal of said multiplexer, and data inputted through said second input terminal of said multiplexer, and outputting selected data to said adder through said second input terminal of said adder, whereby said product-sum calculation apparatus calculates a product of the first input data and the second input data, calculates a sum of a calculated product and the third input data, and outputs a calculated sum from said output terminal.

3. The product-sum calculation apparatus of claim 2, further comprising:

a bit-position encoder for detecting bit positions of bit signals whose bit status is "1" out of the second input data, and outputting bit-position data representing the bit position to said barrel shifter, wherein said barrel shifter shifts the first input data based on the bit-position data outputted from said bit-position encoder, and outputs the shifted data.

4. The product-sum calculation apparatus of claim 1, wherein, when the number of bit signals whose bit status is "1" out of the second input data is not smaller than a predetermined number, said bit-position encoder detects positions of only the predetermined number of most significant bit signals whose bit status is "1", out of the second input data, and outputs the positional data representing detected positions.

5. The product-sum calculation apparatus of claim 4, wherein said bit-position encoder includes:

a counter for counting a number of shifts of a signal outputted from said first delay type flip-flop by counting pulses of a clock signal, and outputting a counted number of shifts; and a comparator for comparing the counted number of shifts outputted from said counter, with an input specified value of a number of shifts, and outputting a signal representing completion of position detection when the counted number of shifts outputted from said counter is larger than the input specified value of a number of shifts, wherein the position detection is completed when the counted number of bit shifts outputted from said counter is larger than the input specified value of the number of shifts.

6. The product-sum calculation apparatus of claim 1, further comprising:

data compression means for converting the second input data into compressed data having bit signals such that a number of the bit signals whose bit status is "1" is not larger than a predetermined number smaller than a bit width of the second input data, wherein said bit-position encoder outputs bit-position data representing bit positions of bit signals 5 whose bit status is "1" out of compressed data converted by said data compression means, to said barrel shifter.

7. The product-sum calculation apparatus of claim 6,
wherein said data compression means converts the second input data into compressed data having bit signals such that the number of the bit signals is the same as that of the second input data, that the number of bit signals whose bit status is "1" is not larger than the predetermined number, and a difference between the compressed data and the second input data is a minimum, and outputs the compressed data.

8. The product-sum calculation apparatus of claim 6,
wherein said data compression means converts the second input data into compressed data having bit signals such that the number of the bit signals is one larger than that of the second input data, the number of bit signals whose bit status is "1" is not larger than the restrictive number, and a difference between the compressed data and the second input data is a minimum, and outputs the compressed data.

9. The product-sum calculation apparatus of claim 6,
wherein said data compression means further generates and outputs numerical data representing a number F of bit signals whose bit status is "1" out of the compressed data, to said bit-position encoder, and
wherein said bit-position encoder generates and outputs bit-position data representing bit positions of the F bit signals whose bit status is "1", and thereafter, starts processing next compressed data.

10. A product-sum calculation apparatus for cumulatively adding respective products of first input data and second input data, and outputting a sum of the respective products through an output terminal, comprising:

a barrel shifter for shifting the first input data by a predetermined number of bits based on the second input data, and outputting shifted data;

an adder having first and second input terminals, for adding the shifted data outputted from said barrel shifter and inputted through said first input terminal of said adder; and data inputted through said second input terminal of said adder, and outputting addition result data;

a register for temporarily storing the addition result data outputted from said adder, outputting stored data to said adder through said second input terminal of said adder, and outputting the stored data through said output terminal;

a bit-position encoder for detecting bit positions of bit signals whose bit status is "1" out of the second input data, and outputting bit-position data representing the bit position to said barrel shifter;

wherein said barrel shifter shifts the first input data based on the bit-position data outputted from said bit-position encoder, and outputs the shifted data, wherein the second input data includes a plurality of bit signals, wherein said bit-position encoder includes
a shift register; and
an encoder, wherein said shift register includes
a first delay type flip-flop for temporarily storing respective bit signals of the second input data;
a second delay type flip-flop for temporarily storing an input signal;
a plurality of third delay type flip-flops provided between said first and said second delay type flip-flops so that said first, second and third delay type flip-flops are connected in series, and provided in correspondence to respective bit signals of the second input data, each of said plurality of third delay type flip-flops temporarily storing an input signal; and a plurality of pairs of selectors provided in correspondence to respective bit signals of the second input data, each of said plurality of pairs of selectors transmitting a signal outputted from said first delay type flip-flop through one of said plurality of third delay type flip-flops corresponding to a bit signal corresponding to said selector when a bit status of the bit signal corresponding to said selector is "1", and transmitting the signal outputted from said first delay type flip-flop without any intervention of any third delay type flip-flops corresponding to the bit signal when the bit status of the bit signal is "zero";

wherein said shift register transfers a signal outputted from said first delay type flip-flop sequentially to said third delay type flip-flops corresponding to the bit signals whose bit status is "1" out of the second input data, in response to a predetermined clock signal, and outputs a signal representing positions of said plurality of third delay type flip-flops to which the signal outputted from the first delay type flip-flop has been transferred; and wherein said encoder detects positions of bit signals whose bit status is "1" out of the second data, based on the signal outputted from said shift register, and outputs positional data representing detected positions.

11. A product-sum calculation apparatus for cumulatively adding respective products of first input data and second input data, and outputting a sum of the respective products through an output terminal, comprising:

a barrel shifter for shifting the first input data by a predetermined number of bits based on the second input data, and outputting shifted data;

an adder having first and second input terminals, for adding the shifted data outputted from said barrel shifter and inputted through said first input terminal of said adder, and data inputted through said second input terminal of said adder, and outputting addition result data;

a register for temporarily storing the addition result data outputted from said adder, outputting stored data to said adder through said second input terminal of said adder, and outputting the stored data through said output terminal;

a multiplexer having first and second input terminals, for selecting one of third input data inputted through said first input terminal of said multiplexer, and data inputted through said second input terminal of said multiplexer, and outputting selected data to said adder through said second input terminal of said adder, whereby said product-sum calculation apparatus calculates a product of the first input data and the second input data, calculates a sum of a calculated product and the third input data, and outputs a calculated sum from said output terminal; and data conversion means for converting the second input data into data obtained by adding positive and negative numerical values whose magnitude is a power of 2, where the number of the numerical values is not larger than the number of bit signals of the second input data.

12. A product-sum calculation unit integrated circuit apparatus comprising:

a plurality of product-sum calculation apparatuses, each of said plurality of product-sum calculation apparatuses cumulatively adding respective products of first input data and second input data, and outputting a sum of the respective products through an output terminal, each of said plurality of product-sum calculation apparatuses comprising:

a barrel shifter for shifting the first input data by a predetermined number of bits based on the second input data, and outputting shifted data;

an adder having first and second input terminals, for adding the shifted data outputted from said barrel shifter and inputted through said first input terminal of said adder, and data inputted through said second input terminal of said adder, and outputting addition result data; and a register for temporarily storing the addition result data outputted from said adder, outputting stored data to said adder through said second input terminal of said adder, and outputting the stored data through said output terminal, and a bit-position encoder for outputting bit-position data representing bit positions of bit signals whose bit status is "1" out of the second input data, to said barrel shifter of each of said plurality of product-sum calculation apparatuses, wherein said barrel shifter of each of said plurality of product-sum calculation apparatuses shifts the first input data based on the bit-position data, and outputs the shifted data.

13. The product-sum calculation unit integrated circuit apparatus of claim 12, wherein each of said plurality of product-sum calculation apparatuses further comprises:

a multiplexer having first and second input terminals, for selecting one of third input data inputted through said first input terminal of said multiplexer, and data inputted through said second input terminal of said multiplexer, and outputting selected data to said adder through said second input terminal of said adder, whereby each of said plurality of product-sum calculation apparatuses calculates a product of the first input data and the second input data, calculates a sum of a calculated product and the third input data, and outputs a calculated sum from said output terminal.

14. A product-sum calculation unit integrated circuit apparatus comprising:

a plurality of N product-sum calculation apparatuses (k) (k=1, 2, 3, ..., N), each of plurality of N product-sum calculation apparatuses (k) including:

a barrel shifter for shifting the first input data by a predetermined number of bits based on the second input data, and outputting shifted data;

an adder having first and second input terminals, for adding the shifted data outputted from said barrel shifter and inputted through said first input terminal of said adder, and data inputted through said second input terminal of said adder, and outputting addition result data;

a register for temporarily storing the addition result data outputted from said adder, outputting stored data to said adder through said second input terminal of said adder, and outputting the stored data through said output terminal; and a multiplexer having first and second input terminals, for selecting one of third input data inputted through said first input terminal of said multiplexer, and data inputted through said second input terminal of said multiplexer, and outputting selected data to said adder through said second input terminal of said adder, whereby each of said product-sum calculation apparatuses (k) calculates a product of the first input data and the second input data, calculates a sum of a calculated product and the third input data, and outputs a calculated sum from said output terminal; and data conversion means provided in parallel with said plurality of N product-sum calculation apparatuses (k), said data conversion means including, data compression means for converting the second input data into compressed data having bit signals such that a number of the bit signals whose bit status is "1" is not larger than a predetermined number smaller than a bit width of the second input data; and a bit-position encoder for generating and outputting bit-position data representing bit positions of bit signals whose bit status is "1" out of the compressed data, to said barrel shifter of each of said plurality of product-sum calculation apparatuses (k), wherein a first stage apparatus (K=1) of said plurality of N product-sum calculation apparatuses calculates a product of data inputted through a first input terminal and the second input data, calculates a sum of a calculated product and third input data, and outputs data of a calculated sum, wherein remaining stage apparatuses (K=2, 3, ..., N-1) of said plurality of N product-sum calculation apparatuses, based on the bit-position data inputted through an input terminal, calculate a product of data inputted through a k-th input terminal other than said input terminal through which the bit-position data is inputted, and the second input data, calculates a sum of a calculated product and the data of the sum outputted from a product-sum calculation apparatus of a preceding stage (k-1), and outputs data of a calculated sum to a product-sum calculation apparatus of a succeeding stage (k+1), and wherein a final stage apparatus (K=N) of said plurality of N product-sum calculation apparatuses, based on the bit-position data, calculates a product of data inputted through an N-th input terminal, and the second input data, and calculates a sum of a calculated product and the data of the calculated sum outputted from said product-sum calculation apparatus of a preceding stage (k=N-1), and outputs data of a calculated sum.

15. The product-sum calculation unit integrated circuit apparatus of claim 14, further comprising:

at least one storage means provided at least at one point between said product-sum calculation apparatus k and said product-sum calculation apparatus (k+1) (k=1, 2, ..., N-1), said storage means temporarily storing the data of the calculated sum outputted from said product-sum calculation apparatus (k) (k=1, 2, ..., N-1), and outputs stored data to said product-sum calculation apparatus (k+1) (k=1, 2, ..., N-1).

16. The product-sum calculation unit integrated circuit apparatus of claim 15, wherein said storage means stores a plurality of M data, and outputs the stored data sequentially from a first data inputted thereto when the number of the stored data exceeds a predetermined number M.

17. The product-sum calculation unit integrated circuit apparatus of claim 16, wherein the predetermined number M is specified external to said product sum calculation unit integrated circuit apparatus.

18. The product-sum calculation unit integrated circuit apparatus of claim 14, further comprising:
output-use storage means for temporarily storing the data of the calculated sum outputted f from the final stage apparatus (K=N) of said plurality of N product sum calculation apparatuses, and outputting stored data.

19. A product-sum calculation unit integrated circuit apparatus arrangement comprising:
a plurality of b product-sum calculation unit integrated circuit apparatuses (m) (m=1, 2, 3, . . . . , b), each of said plurality of b product-sum calculation unit integrated circuit apparatuses (m) including,
a plurality of N product-sum calculation apparatuses (k) (k=1, 2, 3, . . . , N), each of plurality of N product-sum calculation apparatuses (k) including,
a barrel shifter for shifting the first input data by a predetermined number of bits based on the second input data, and outputting shifted data;
an adder having first and second input terminals, for adding the shifted data outputted from said barrel shifter and inputted through said first input terminal of said adder, and data inputted through said second input terminal of said adder, and outputting addition result;
a register for temporarily storing the addition result data outputted from said adder, outputting stored data to said adder through said second input terminal of said adder, and outputting the stored data through said output terminal; and
a multiplexer having first and second input terminals, for selecting one of third input data inputted through said first input terminal of said multiplexer, and data inputted through said second input terminal of said multiplexer, and outputting a selected data to said adder through said second input terminal of said adder, whereby each of said plurality of product-sum calculation apparatuses (k) calculates a product of the first input data and the second input data, calculates a sum of a calculated product and the third input data, and outputs a calculated sum from said output terminal; and
data conversion means provided in parallel with said plurality of N product-sum calculation apparatuses (k), said data conversion means including,
data compression means for converting the second input data into compressed data having bit signals such that a number of the bit signals whose bit status is "1" is not larger than a predetermined number smaller than a bit width of the second input data; and
a bit-position encoder for generating and outputting bit-position data representing bit positions of bit signals whose bit status is "1" out of the compressed data, to said barrel shifter of each of said plurality of product-sum calculation apparatuses (k),
wherein a first stage apparatus (k=1) of said plurality of N product-sum calculation apparatuses calculates a product of data inputted through a first input terminal and the second input data, calculates a sum of a calculated product and third input data, and outputs data of a calculated sum,
wherein remaining stage apparatuses (k=2, 3, . . . N−1) of said plurality of product-sum calculation apparatuses, based on the bit-position data inputted through an input terminal, calculates a product of data inputted through a k-th input terminal other than said input terminal through which the bit-position data is inputted, and the second input data, calculates a sum of a calculated product and the data of the sum outputted from the remaining stage apparatuses (k=2, 3, . . . , N−1) of said plurality of N product-sum calculation apparatuses, and outputs data of a calculated sum to a product-sum calculation apparatus of a succeeding stage (k+1), and
wherein a final stage apparatus (k=N) of said plurality of N product-sum calculation apparatuses, based on the bit-position data, calculates a product of data inputted through an N-th input terminal, and the second input data, and calculates a sum of a calculated product and the data of the calculated sum outputted from the product-sum calculation apparatus of the preceding stage (k) (k=N−1), and outputs data of a calculated sum,
wherein each of said plurality of b product-sum calculation unit integrated circuit apparatuses (m) (m=1, 2, . . . , b) further includes output-use storage means for temporarily storing the data of the calculated sum outputted from the final stage apparatus (k=N) of said plurality of N product-sum calculation apparatuses, and outputting stored data,
wherein said plurality of b product-sum calculation unit integrated circuit apparatuses (m) (m=1, 2, 3, . . . , b) are connected so that data outputted from said output-use storage means of each of said plurality of product-sum calculation unit integrated circuit apparatuses (m) (m=1, 2, . . . , b−1) is outputted to a product-sum calculation unit integrated circuit apparatuses of a succeeding stage (m+1) (m=1, 2, . . . b−1).

20. A product-sum calculation unit integrated circuit apparatus arrangement comprising: first and second product-sum calculation unit integrated circuit apparatuses, each of said first and second product-sum calculation unit integrated circuit apparatuses including,
a plurality of N product-sum calculation apparatuses (k) (k=1, 2, 3, . . . , N), each of plurality of N product-sum calculation apparatuses (k) including,
a barrel shifter for shifting the first input data by a predetermined number of bits based on the second input data, and outputting shifted data;
an adder having first and second input terminals, for adding the shifted data outputted from said barrel shifter and inputted through said first input terminal of said adder, and data inputted through said second input terminal of said adder, and outputting addition result data;
a register for temporarily storing the addition result data outputted from said adder, outputting stored data to said adder through said second input terminal of said adder, and outputting the stored data through said output terminal; and
a multiplexer having first and second input terminals, for selecting one of third input data inputted through said first input terminal of said multiplexer, and data inputted through said second input terminal of said multiplexer, and outputting selected data to said adder through said second input terminal of said adder, whereby each of said plurality of product-sum calculation apparatuses (k) calculates a product of the first input data and the second input data, calculates a sum of a calculated product and the third input data, and outputs a calculated sum from said output terminal; and data conversion means provided in parallel to said plurality of N product-sum calculation apparatuses (k), said data conversion means including, data compression means for converting the second input data into compressed data having bits signals such that a number of the bit signals whose bit status is "1" is not larger than a predetermined number smaller 5 than a bit width of the second input data; and a bit-position encoder for generating and outputting bit-position data representing bit positions of bit signals whose bit status is "1" out of the compressed data, to said barrel shifter of each of said plurality of product-sum calculation apparatus (k), wherein a first stage apparatus (k=1) of said plurality of N product-sum calculation apparatuses calculates a product of data inputted through a first input terminal and the second input data, calculates a sum of a calculated product and third input data, and outputs data of a calculated sum, wherein remaining stage apparatuses (k=2, 3, ...., N−1) of said plurality of N product-sum calculation apparatuses, based on the bit-position data inputted through an input terminal, calculates a product of data inputted through a k-th input terminal other than said input terminal through which the bit-position data is inputted, and the second input data, calculates a sum of a calculated product and the data of the sum outputted from a product-sum calculation apparatus of a preceding stage (k−1), and outputs data of a calculated sum to a product-sum calculation apparatus of a succeeding stage (k+1), and wherein a final stage apparatus (K=N) of said plurality of N product-sum calculation apparatuses, based on the bit-position data, calculates a product of data inputted through an N-th input terminal, and the second input data, and calculates a sum of a calculated product and the data of the calculated sum outputted from the product-sum calculation apparatus of the preceding stage (k) (k=N−1), and outputs data of a calculated sum, wherein each of said first and second product-sum calculation unit integrated circuit apparatuses further comprises output-use storage means for temporarily storing the data of the calculated sum outputted from the final stage apparatus (K=N) of said plurality of N product sum calculation apparatuses, and outputting a stored data, wherein said product-sum calculation unit integrated circuit apparatus arrangement further comprises an adder for adding data outputted from said first product-sum calculation unit integrated circuit apparatus and data outputted from said second product-sum calculation unit integrated circuit apparatus, and outputting data of an addition result.

21. A product-sum calculation unit integrated circuit apparatus arrangement comprising:

a plurality of c product-sum calculation unit integrated circuit apparatuses (m) (m=1, 2, 3, ...., c), each of said plurality of c product-sum calculation unit integrated circuit apparatuses (m) including, a plurality of N product-sum calculation-apparatuses (k) (k=1, 2, 3, ...., N), each of plurality of N product-sum calculation apparatuses (k) including, a barrel shifter for shifting the first input data by a predetermined number of bits based on the second input data, and outputting shifted data;

an adder having first and second input terminals, for adding the shifted data outputted from said barrel shifter and inputted through said first input terminal of said adder, and data inputted through said second input terminal of said adder, and outputting addition result data;

a register for temporarily storing the addition result data outputted from said adder, outputting a stored data to said adder through said second input terminal of said adder, and outputting the stored data through said output terminal; and a multiplexer having first and second input terminals, for selecting one of third input data inputted through said first input terminal of said multiplexer, and data inputted through said second input terminal of said multiplexer, and outputting selected data to said adder through said second input terminal of said adder, whereby each of said product-sum calculation apparatuses (k) calculates a product of the first input data and the second input data, calculates a sum of a calculated product and the third input data, and outputs a calculated sum from said output terminal; and data conversion means provided in parallel with said plurality of N product-sum calculation apparatuses (k), said data conversion means comprising:

data compression means for converting the second input data into compressed data having bit signals such that a number of the bit signals whose bit status is "1" is not larger than a predetermined number smaller than a bit width of the second input data; and a bit-position encoder for generating and outputting bit-position data representing bit positions of bit signals whose bit status is "1" out of the compressed data, to said barrel shifter of each of said plurality of N product-sum calculation apparatuses (k).

wherein a first stage apparatus (K=1) of said plurality of N product-sum calculation apparatuses calculates a product of data inputted through a first input terminal and the second input data, calculates a sum of a calculated product and third input data, and outputs data of a calculated sum, wherein remaining stage apparatuses (K=2, 3, ...., N−1) of said plurality of N product-sum calculation apparatuses, based on the bit-position data inputted through an input terminal, calculate a product of data inputted through a k-th input terminal other than said input terminal through which the bit-position data is inputted, and the second input data, calculates a sum of a calculated product and the data of the sum outputted from a product-sum calculation apparatus of a preceding stage (k−1), and outputs data of a calculated sum to a product-sum calculation apparatus of a succeeding stage (k+1), and wherein a final stage apparatus (K=N) of said plurality of N product-sum calculation apparatuses, based on the bit-position data, calculates a product of data inputted through an N-th input terminal, and the second input data, and calculates a sum of a calculated product and the data of the calculated sum outputted from the product-sum calculation apparatus of the preceding stage (k) (k=N−1), and outputs data of a calculated sum, wherein each of said plurality of c product-sum calculation unit integrated circuit apparatuses (m) (m=1, 2, . . . . c) further includes output-use storage means for temporarily storing the data of the calculated sum outputted from the final stage apparatus K=N of said plurality of N product-sum calculation apparatuses, and outputting stored data, wherein said product-sum calculation unit integrated circuit apparatus arrangement further comprises:
(c−1) adders (p) (p=1, 2, . . . . , c−1); and
(c−2) conjunction storage means (q) (q=1, 2, 10−, c−2), wherein a first (p=1) of said (c−1) adders adds the data outputted from the first stage apparatus said plurality of product-sum calculation unit integrated circuit apparatuses and the data outputted from a second stage apparatus of said product-sum calculation-unit integrated circuit apparatus, and outputs data of an addition result, wherein remaining adders (a=2, 3 . . . . C−2) of said (c−1) adders add the outputted from a m-th stage (m=3, 4, . . . , c−1) of product-sum calculation unit integrated circuit apparatus and the stored data outputted from said conjunction storage means (q−1) (q=2, 3, . . . . c−2), and outputs data of an addition data, wherein said conjunction storage means (q) (q=1, 2, . . . , c−2) temporarily holds data of the addition data outputted from said adder (p) (p=1, 2, . . . . , c−2) for a period of a predetermined cycle, and outputs a held data to said adder (p+1) (p=1, 2, . . . . , c−2), and wherein said adder (p) (p=c−1) adds the data outputted from said product-sum calculation unit integrated circuit apparatus of the c-th stage (m) (m=c) and the data outputted from said conjunction storage means (q) (q=c−2), and outputs data of an addition result.

22. A product-sum calculation unit integrated circuit apparatus arrangement comprising:
a plurality of (c×b) product-sum calculation unit integrated circuit apparatuses (m, n) (m=1, 2, c; n=1, 2, . . . . , b), each of said plurality of (c×b) product-sum calculation unit integrated circuit apparatuses (m, n) including,
a plurality of N product-sum calculation apparatuses (k) (k=1, 2, 3, . . . , N), each of plurality of N product-sum calculation apparatuses (k) including,
a barrel shifter for shifting the first input data by a predetermined number of bits based on the second input data, and outputting shifted data;
an adder having first and second input terminals, for adding the shifted data outputted from said barrel shifter and inputted through said first input terminal of said adder, and data inputted through said second input terminal of said adder, and outputting addition result data;
a register for temporarily storing the addition result data outputted from said adder, outputting stored data to said adder through said second input terminal of said adder, and outputting the stored data through said output terminal; and
a multiplexer having first and second input terminals, for selecting one of third input data inputted through said first input terminal of said multiplexer, and data inputted through said second input terminal of said multiplexer, and outputting selected data to said adder through said second input terminal of said adder, whereby each of said plurality of product-sum calculation apparatuses (k) calculates a product of the first input data and the second input data, calculates a sum of a calculated product and the third input data, and outputs a calculated sum from said output terminal; and data conversion means provided in parallel with said plurality of N product-sum calculation apparatuses (k), said data conversion means including,
data compression means for converting the second input data into compressed data having bit signals such that a number of the bit signals whose bit status is "1" is not larger than a predetermined number smaller than a bit width of the second input data; and
a bit-position encoder for generating and outputting bit-position data representing bit positions of bit signals whose bit status is "1" out of the compressed data, to said barrel shifter of each of said plurality of product-sum calculation apparatuses (k), wherein a first stage apparatus (K=1) of said plurality of product-sum calculation apparatuses calculates a product of data inputted through a first input terminal and the second input data, calculates a sum of a calculated product and third input data, and outputs data of a calculated sum, wherein remaining stage apparatuses (K=2, 3, . . . . , N−1) of said plurality of product-sum calculation apparatuses plurality of, based on the bit-position data inputted through an input terminal, calculates a product of data inputted through a k-th input terminal other than said input terminal through which the bit-position data is inputted, and the second input data, calculates a sum of a calculated product and the data of the sum outputted from a product-sum calculation apparatus of a preceding stage (k−1), and outputs data of a calculated sum to a product-sum calculation apparatus of a succeeding stage (k+1), and wherein a final stage apparatus (K=N) of said product-sum calculation apparatuses, based on the bit-position data, calculates a product of data inputted through an N-th input terminal, and the second input data, and calculates a sum of a calculated product and the data of the calculated sum outputted from the product-sum calculation apparatus of the preceding stage (k) (k=N−1), and outputs data of a calculated sum, wherein each of said plurality of (c×b) product-sum calculation unit integrated circuit apparatuses (m, n) (m=1, 2, . . . . . c; n=1, 2, . . . . , b) further includes output-use storage means for temporarily storing the data of the calculated sum outputted from the final stage apparatus (K=N) of said product-sum calculation apparatus, and outputting stored data, wherein each of a plurality of c groups of product-sum calculation unit integrated circuit apparatuses (m) (m=1, 2, . . . , c) includes a plurality of b product-sum calculation unit integrated circuit apparatuses (n) (n=1, 2, . . . , b) wherein said plurality of b product-sum calculation unit integrated circuit apparatuses (n) (n=1, 2, . . . , b) of each of said plurality of c groups of product-sum calculation unit integrated circuit apparatuses (m) (m=1, 2, . . . , c) are connected in series so that data outputted from said output-use storage means of each of said plurality of product-sum calculation unit integrated circuit apparatuses (n) (n=1, 2, . . . , b−1) is outputted to each of said plurality of product-sum calculation unit integrated circuit apparatuses of a succeeding stage (n) (n=2, . . . b), wherein said product-sum calculation unit integrated circuit apparatus arrangement further includes
(c−1) adders (p)−(p=1, 2, . . . , c−1); and
(c−2) conjunction storage means (q) (q=1, 2, 10, c−2),
wherein a first (p=1) of said adders adds the data outputted from a final stage apparatus (n=b) of said plurality of product-sum calculation unit integrated circuit apparatus of a first group (m) (m=1) and the data outputted from the final stage apparatus (n=b) of said plurality of product-sum calculation unit integrated circuit apparatus of a second group (m) (m=2), and outputs data of an addition result,
wherein each of said adders (p) (p=2, 3, . . . , c−2) adds the data outputted from a product-sum calculation unit integrated circuit apparatus of a last stage (n) (n=b) of an m-th group (m) (m=3, 4, . . . , c−1) and the stored data outputted from said conjunction storage means (q−1) (q=2, 3, . . . , c−2), and outputs data of an addition data,
wherein said conjunction storage means (q) (q=1, 2, . . . , c−2) temporarily holds data of the addition data outputted from said adder (p) (p=1, 2, . . . , c−2) for a period of a predetermined cycle, and outputs held data to said adder (p+1) (p=1, 2, . . . , c−2), and
wherein said adder (p) (p=c−1) adds the data outputted from a product-sum calculation unit integrated circuit of the last stage (n) (n=b) of the cth group (m) (m=c) and the data outputted from said conjunction storage means (q) (q=c−2), and outputs data 10 of an addition result.

23. A cumulative adder comprising:
a plurality of adders, each of said plurality of adders having a first input terminal, a second input terminal, an output terminal, a carry input terminal, and a carry output terminal, each of said adders adding two data inputs respectively inputted through said first and second input terminals, generating a carry signal representing an overflow upon said addition, outputting data as an addition result through said output terminal, and outputting the carry signal through said carry output terminal; and
a register for temporarily storing the data outputted from said output terminals of said adders and the carry signals outputted from said carry output terminals of said adders, and outputting the stored data and the carry signals,
wherein either one of bit data of a partial bit range of said cumulative adder stored in said register and a predetermined initial value data is inputted to the first input terminal of each of said plurality of adders,
wherein bit data of each bit range corresponding to the first input terminal of each of said plurality of adders are inputted to the second input terminal of each of said plurality of adders, and
wherein a carry signal outputted from said carry output terminal of one of said plurality of adders which processes a lower order bit range out of the bit ranges processed by said plurality of adders is inputted through said register to said carry input terminal of one of said plurality of adders which processes a higher-order bit range.

24. A product-sum calculation apparatus comprising:
a cumulative adder, said cumulative adder including,
a plurality of adders, each of said plurality of adders having a first input terminal, a second input terminal, an output terminal, a carry input terminal, and a carry output terminal, each of said plurality of adders adding two data inputs respectively inputted through said first and second input terminals, generating a carry signal representing an overflow upon said addition, outputting data as an addition result through said output terminal, and outputting the carry signal through said carry output terminal; and
a register for temporarily storing the data outputted from said output terminals of said plurality of adders and the carry signals outputted from said carry output terminals of said plurality of adders, and outputting the stored data and the carry signals,
wherein either one of bit data within a partial bit range of said cumulative adder and a predetermined initial value data is inputted to the first input terminal of each of said plurality of adders through said register,
wherein bit data of each bit range corresponding to each of said plurality of adders are inputted to the second input terminal of each of said plurality of adders, and
wherein a carry signal outputted from said carry output terminal of one of said plurality of adders which processes a lower-order bit range of bit ranges processed by said plurality of adders is inputted through said register to said carry input terminal of said plurality of adders which processes a higher-order bit range,
wherein said product-sum calculation apparatus further comprises:
data compression means for converting first input data into compressed data having bit signals such that a number of the bit signals whose bit status is "1" is not larger than a predetermined number smaller than bit width of the first input data;
a bit-position encoder for generating bit-position data representing bit positions of the bit signals whose bit status is "1" out of the compressed data, and outputting the bit-position data; and
a barrel shifter for shifting second input data based on the bit-position data outputted from said bit-position encoder, and outputting data of respective bit ranges corresponding to respective ones of said plurality of adders out of the shifted data, to the second input terminal of each of said plurality of adders.

* * * * *